US011915862B2

(12) United States Patent
Eliason et al.

(10) Patent No.: US 11,915,862 B2
(45) Date of Patent: Feb. 27, 2024

(54) DETACHABLE MAGNET DEVICE

(71) Applicant: Magnetic Mechanisms L.L.C., Shoreview, MN (US)

(72) Inventors: Jeffery M. Eliason, Shoreview, MN (US); Mitchell Porch, Grand Rapids, MI (US); Joseph Funk, St. Paul, MN (US); Braden J. Eliason, Minneapolis, MN (US); Benjamin J. Larsen, St. Paul, MN (US); David A. Melander, Saint Louis Park, MN (US); Rebecca E. Wereley, Richfield, MN (US)

(73) Assignee: Magnetic Mechanisms L.L.C, Shoreview, MN (US)

( * ) Notice: Subject to any disclaimer, the term of this patent is extended or adjusted under 35 U.S.C. 154(b) by 0 days.

(21) Appl. No.: 17/895,464

(22) Filed: Aug. 25, 2022

(65) Prior Publication Data

US 2022/0415552 A1 Dec. 29, 2022

Related U.S. Application Data

(63) Continuation-in-part of application No. 17/176,486, filed on Feb. 16, 2021, now Pat. No. 11,482,359.

(60) Provisional application No. 62/979,148, filed on Feb. 20, 2020.

(51) Int. Cl.
*H01F 7/02* (2006.01)

(52) U.S. Cl.
CPC ......... *H01F 7/0205* (2013.01); *H01F 7/0252* (2013.01)

(58) Field of Classification Search
CPC ........ H01F 7/0252; H01F 7/04; H01F 7/0205; H01F 7/02
See application file for complete search history.

(56) References Cited

U.S. PATENT DOCUMENTS

| | | | | |
|---|---|---|---|---|
| 4,200,852 A * | 4/1980 | Aoki | H01F 7/0263 24/303 |
| 8,174,347 B2 * | 5/2012 | Fullerton | G06F 1/1679 335/306 |

(Continued)

FOREIGN PATENT DOCUMENTS

| | | | |
|---|---|---|---|
| GB | 444786 A | * | 3/1936 |
| JP | 2006321149 A | * | 11/2006 |

*Primary Examiner* — Mohamad A Musleh
(74) *Attorney, Agent, or Firm* — Christensen, Fonder, Dardi & Herbert PLLC

(57) ABSTRACT

A device for attachment to a surface of a ferromagnetic object and for holding an item near the surface, including: a base with a frame and grip portion, the grip portion coupled to the frame at the rear side and having an outer surface for gripping the surface; a magnet-retaining portion pivotally connected to an end of the frame; a magnetic device connected to the magnet-retaining portion and having an outer surface displaced frontwardly from the outer surface of the grip portion; a cover pivotally connected to another end of the frame, the cover including a lifter configured to contact an end of the magnet-retaining portion and cause an end of the magnet-retaining portion to pivot about the frame when the cover is lifted and the lifter is rotated, thereby moving the first end of the magnet-retaining portion and the magnetic device in a rear-to-front direction; and an item-holding portion.

23 Claims, 74 Drawing Sheets

(56) References Cited

U.S. PATENT DOCUMENTS

| | | | | |
|---|---|---|---|---|
| 8,350,663 B1 * | 1/2013 | Michael | B23Q 3/1546 338/288 |
| 9,689,527 B2 * | 6/2017 | Franklin | F16B 1/00 |
| 2005/0216125 A1 * | 9/2005 | Huston | B62D 57/024 700/258 |
| 2007/0041777 A1 * | 2/2007 | Dietz | H01F 7/0205 401/131 |

* cited by examiner

DETACHABLE MAGNET DEVICE

CROSS-REFERENCE TO RELATED APPLICATION

This application is a continuation-in-part of U.S. patent application Ser. No. 17/176,486, filed Feb. 16, 2021, which claims the benefit of U.S. Provisional Application No. 62/979,148, filed Feb. 20, 2020, the disclosures of which are both incorporated by reference herein in their entireties.

BACKGROUND

This disclosure relates generally to devices having one or more magnets which generate magnetic attraction forces with ferromagnetic objects.

BRIEF SUMMARY

A device for detachable attachment to a ferromagnetic surface is disclosed. In some example embodiments, the device comprises a core housing defining a pocket, a magnet disposed in the pocket, and a baseplate fixed to the magnet. In some embodiments, the baseplate includes a tab portion that extends beyond a periphery of the magnet. In some embodiments, the baseplate also includes a pivot portion that engages a corresponding portion of the core housing to form a hinge joint such that the baseplate and the magnet selectively pivot about a pivot axis of the hinge joint relative to the core housing.

In some embodiments, an annular body is disposed about the core housing such that the annular body is rotatable about a rotational axis relative to the core housing. In some embodiments, the annular body defines a cavity and the annular body includes a camming rib that extends radially inward into the cavity. In some embodiments, the camming rib applies a camming force to the tab portion of the baseplate upon rotation of the annular body relative to the core housing and the camming force urges the magnet and the baseplate to pivot about the pivot axis of the hinge joint.

In some embodiments, the device includes a cap member that is fixed to the core housing with the camming rib disposed between the cap member and a flange portion of the core housing. In some embodiments, the annular body defines a counterbore and the flange portion of the core housing is disposed at least partially in the counterbore defined by the annular body. In some embodiments, the annular body defines a relief and a portion of the cap member is disposed in the relief defined by the annular body. In some embodiments, the annular body has a counterbore opening in a first direction, a relief opening in a second direction, and a camming rib disposed between the counterbore and the relief. In some embodiments, the cap member has a disk-shaped body. In some embodiments, the cap member has a circular shape when viewed as an orthographic projection.

In some embodiments, the magnet of the detachable magnet device comprises a magnetic sheet fixed to a baseplate. In some embodiments, the baseplate comprises a baseplate wall having a forward facing surface, a rearward facing surface, and a wall thickness extending between the forward facing surface and the rearward facing surface. In some embodiments, the magnetic sheet is positioned to overlay the rearward facing surface of the baseplate wall. In some embodiments, the magnetic sheet has a forward face, a rearward face, and a sheet thickness extending between the forward face and the rearward face. In some embodiments, the magnetic sheet comprises a plurality of island portions with interstitial portions of the magnetic sheet disposed about each island portion. In some embodiments, each island portion has a north pole and a south pole and magnetic flux flows through the north pole and the south pole of each island portion. In some embodiments, the poles of each island portion defining a magnetic axis extending through the island portion. In some embodiments, each magnetic axis is generally orthogonal to the faces of the magnetic sheet. In some embodiments, the north pole and the south pole of each island portion are positioned so that each island portion has a first magnetic polarity and the interstitial portions of the magnetic sheet have a second magnetic polarity that is opposite the first magnetic polarity. In some embodiments, the baseplate comprises a ferromagnetic material so that a first portion of the magnet flux flows through the baseplate. In some embodiments, a second portion of the magnetic flux flows through an effective zone opposite a forward face of the magnetic sheet, the second portion of the magnetic flux having a shape that is a mirror image of a first shape of the first portion of the magnetic flux. In some embodiments, the effective zone has an effective zone thickness and ferromagnetic items located outside the effective zone are not attracted to the magnetic sheet. In some embodiments, the effective zone has an effective zone thickness and ferromagnetic items located partially or completely in the effective zone are attracted to the magnetic sheet.

In some additional example embodiments, a device for detachable attachment to a ferromagnetic surface comprises a drive body assembly including a ring-shaped drive body. In some embodiments, the drive body includes a plurality of raised portions, a plurality of recessed portions, and an undulating surface extending over the plurality of raised portions and the plurality of recessed portions. In some embodiments, the mating body assembly of the device comprises a ring-shaped mating body that includes a plurality of peak portions, a plurality of valley portions, and an undulating surface extending over the plurality of peak portions and the plurality of valley portions. The mating body assembly may further include a magnet that is coupled to the mating body. The mating body may have a face that defines a face plane. In some example embodiments, the mating body of the device has an attachment position in which each peak portion of the mating body is received in a corresponding recessed portion of the driving body and each raised portion of the drive body is received in a valley portion of the mating body. In these example embodiments, the mating body may also have a maximum displacement position in which each peak portion of the mating body is outside of the corresponding recessed portion of the drive body and each raised portion of the drive body is outside of the corresponding valley portion of the mating body. Upon relative rotation between the drive body and the mating body, the mating body may move toward the maximum displacement position and the magnet is displaced by a displacement distance relative to the face plane. In some example embodiments, the distance traveled by the magnet is greater than an effective zone thickness of a magnetic field produced by the magnet. In some example embodiments, distance traveled by the magnet is greater than a baseplate wall thickness of a shunt of the magnet.

A feature and/or benefit of embodiments is a system including a cam, wherein upon movement of the cam, the magnitude of a magnetic force varies. In some embodiments, the magnitude of the magnetic force varies in an analog fashion. In some embodiments, the magnitude of the magnetic force is increased and decreased as the cam moves through a range of motion. In some embodiments, the magnetic force has a minimum magnitude that is greater than zero.

A feature and/or benefit of embodiments is a detachable magnet device that is repositionable on a ferromagnetic object or surface. In some embodiments, the detachable magnet device re-useable (e.g, it can be removed from one object and placed on anther object).

A feature and/or benefit of embodiments is a detachable magnet device including an interface member having an outer surface that generates friction between itself and the object. In some embodiments the interface member has an outer surface configured to reduce the likelihood that the ferromagnetic will be damaged.

A feature and/or benefit of embodiments is a detachable magnet device includes a baseplate portion having a thickness dimension selected to provide a relatively low level of torque and a relatively high level of parallel shear. In some embodiments, the baseplate portion of the hanging system has a thickness of about 0.013 inch thick. A feature and/or benefit of embodiments is a detachable magnet device has an overall thickness dimension configured to minimize torque and maximize parallel shear forces.

A feature and/or benefit of embodiments is a detachable magnet device having an overall thickness dimensioned and configured to allow framed photographs, framed artwork and other décor items to lay flat or nearly flat against a ferromagnetic object or surface.

A feature and/or benefit of embodiments is a detachable magnet device including a baseplate portion and an object engaging member (e.g., a hook). A feature and/or benefit of embodiments is a detachable magnet device including a baseplate portion and an object engaging member that is centered relative to the baseplate portion.

A feature and/or benefit of embodiments is a detachable magnet device comprising a magnetic sheet that produces a magnetic flux, a portion of the magnetic flux extending through an effective zone, the effective zone having an effective zone thickness, wherein ferromagnetic items located outside the effective zone are not attracted to the magnetic sheet and ferromagnetic items located inside the effective zone are not attracted to the magnetic sheet. In some embodiments, the effective zone has a thickness that is selected such that the detachable magnet device functions with a ferromagnetic object comprising ferromagnetic paint.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figures 1A, 1B, 1C:
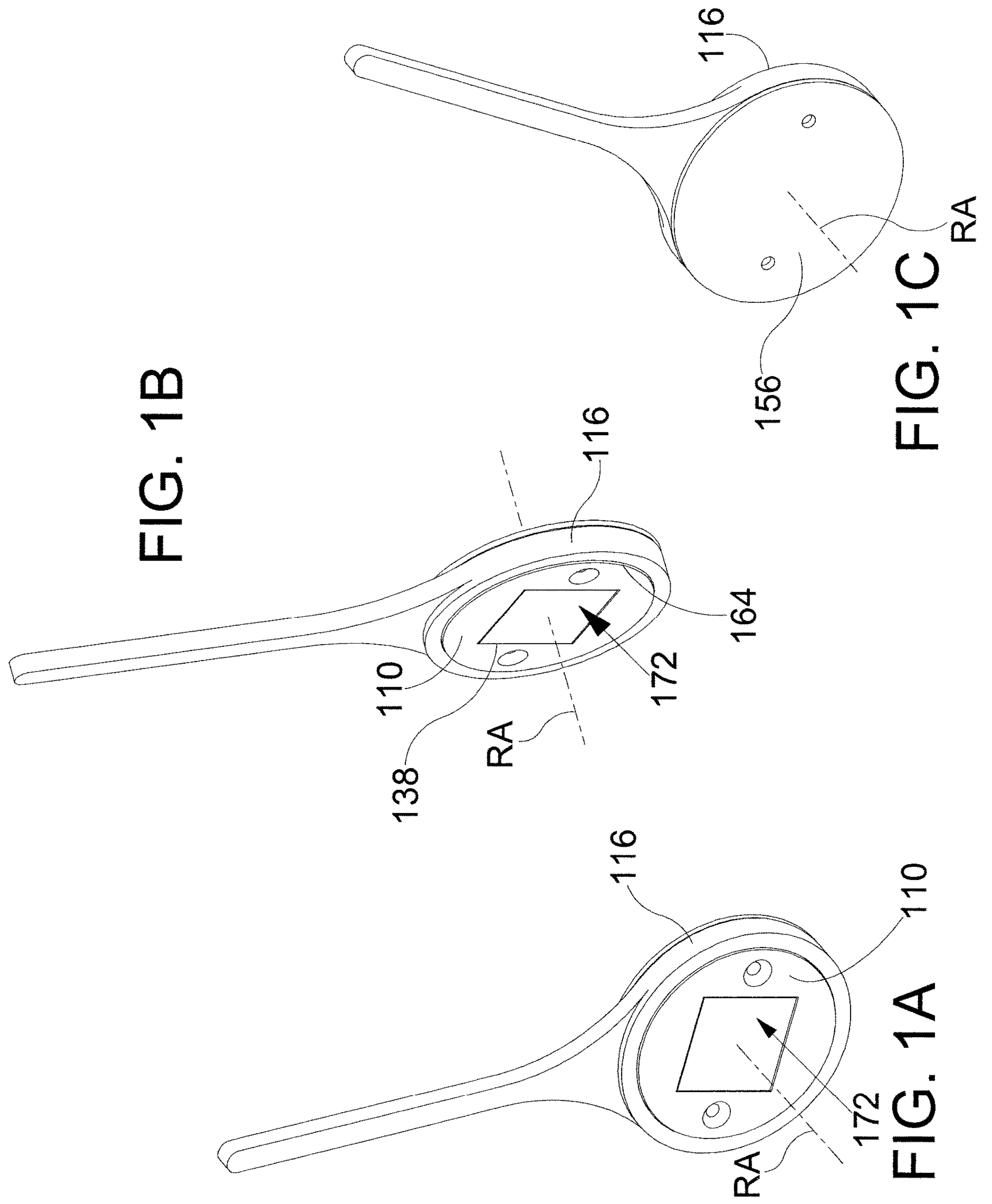
FIGS. 1A through 1C are perspective views showing a detachable magnet device in accordance with an example embodiment.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

FIGS. 1A through 1C are perspective views showing a detachable magnet device in accordance with an example embodiment. FIGS. 1A through 1C may be collectively referred to as FIG. 1. The detachable magnet device of FIG. 1 comprises a core housing 110 defining a pocket 138 and a magnet assembly 172 that is received in the pocket 138. In the example embodiment of FIG. 1, an annular body 116 is disposed about the core housing 110 such that the annular body 116 is rotatable about a rotational axis RA relative to the core housing 110. Also in the example embodiment of FIG. 1, the device includes a cap member 156 that can be fixed to the core housing 110 with a camming rib of the annular body 116 disposed between the cap member 156 and a flange portion 164 of the core housing 110.

Figure 2:
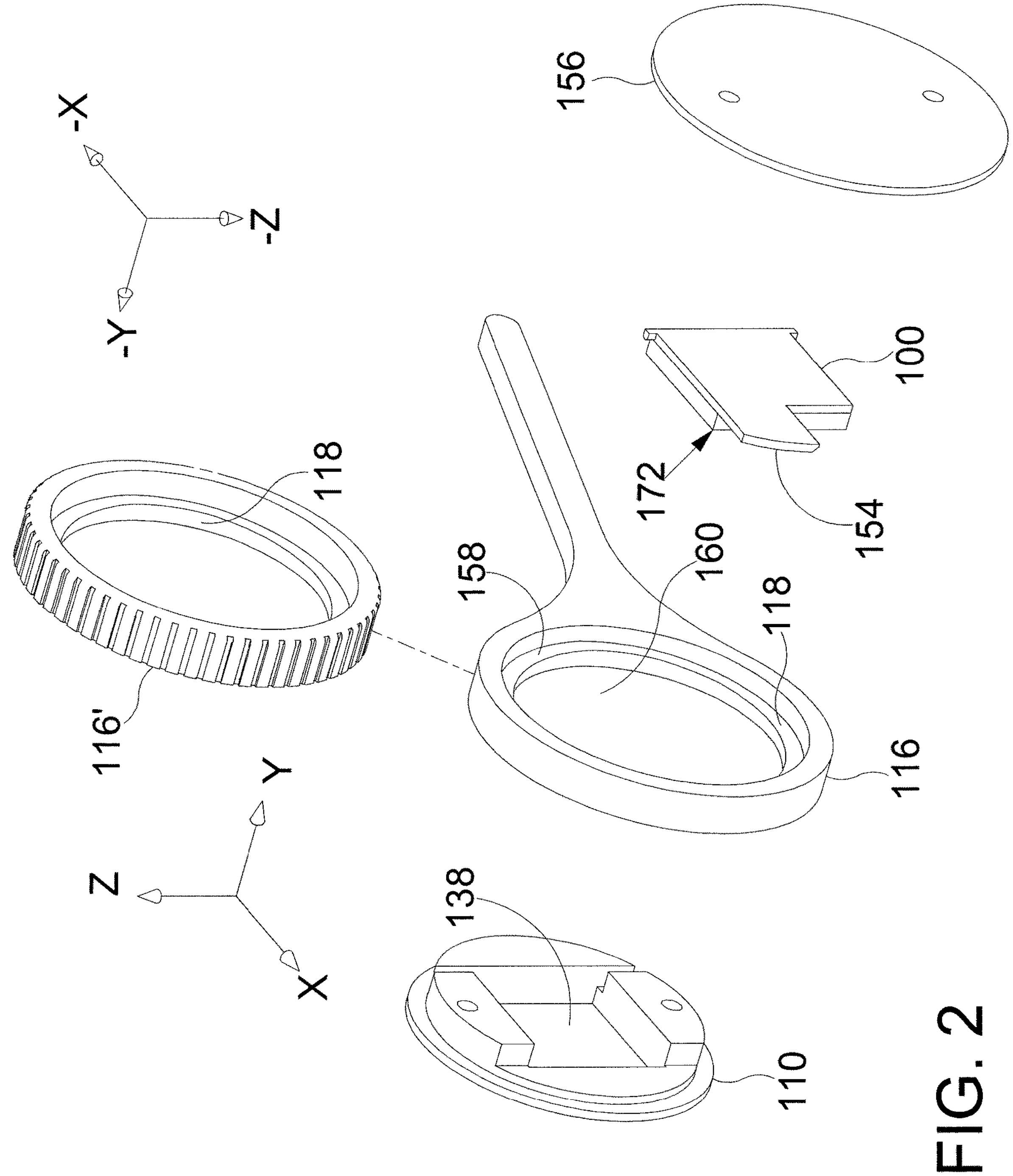
FIG. 2 is an exploded perspective view showing a detachable magnet device in accordance with an example embodiment.
Figure 3A:
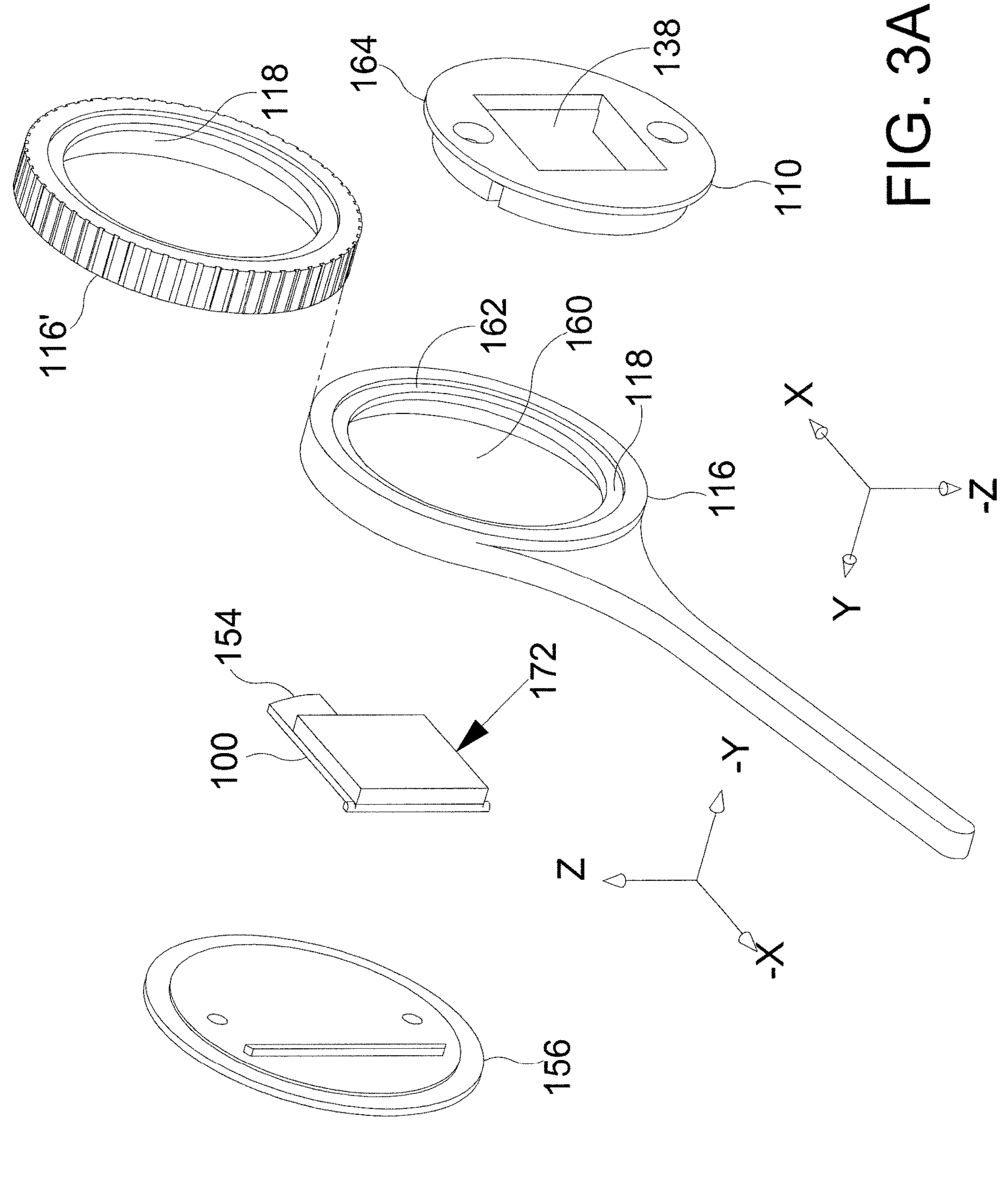
FIG. 3A is an exploded perspective view showing a detachable magnet device in accordance with an example embodiment.

FIGS. 2 and 3A are exploded perspective views showing the detachable magnet device seen in FIG. 1. In the example embodiment of FIGS. 2 and 3A, the detachable magnet device comprises a core housing 110 defining a pocket 138, a magnet assembly 172 that is received in the pocket 138, and a baseplate 100 that is fixed to the magnet assembly 172. When the device is in an assembled state, an annular body may be rotatably disposed about the core housing 110 so that the annular body is rotatable about a rotational axis. In some example embodiments, a handle member is fixed to the annular body 116. On other example embodiments the annular body 116' may include a plurality of gripping elements. In some embodiments, the gripping elements comprise a plurality of protrusions and/or grooves. In the example embodiment of FIGS. 2 and 3A, the baseplate 100 includes a tab portion 154 that extends beyond a periphery of the magnet assembly 172. Also in the example embodiment of FIGS. 2 and 3A, the baseplate 100 also includes a pivot portion 112 that is received in a corresponding portion 114 of the core housing 110 to form a hinge joint such that the baseplate 100 and the magnet assembly 172 selectively pivot relative to the core housing 110.

In the example embodiment of FIGS. 2 and 3A, the device includes a cap member 156 that can be fixed to the core housing 110 with the camming rib 118 disposed between the cap member 156 and a flange portion 164 of the core housing 110. In the example embodiment of FIGS. 2 and 3A, the annular body 116 defines a counterbore 162 and the flange portion 164 of the core housing 110 is disposed at least partially in the counterbore 162 defined by the annular body 116 when the device is assembled. Also in the example embodiment of FIGS. 2 and 3A, the annular body 116 defines a relief 158 and a portion of the cap member is disposed in the relief 158 defined by the annular body 116 when the device is assembled. In some embodiments, the annular body 116 has a counterbore 162 opening in a first direction, a relief 158 opening in a second direction, and a camming rib 118 disposed between the counterbore 162 and the relief 158. In some embodiments, the cap member 156 has a disk-shaped body. In some embodiments, the cap member 156 has a circular shape when viewed as an orthographic projection.

Figure 3B:
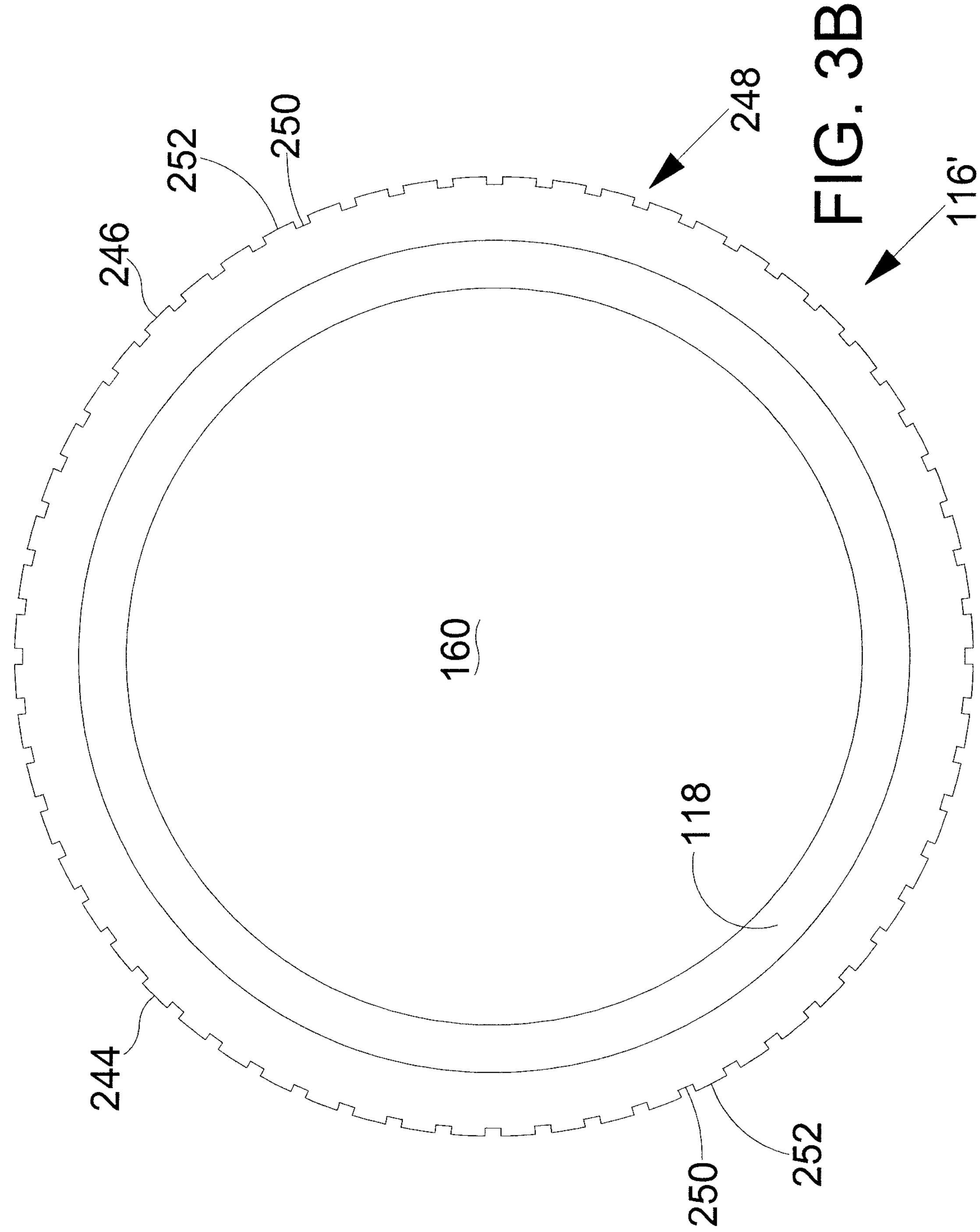
FIG. 3B is a plan view showing an annular body in accordance with an example embodiment.

FIG. 3B is a plan view showing an annular body 116' in accordance with an example embodiment. In the example embodiment of FIG. 3B, the annular body 116' includes a plurality of gripping elements 244. The gripping elements 244 comprise a plurality of protrusions 246 and a plurality of grooves 248. In some embodiments, each protrusion 246 is disposed between two grooves 248. In some embodiments, each groove 248 is disposed between two protrusions 246. In some embodiments, each protrusion 246 extends between a first surface 250 and a second surface 252. In some embodiments, each groove 248 extends between a first surface 250 and a second surface 252.

Figure 4:
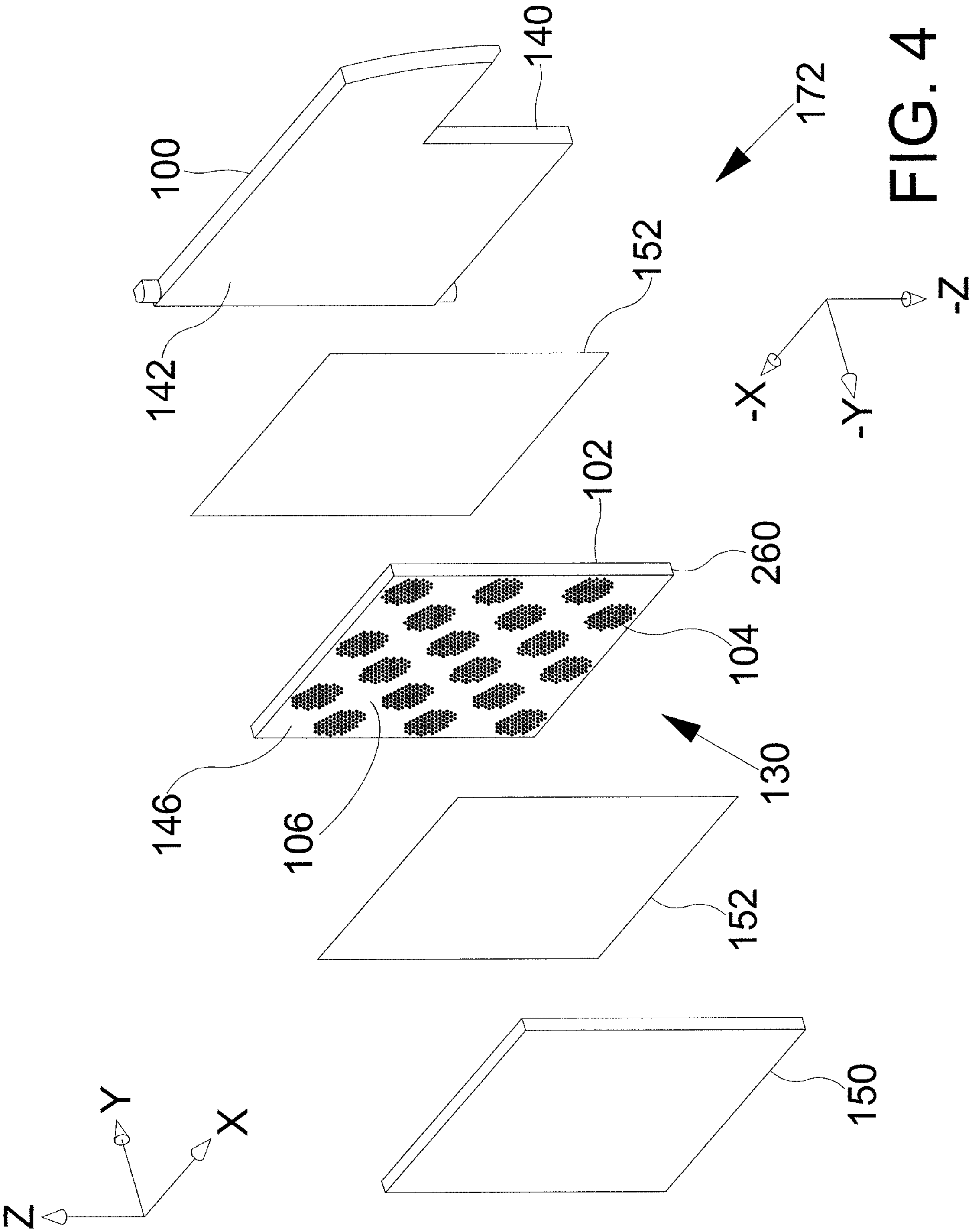
FIG. 4 is an exploded perspective view showing an assembly including a magnetic sheet and a baseplate.
Figure 5:
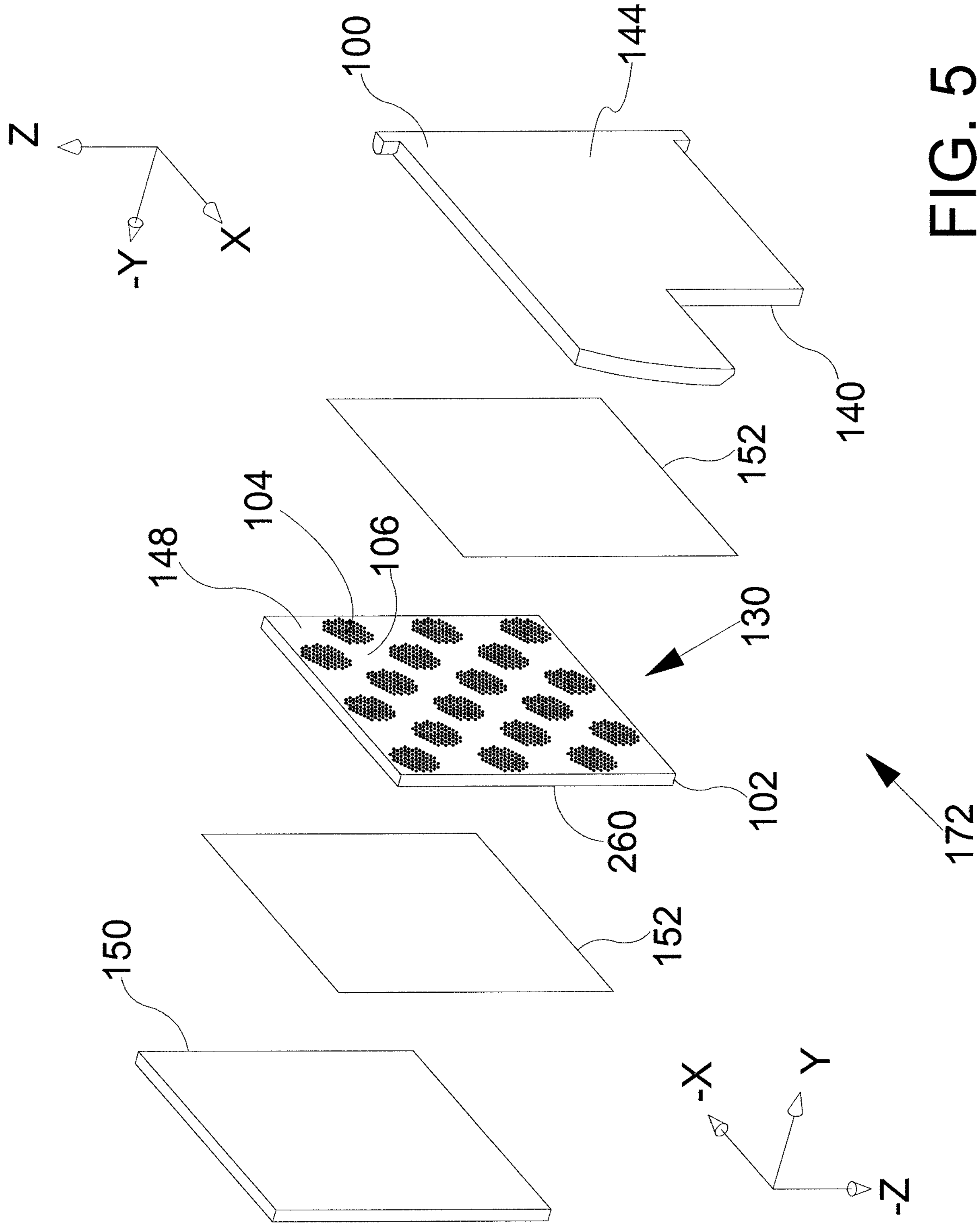
FIG. 5 is an exploded perspective view showing an assembly including a magnetic sheet and a baseplate.

FIGS. 4 and 5 are exploded perspective views showing a magnet assembly 172 and a baseplate 100. In the example embodiment of FIGS. 4 and 5, the magnet assembly 172 comprises a magnet 260, a baseplate 100, and an interface member 150. In the example embodiment of FIGS. 4 and 5, the magnet 260 comprises a magnetic sheet 102. In some embodiments, the baseplate 100 comprises a baseplate wall 140 having a forward facing surface 142, a rearward facing surface 144, and a wall thickness extending between the forward facing surface 142 and the rearward facing surface 144. When the magnet assembly 172 is in an assembled state, the magnetic sheet 102 may be positioned to overlay the rearward facing surface 144 of the baseplate wall 140. In embodiments, the magnetic sheet 102 has a forward face 146, a rearward face 148, and a sheet thickness extending between the forward face 146 and the rearward face 148. A layer of adhesive 152 may be disposed between the forward face 146 of the magnetic sheet 102 and the rearward facing surface 144 of the baseplate wall 140 in some embodiments. When the magnet assembly 172 is in an assembled state, the interface member 150 may be positioned to overlay the rearward face 148 of the magnetic sheet 102. A layer of adhesive 152 may be disposed between the rearward face 148 of the magnetic sheet 102 and the interface member 150. The interface member 150 may comprise various materials without deviating from the spirit and scope of this detailed description. Examples of materials that may be suitable in some applications include (and are not limited to): thin silicone tape, conformal coatings (e.g., Dowsil 1-2577), 3M Grip Tape, rubber sprays and coatings (e.g., PLASTI DIP multipurpose rubber coating available from Plasti Dip International of Blaine, Minnesota), abrasive tapes, and tacky adhesive tapes. In some embodiments, the shear force of coatings tapes may be optimized for each magnet system design to provide a high static coefficient of friction with durability at a minimum thickness to maintain the maximum magnetic attach (normal) forces.

Still referring to FIGS. 4 and 5, in embodiments, the magnetic sheet 102 comprises a plurality of island portions 104 with interstitial portions 106 of the magnetic sheet 102 disposed about each island portion 104. In FIGS. 4 and 5, the island portions 104 can be seen forming an array 130 across the face of the magnetic sheet 102. The plurality of island portions 104 are arranged to form a plurality of rows and a plurality of columns in the example embodiment of FIGS. 4 and 5. It is noted that the island portions 104 may be arranged in other patterns without deviating from the spirit and scope of this detailed description.

Figures 6A, 6B, 6C, 6D, 6E:
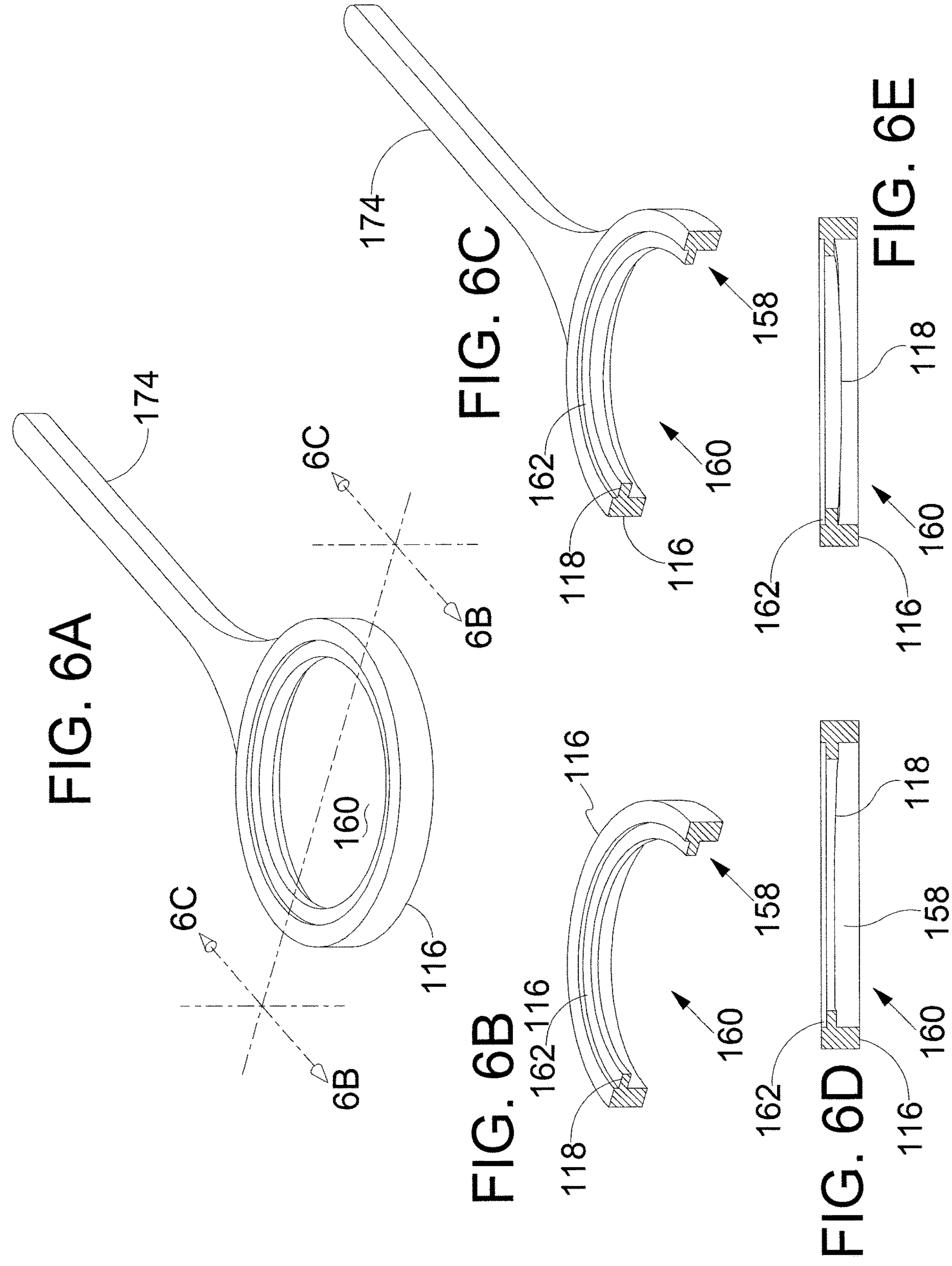
FIG. 6A is a perspective view showing an annular body and a handle portion.
FIG. 6B is a cross-sectional perspective view further illustrating the annular body shown in FIG. 6A. In the embodiment of FIG. 6B, the annular body has been cut along section line 6B-6B shown in FIG. 6A.
FIG. 6C is a cross-sectional perspective view further illustrating the annular body shown in FIG. 6A. In the embodiment of FIG. 6C, the annular body has been cut along section line 6C-6C shown in FIG. 6A.
FIG. 6D is a cross-sectional perspective view further illustrating the annular body shown in FIG. 6B.
FIG. 6E is a cross-sectional perspective view further illustrating the annular body shown in FIG. 6C.

FIG. 6A is a perspective view showing an annular body 116 and a handle portion 174 extending in a radial direction from the annular body 116. FIG. 6B is a cross-sectional perspective view further illustrating the annular body 116 shown in FIG. 6A. In the embodiment of FIG. 6B, the annular body 116 and the handle portion 174 have been cut along section line 6B-6B shown in FIG. 6A. FIG. 6C is a cross-sectional perspective view further illustrating the annular body 116 shown in FIG. 6A. In the embodiment of FIG. 6C, the annular body 116 and the handle portion 174 have been cut along section line 6C-6C shown in FIG. 6A.

With reference to FIGS. 6A, 6B, and 6C, it will be appreciated that the annular body 116 defines a cavity 160 and the annular body 116 includes a camming rib 118 that extends radially inward into the cavity 160. FIG. 6D is a cross-sectional elevation view further illustrating the annular body 116 shown in FIG. 6B and FIG. 6E is a cross-sectional perspective view further illustrating the annular body 116 shown in FIG. 6C. FIGS. 6A through 6E may be collectively referred to as FIG. 6. In the example embodiment of FIG. 6, the annular body 116 defines a counterbore 162 opening in a first direction and a relief 158 opening in a second direction. Also in the example embodiment of FIG. 6, the camming rib 118 disposed between the counterbore 162 and the relief 158. In some example embodiments, the handle portion 174 has a proximal end, a distal end, and a shaft portion extending between the proximal end and the distal end, the proximal end being fixed to the annular body 116. In some example embodiments, the handle portion 174 has a proximal end, a distal end, and a shaft portion extending between the proximal end and the distal end, the proximal end being received in a socket defined by the annular body 116.

Figures 7A, 7B, 7C:
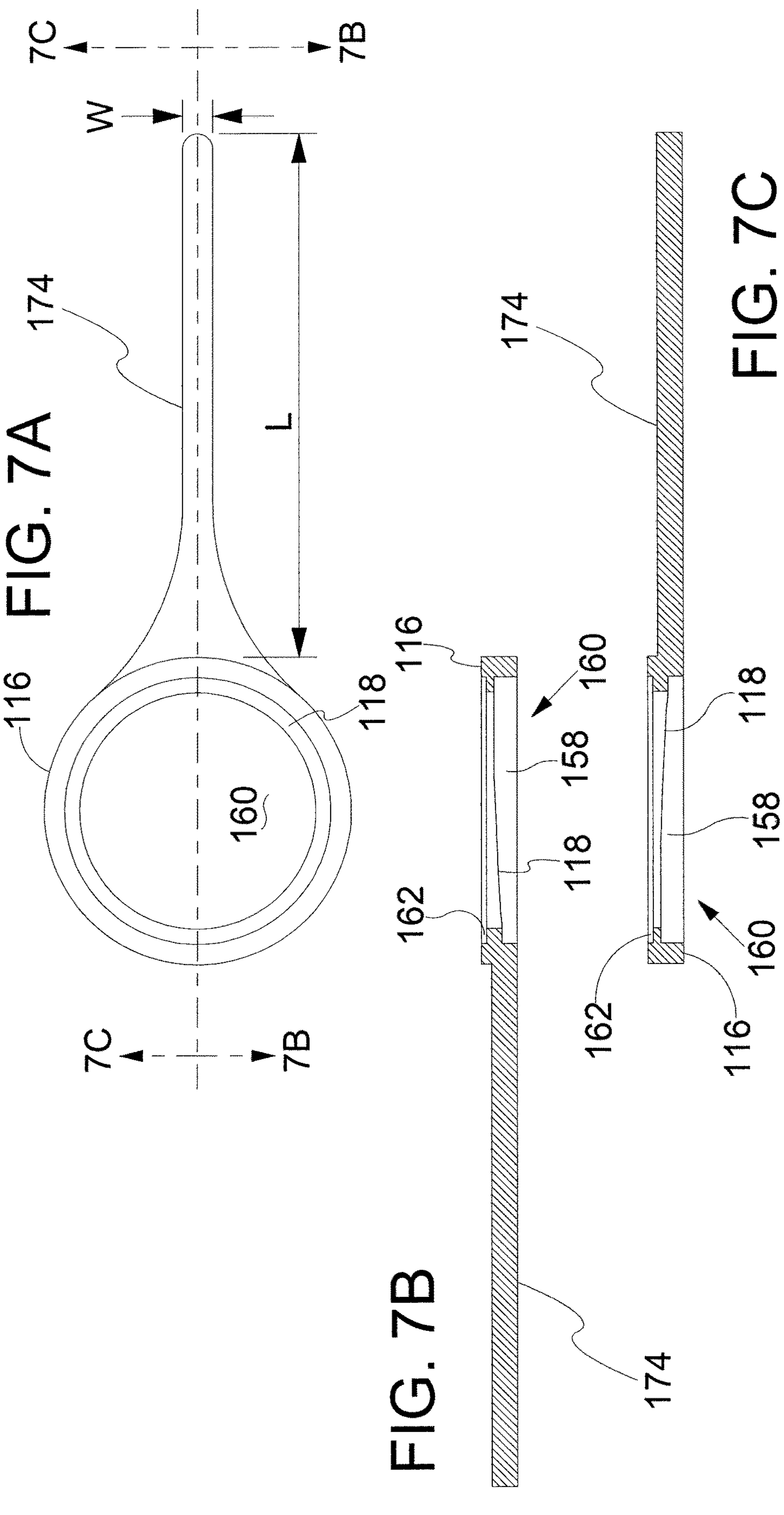
FIG. 7A is a plan view showing an annular body and a handle portion.
FIG. 7B is a cross-sectional view further illustrating the annular body shown in FIG. 7A. In the embodiment of FIG. 7B, the annular body and the handle portion have been cut along section line 7B-7B shown in FIG. 7A.
FIG. 7C is a cross-sectional view further illustrating the annular body shown in FIG. 7A. In the embodiment of FIG. 7C, the annular body and the handle portion have been cut along section line 7C-7C shown in FIG. 7A.

FIG. 7A is a plan view showing an annular body 116 and a handle portion 174 extending in a radial direction from the annular body 116. FIG. 7B and FIG. 7C are cross-sectional views further illustrating the annular body 116 shown in FIG. 7A. In the embodiment of FIG. 7B, the annular body 116 and the handle portion 174 have been cut along section line 7B-7B shown in FIG. 7A. In the embodiment of FIG. 7C, the annular body and the handle portion have been cut along section line 7C-7C shown in FIG. 7A. FIGS. 7A through 7C may be collectively referred to as FIG. 7. With reference to FIG. 7, it will be appreciated that the handle body 116 has a length L and a width W. In some example embodiments, the handle portion 174 has an elongate shape. In some embodiments, the handle portion 174 has an aspect ratio of length to width that is greater than 5. In some embodiments, the handle portion 174 has an aspect ratio of length to width that is greater than 10. In some embodiments, the handle portion 174 has an aspect ratio of length to width that is greater than 15.

Figures 8A, 8B:
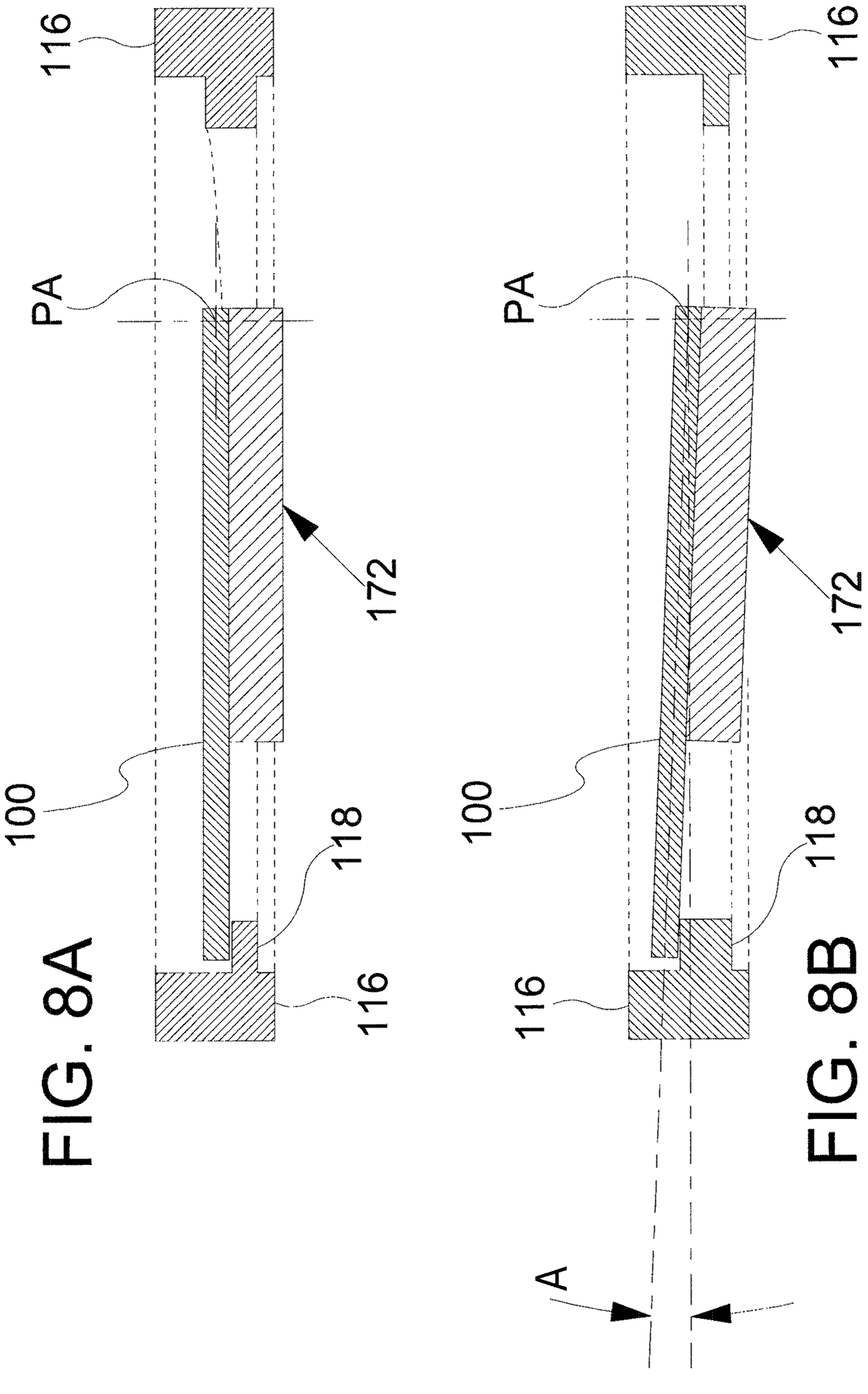
FIG. 8A and FIG. 8B are stylized diagrams illustrating a pivoting motion of a baseplate and magnet assembly.

FIG. 8A and FIG. 8B are stylized diagrams illustrating an example pivot motion of a baseplate 100 and a magnet assembly 172 relative to a camming rib 118 of an annular body 116. In the embodiment of FIG. 8A, the baseplate 100 and a magnet assembly 172 are generally parallel to a plane defined by forward facing surface of the annular body 116. By comparing the positions of the baseplate 100 and the magnet assembly 172 in FIG. 8B with the positions of those elements shown in FIG. 8A, it will be appreciated that the baseplate 100 and the magnet assembly 172 have pivoted about a pivot axis PA in the example embodiment of FIG. 8B.

Figure 9A:
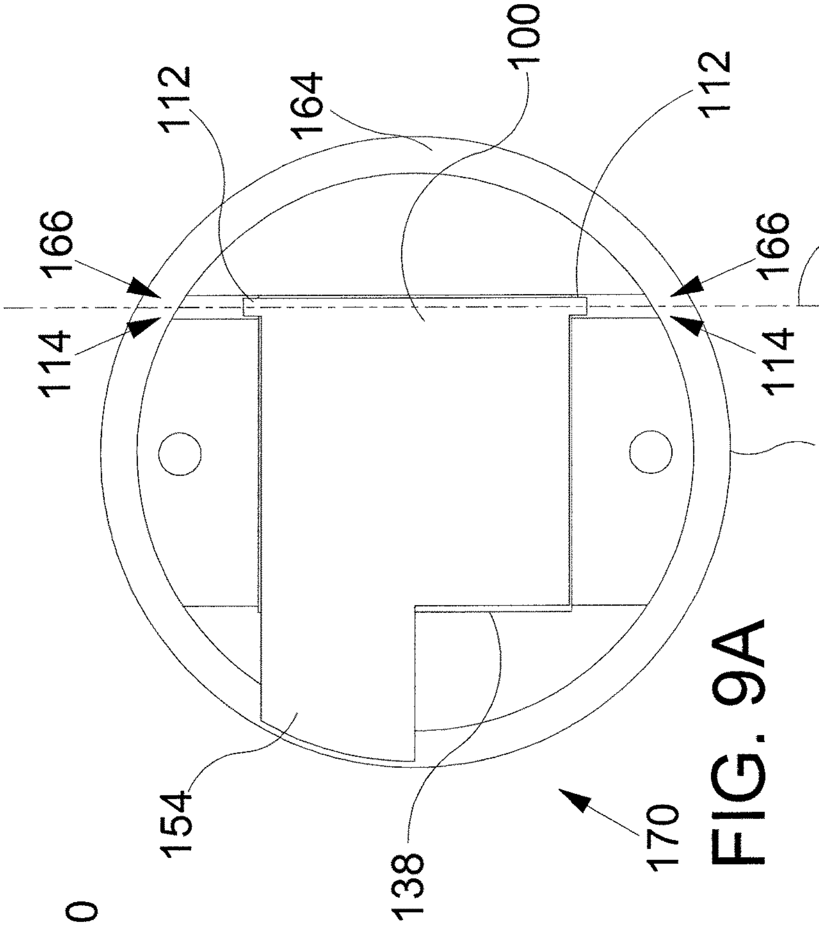
FIG. 9A through FIG. 9F are elevation and plan views showing six sides of an assembly including a baseplate, a magnetic sheet and a core housing.
Figure 9B:
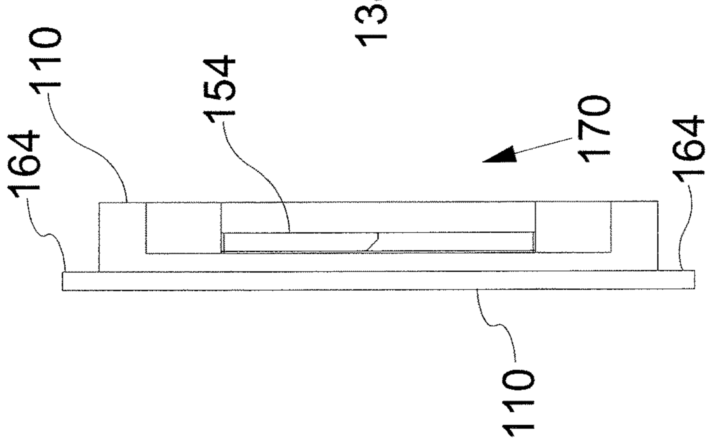
Figure 9C:
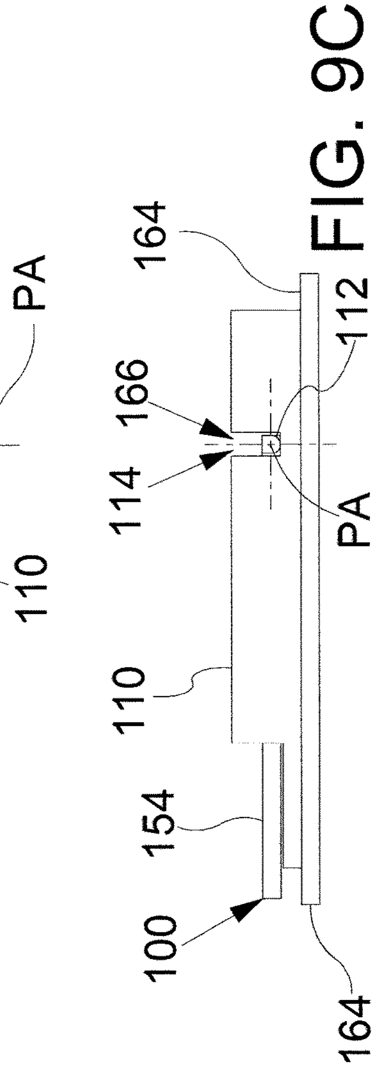
Figure 9D:
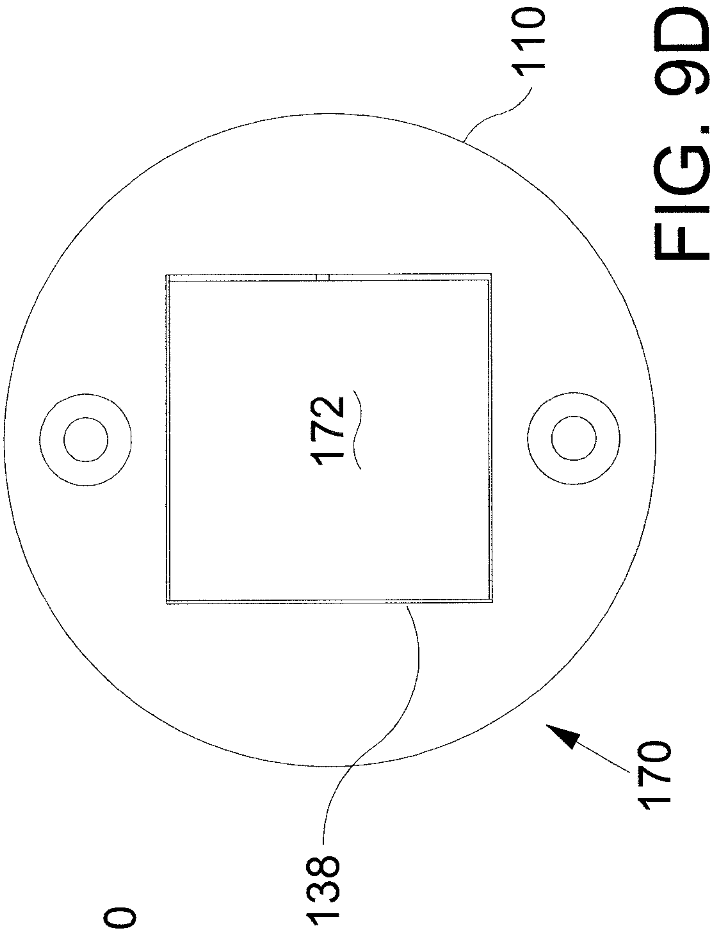
Figure 9E:
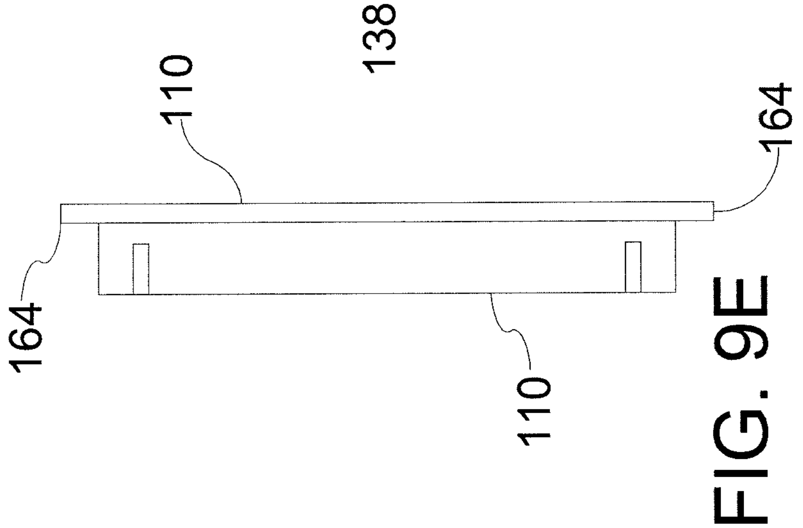
Figure 9F:
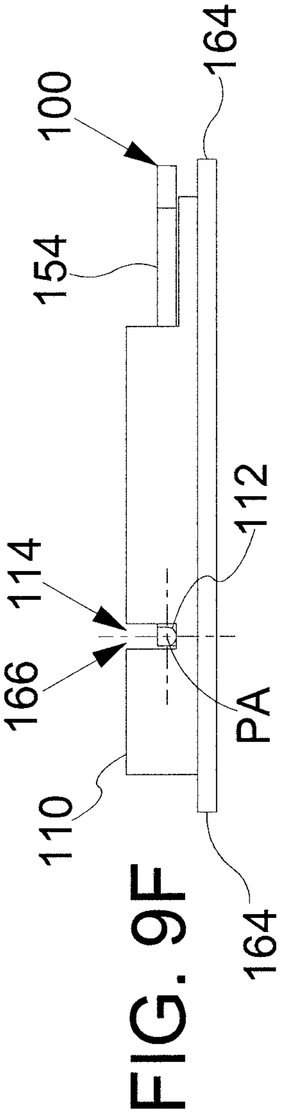

FIG. 9A through FIG. 9F are elevation and plan views showing six sides of an assembly 170. Engineer graphics textbooks generally refer to the process used to create views showing six sides of a three-dimensional object as multiview projection or orthographic projection. It is customary to refer to multiview projections using terms such as front view, right side view, top view, rear view, left side view, and bottom view. In accordance with this convention, FIG. 9A may be referred to as a front view of the assembly 170, FIG. 9B may be referred to as a left side view of the assembly 170, and FIG. 9C may be referred to as a top view of the assembly 170. FIG. 9A through FIG. 9F may be referred to collectively as FIG. 9. Terms such as front view and top view are used herein as a convenient method for differentiating between the views shown in FIG. 9. It will be appreciated that the elements shown in FIG. 9 may assume various orientations without deviating from the spirit and scope of this detailed description. Accordingly, the terms front view, right side view, top view, rear view, left side view, bottom view, and the like should not be interpreted to limit the scope of the invention recited in the attached claims. FIG. 9D may be referred to as a rear view of the assembly 170, FIG. 9E may be referred to as a right side view of the assembly 170, and FIG. 9F may be referred to as a bottom view of the assembly 170.

In the example embodiment of FIG. 9, the assembly 170 comprises a core housing 110 defining a pocket 138, a magnet assembly 172 disposed in the pocket 138, and a baseplate 100 fixed to the magnet assembly 172. The baseplate 100 includes a tab portion 154 that extends beyond a periphery of the magnet assembly 172 in the example embodiment of FIG. 9. The baseplate 100 includes a pivot portion 112 that engages a corresponding portion 114 of the core housing 110 to form a hinge joint 166 such that the baseplate 100 and the magnet assembly 172 selectively pivot about a pivot axis PA of the hinge joint 166 relative to the core housing 110.

Figure 10:
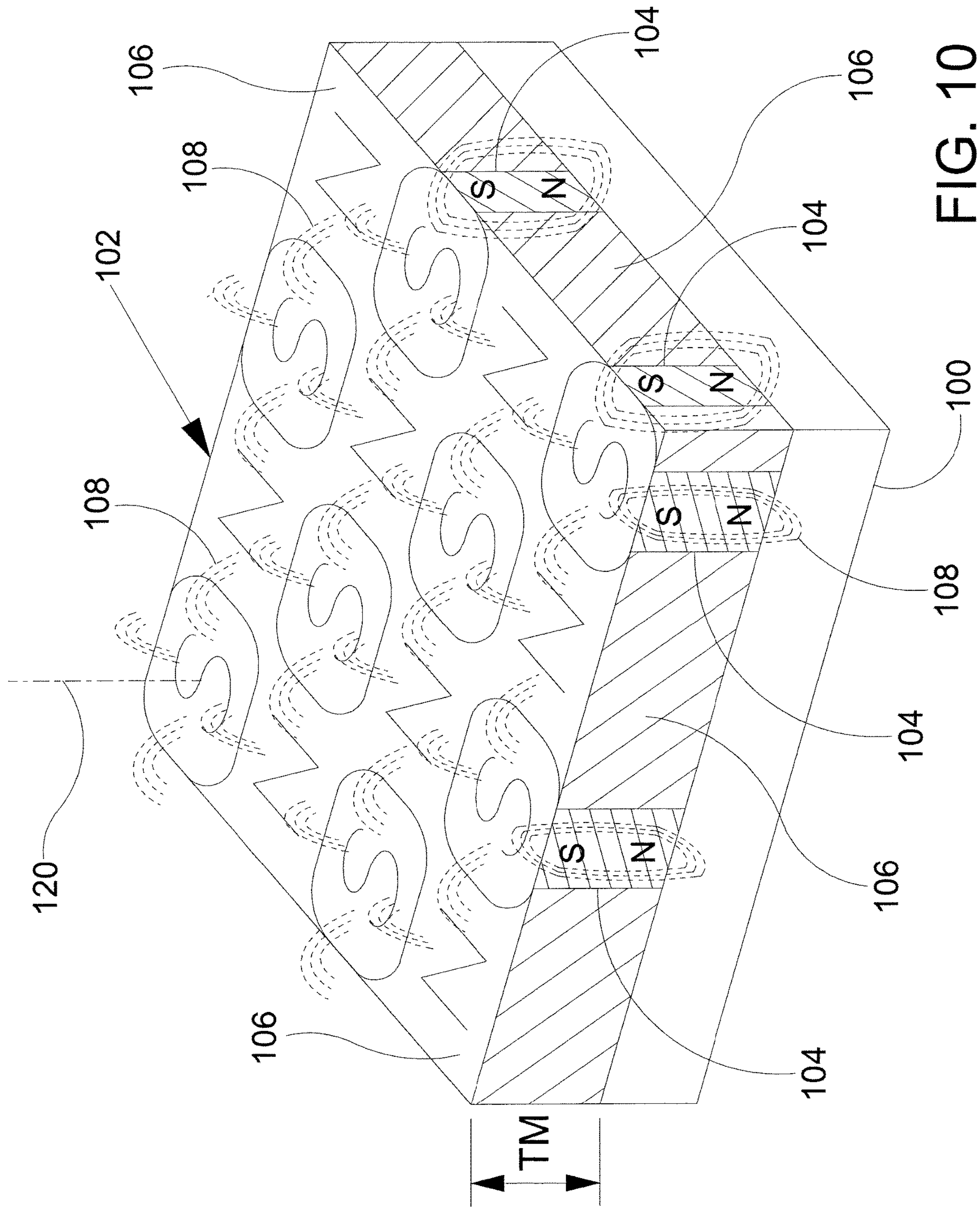
FIG. 10 is a stylized isometric view of an assembly including a baseplate and a magnetic sheet overlaying a major surface of the baseplate.

FIG. 10 is a stylized isometric view of an assembly including a baseplate 100 and a magnetic sheet 102 overlaying a major surface of the baseplate 100. The magnetic sheet 102 includes a plurality of island portions 104 with interstitial portions 106 of the magnetic sheet 102 disposed about each island portion 104. Each island portion 104 has a north pole N and a south pole S. In FIG. 10, magnetic flux 108 of each island portion 104 is shown flowing through the north pole N and the south pole S of the respective island portion 104. A magnetic axis 120 of each island portion 104 extends through the north pole N and the south pole S of the respective island portion 104. Each magnetic axis 120 is generally orthogonal to the faces of the magnetic sheet 102. The north pole N and the south pole S of each island portion 104 are positioned so that each island has a first magnetic polarity. The interstitial portions 106 of the magnetic sheet 102 have a second magnetic polarity that is the opposite of the first magnetic polarity. With reference to FIG. 10, it will be appreciated that the magnetic sheet 102 has a magnet thickness TM. The magnet thickness TM of the magnetic sheet 102 is illustrated using dimension lines in FIG. 10.

Figure 11:
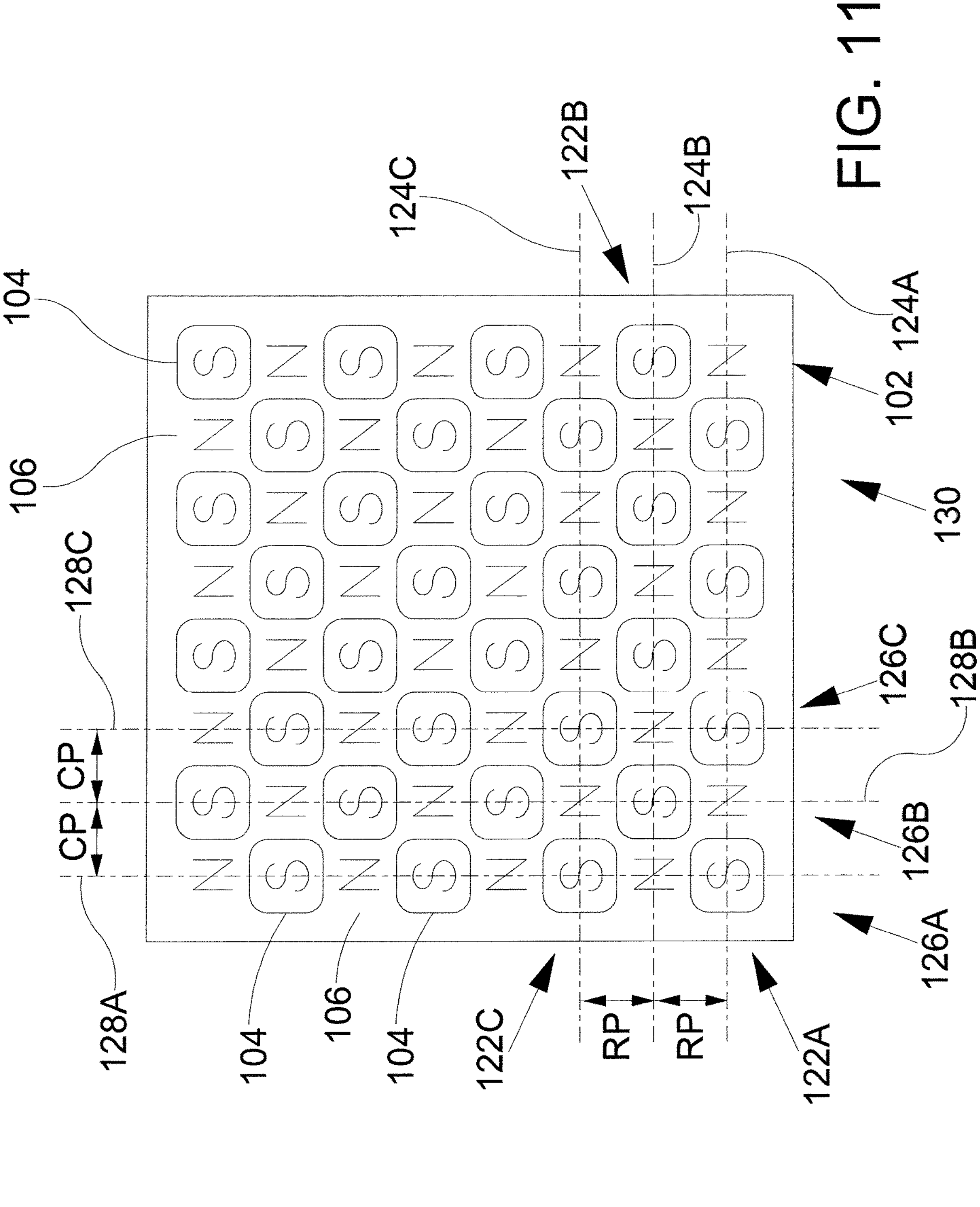
FIG. 11 is a stylized plan view of the assembly shown in FIG. 10. The assembly shown in FIG. 10 includes the magnetic sheet overlaying a major surface of the baseplate (visible in FIG. 10).

FIG. 11 is a stylized plan view of the assembly shown in FIG. 3. The assembly includes the magnetic sheet 102 overlaying a major surface of the baseplate 100 (visible in FIG. 3). With reference to FIG. 11 it will be appreciated that the magnetic sheet 102 includes a plurality of island portions 104 with interstitial portions 106 disposed about each island portion 104. In FIG. 11, the island portions 104 can be seen forming an array 130 across the face of the magnetic sheet 102. The plurality of island portions 104 include a first row 122A of island portions 104 aligned along a first row line 124A, a second row 122B of island portions 104 aligned along a second row line 124B, and a third row 122C of island portions 104 aligned along a third row line 124C. The plurality of island portions 104 also include a first column 126A of island portions 104 aligned along a first column line 128A, a second column 126B of island portions 104 aligned along a second column line 128B, and a third column 126C of island portions 104 aligned along a third column line 128C. In the embodiment of FIG. 11, the array 130 of island portions 104 includes a plurality of rows and a plurality of columns. It is noted that the island portions 104 may be arranged in other patterns without deviating from the spirit and scope of this detailed description.

In some useful embodiments, the array 130 of island portions 104 in the magnetic sheet 102 is configured and dimensioned to produce magnetic flux 108 (illustrated in FIGS. 10 and 12) within an effective zone that is relatively thin. Concentrating the magnetic flux within a relatively thin effective zone may maximize the magnetic attraction produced between the magnetic sheet 102 and a thin item such as a ferromagnetic foil or layers of ferromagnetic paint. In the embodiment of FIG. 11, adjacent columns are separated from one another by a column pitch distance CP. The column pitch distance CP is illustrated using dimension lines extending between adjacent column lines in FIG. 11. In some useful embodiments, an aspect ratio of the column pitch CP to the magnet thickness TM of the magnetic sheet 102 is between about 5 and about 1. In some useful embodiments, an aspect ratio of the column pitch CP to the magnet thickness TM of the magnetic sheet 102 is between about 4 and about 2.

In the embodiment of FIG. 11, adjacent rows are separated from one another by a row pitch distance RP. The row pitch distance RP is illustrated using dimension lines extending between adjacent row lines in FIG. 11. In some useful embodiments, an aspect ratio of the row pitch RP to the magnet thickness TM of the magnetic sheet 102 is between about 5 and about 1. In some useful embodiments, an aspect ratio of the row pitch RP to the magnet thickness TM of the magnetic sheet 102 is between about 4 and about 2. In the example embodiment of FIG. 11, the row pitch RP is approximately equal to the column pitch CP.

Figure 12:
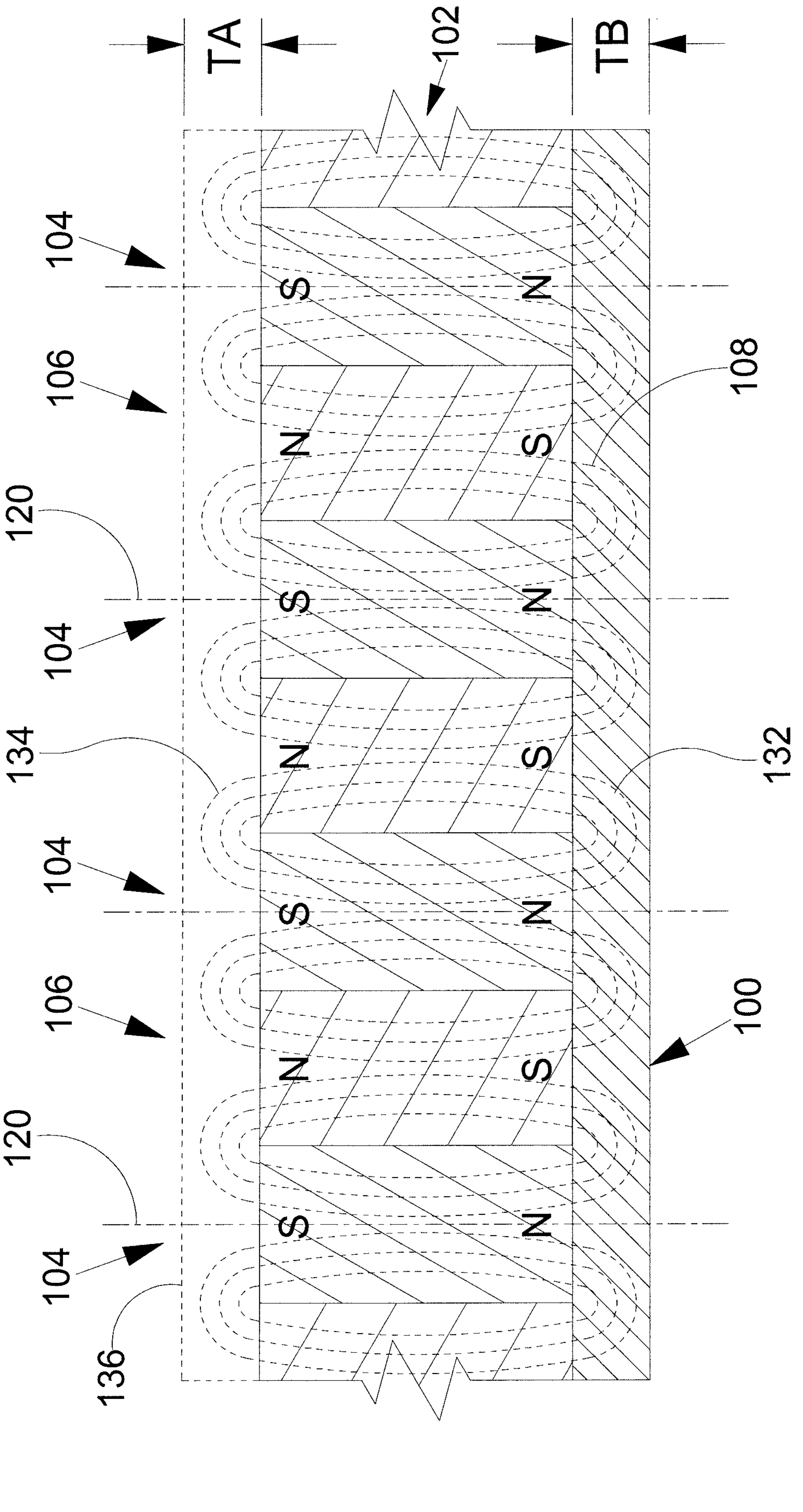
FIG. 12 is a stylized cross-sectional view of the assembly shown in FIGS. 10 and 11.

FIG. 12 is a stylized cross-sectional view of the assembly shown in FIGS. 3 and 4. The assembly includes a magnetic sheet 102 and a baseplate 100. The magnetic sheet 102 includes a plurality of island portions 104 with interstitial portions 106 of the magnetic sheet 102 disposed about each island portion 104. Each island portion 104 has a north pole N and a south pole S. A magnetic axis 120 of each island portion 104 extends through the north pole N and the south pole S of the respective island portion 104. Each magnetic axis 120 is generally orthogonal to the faces of the magnetic sheet 102. The north pole N and the south pole S of each island portion 104 are positioned so that each island has a first magnetic polarity. The interstitial portions 106 of the magnetic sheet 102 have a second magnetic polarity that is the opposite of the first magnetic polarity.

Each island portion 104 has magnetic flux 108 flowing through the north pole N and the south pole S thereof. With reference to FIG. 12, it will be appreciated that a first portion 132 of the magnetic flux 108 of each island portion 104 flows through the baseplate 100 and a second portion 134 of the magnetic flux 108 of each island portion 104 flows through an effective zone 136 of the magnetic sheet 102. In the embodiment of FIG. 12, the second portion 134 has a shape that is generally a mirror image of the shape of the first portion 132. Ferromagnetic items positioned to extend into the effective zone 136 of the magnetic sheet 102 will be magnetically attracted to the magnetic sheet 102. Ferromagnetic items located outside of the effective zone 136 will not be magnetically attracted to the magnetic sheet 102.

With reference to FIG. 12, it will be appreciated that the effective zone 136 has a first thickness TA and the baseplate 100 has a second thickness TB. In the embodiment of FIG. 12, the first thickness TA is generally equal to the second thickness TB. In some useful embodiments, the magnetic sheet 102 and the baseplate 100 are configured and dimensioned to produce magnetic flux 108 within an effective zone 136 that is relatively thin. Concentrating the magnetic flux within a relatively thin effective zone 136 may maximize the magnetic attraction produced between the magnetic sheet 102 and a thin item such as a ferromagnetic foil or layers of ferromagnetic paint. In some useful embodiments, the magnetic sheet 102 has a thickness of about 0.040 inches and the baseplate 100 has a thickness of about 0.015 inches. In some useful embodiments, the magnetic sheet 102 has a thickness of about 0.0625 inches and the baseplate 100 has a thickness of about 0.048 inches.

Referring to FIGS. 1-12, in embodiments, a device for detachable attachment to a ferromagnetic surface comprises a core housing 110 defining a pocket 138, a magnet assembly 172 disposed in the pocket 138, and a baseplate 100 fixed to the magnet assembly 172. In some embodiments, the baseplate 100 includes a tab portion 154 that extends beyond a periphery of the magnet assembly 172. In some embodiments, the baseplate 100 also includes a pivot portion 112 that engages a corresponding portion 114 of the core housing 110 to form a hinge joint 166 such that the baseplate 100 and the magnet assembly 172 selectively pivot about a pivot axis PA of the hinge joint 166 relative to the core housing 110.

In some embodiments, an annular body 116 is disposed about the core housing 110 such that the annular body 116 is rotatable about a rotational axis RA relative to the core housing 110. In some embodiments, the annular body 116 defines a cavity 160 and the annular body 116 includes a camming rib 118 that extends radially inward into the cavity 160. In some embodiments, the camming rib 118 applies a camming force to the tab portion 154 of the baseplate 100 upon rotation of the annular body 116 relative to the core housing 110 and the camming force urges the magnet assembly 172 and the baseplate 100 to pivot about the pivot axis PA of the hinge joint 166.

In some embodiments, the device includes a cap member 156 that is fixed to the core housing 110 with the camming rib 118 disposed between the cap member 156 and a flange portion 164 of the core housing 110. In some embodiments, the annular body 116 defines a counterbore 162 and the flange portion 164 of the core housing 110 is disposed at least partially in the counterbore 162 defined by the annular body 116. In some embodiments, the annular body 116 defines a relief 158 and a portion of the cap member is disposed in the relief 158 defined by the annular body 116. In some embodiments, the annular body 116 has a counterbore 162 opening in a first direction, a relief 158 opening in a second direction, and a camming rib 118 disposed between the counterbore 162 and the relief 158. In some embodiments, the cap member 156 has a disk-shaped body. In some embodiments, the cap member 156 has a circular shape when viewed as an orthographic projection.

Still referring to FIGS. 1-12, in embodiments, the baseplate 100 comprises a baseplate wall 140 having a forward facing surface 142, a rearward facing surface 144, and a wall thickness extending between the forward facing surface 142 and the rearward facing surface 144. In embodiments, the magnetic sheet 102 is positioned to overlay the rearward facing surface 144 of the baseplate wall 140. In embodiments, the magnetic sheet 102 has a forward face 146, a rearward face 148, and a sheet thickness extending between the forward face 146 and the rearward face 148. In embodiments, the magnetic sheet 102 comprises a plurality of island portions 104 with interstitial portions 106 of the magnetic sheet 102 disposed about each island portion 104. In embodiments, each island portion 104 has a north pole and a south pole and magnetic flux 108 flows through the north pole and the south pole of each island portion. In embodiments, the poles of each island portion 104 defining a magnetic axis 120 extending through the island portion 104. In embodiments, each magnetic axis 120 is generally orthogonal to the faces of the magnetic sheet 102. In embodiments, the north pole and the south pole of each island portion 104 are positioned so that each island portion has a first magnetic polarity and the interstitial portions 106 of the magnetic sheet 102 have a second magnetic polarity that is opposite the first magnetic polarity.

Still referring to FIGS. 1-12, in embodiments, the baseplate 100 comprises a ferromagnetic material so that a first portion of the magnet flux flows through the baseplate 100. In embodiments, a second portion 134 of the magnetic flux 108 flows through an effective zone 136 opposite a forward face 146 of the magnetic sheet 102, the second portion 134 of the magnetic flux 108 having a shape that is a mirror image of a first shape of the first portion 132 of the magnetic flux 108. In embodiments, the effective zone 136 has an effective zone thickness and ferromagnetic items located outside the effective zone are not attracted to the magnetic sheet. In embodiments, the effective zone 136 has an effective zone thickness and ferromagnetic items located partially or completely in the effective zone are attracted to the magnetic sheet 102.

Referring to FIGS. 2 through 5, an upward direction Z and a downward or lower direction −Z are illustrated using arrows labeled "Z" and "−Z," respectively. A forward direction Y and a rearward direction −Y are illustrated using arrows labeled "Y" and "−Y," respectively. A first lateral direction X and a second lateral direct −X are illustrated using arrows labeled "X" and "−X," respectively. The directions illustrated using these arrows are applicable to the apparatus shown and discussed throughout this application. The second lateral direction may also be referred to as a left direction and/or the second lateral direction. The first lateral direction may also be referred to as a right direction. In one or more embodiments, the upward direction is generally opposite the downward direction. In one or more embodiments, the upward direction and the downward direction are both generally orthogonal to an XY plane defined by the forward direction and the first lateral direction. In one or more embodiments, the forward direction is generally opposite the rearward direction. In one or more embodiments, the forward direction and the rearward direction are both generally orthogonal to a ZX plane defined by the upward direction and the first lateral direction. In one or more embodiments, the first lateral direction is generally opposite the second lateral direction. In one or more embodiments, first lateral direction and the second lateral direction are both generally orthogonal to a ZY plane defined by the upward direction and the forward direction. Various direction-indicating terms are used herein as a convenient way to discuss the objects shown in the figures. It will be appreciated that many direction indicating terms are related to the instant orientation of the object being described. It will also be appreciated that the objects described herein may assume various orientations without deviating from the spirit and scope of this detailed description. Accordingly, direction-indicating terms such as "upwardly," "downwardly," "forwardly," "backwardly," should not be interpreted to limit the scope of the invention recited in the attached claims.

Figure 13:
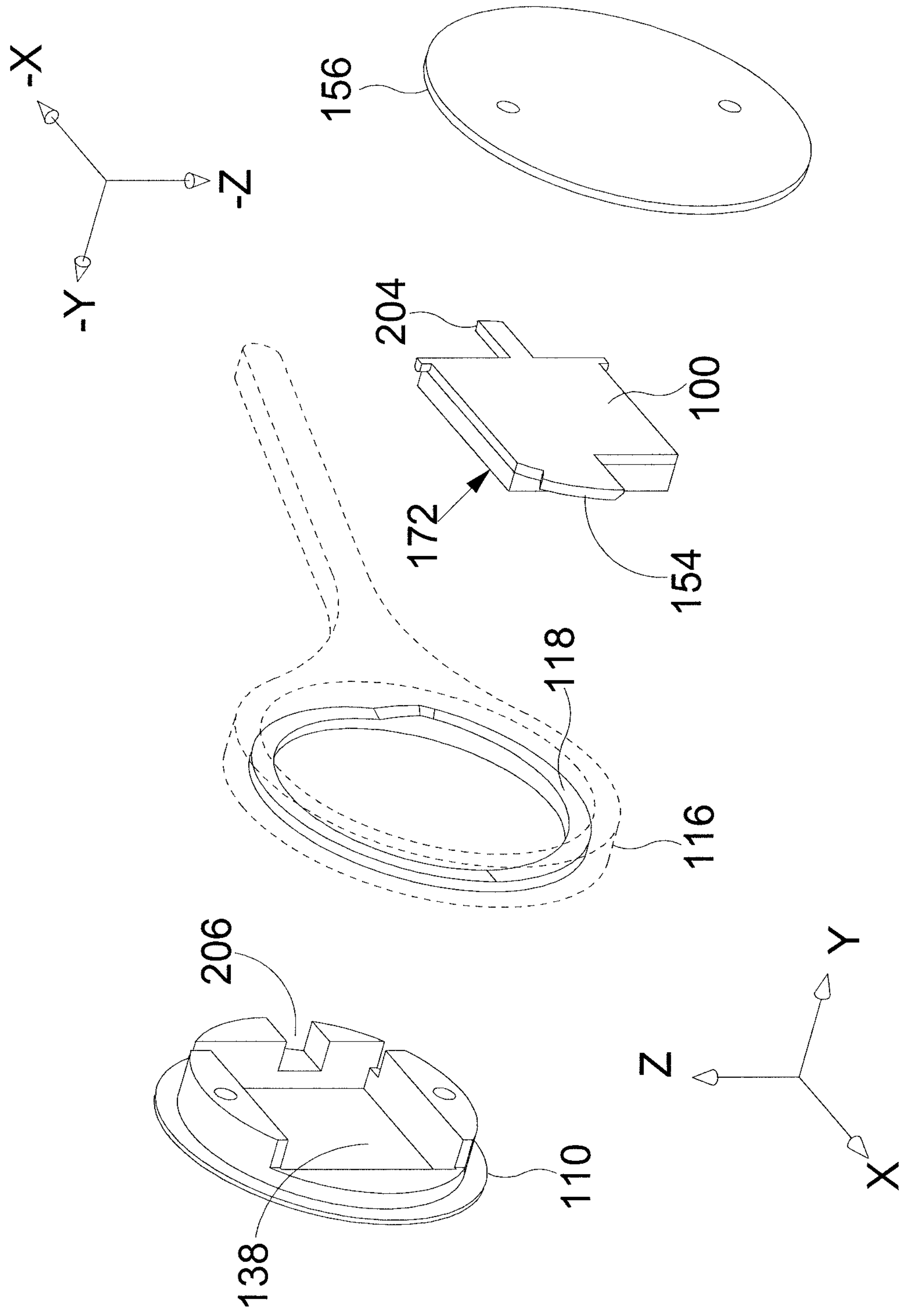
FIGS. 13 and 14 are exploded perspective views showing a detachable magnet device in accordance with an additional example embodiment.
Figure 14:
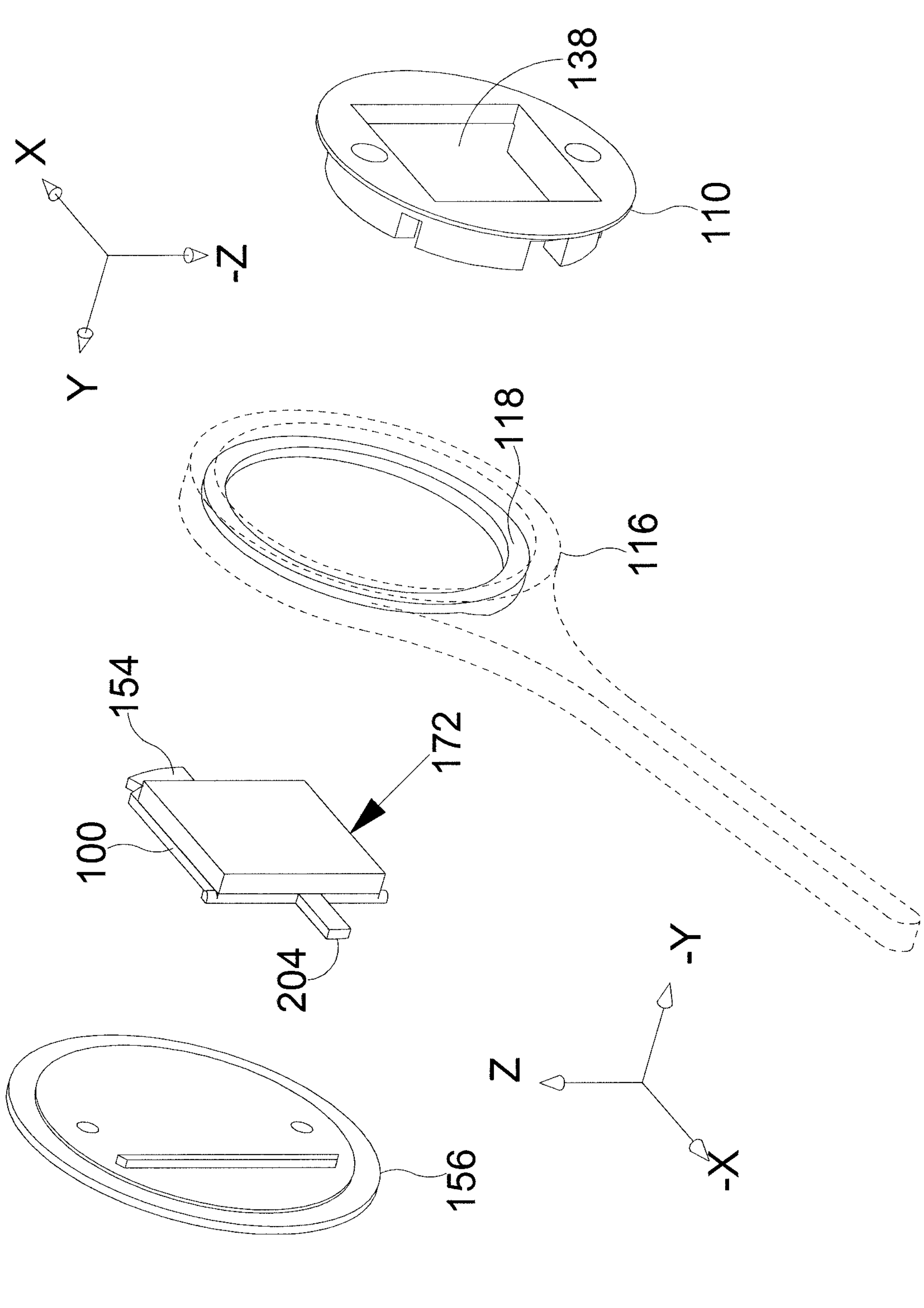

FIGS. 13 and 14 are exploded perspective views showing a detachable magnet device in accordance with an additional example embodiment. In the example embodiment of FIGS. 13 and 14, the detachable magnet device comprises a core housing 110 defining a pocket 138, a magnet assembly 172 that is received in the pocket 138, and a baseplate 100 that is fixed to the magnet assembly 172. In the example embodiment of FIGS. 13 and 14, baseplate 100 includes a lug portion 204. The lug portion 204 of the baseplate is received in a channel 206 defined by the core housing 110 in the example embodiment of FIGS. 13 and 14. In the example embodiment of FIGS. 13 and 14, the baseplate 100 includes a tab portion 154 that extends beyond a periphery of the magnet assembly 172. Also in the example embodiment of FIGS. 13 and 14, the baseplate 100 also includes a pivot portion 112 that is received in a corresponding portion 114 of the core housing 110 to form a hinge joint such that the baseplate 100 and the magnet assembly 172 selectively pivot relative to the core housing 110.

In the example embodiment of FIGS. 13 and 14, the device includes a cap member 156 that can be fixed to the core housing 110 with the camming rib 118 disposed between the cap member 156 and a flange portion 164 of the core housing 110. In the example embodiment of FIGS. 13 and 14, the annular body 116 defines a counterbore 162 and the flange portion 164 of the core housing 110 is disposed at least partially in the counterbore 162 defined by the annular body 116 when the device is assembled. Also in the example embodiment of FIGS. 13 and 14, the annular body 116 defines a relief 158 and a portion of the cap member is disposed in the relief 158 defined by the annular body 116 when the device is assembled. In some embodiments, the annular body 116 has a counterbore 162 opening in a first direction, a relief 158 opening in a second direction, and a camming rib 118 disposed between the counterbore 162 and the relief 158. In some embodiments, the cap member 156 has a disk-shaped body. In some embodiments, the cap member 156 has a circular shape when viewed as an orthographic projection.

Figures 15A, 15B, 15C:
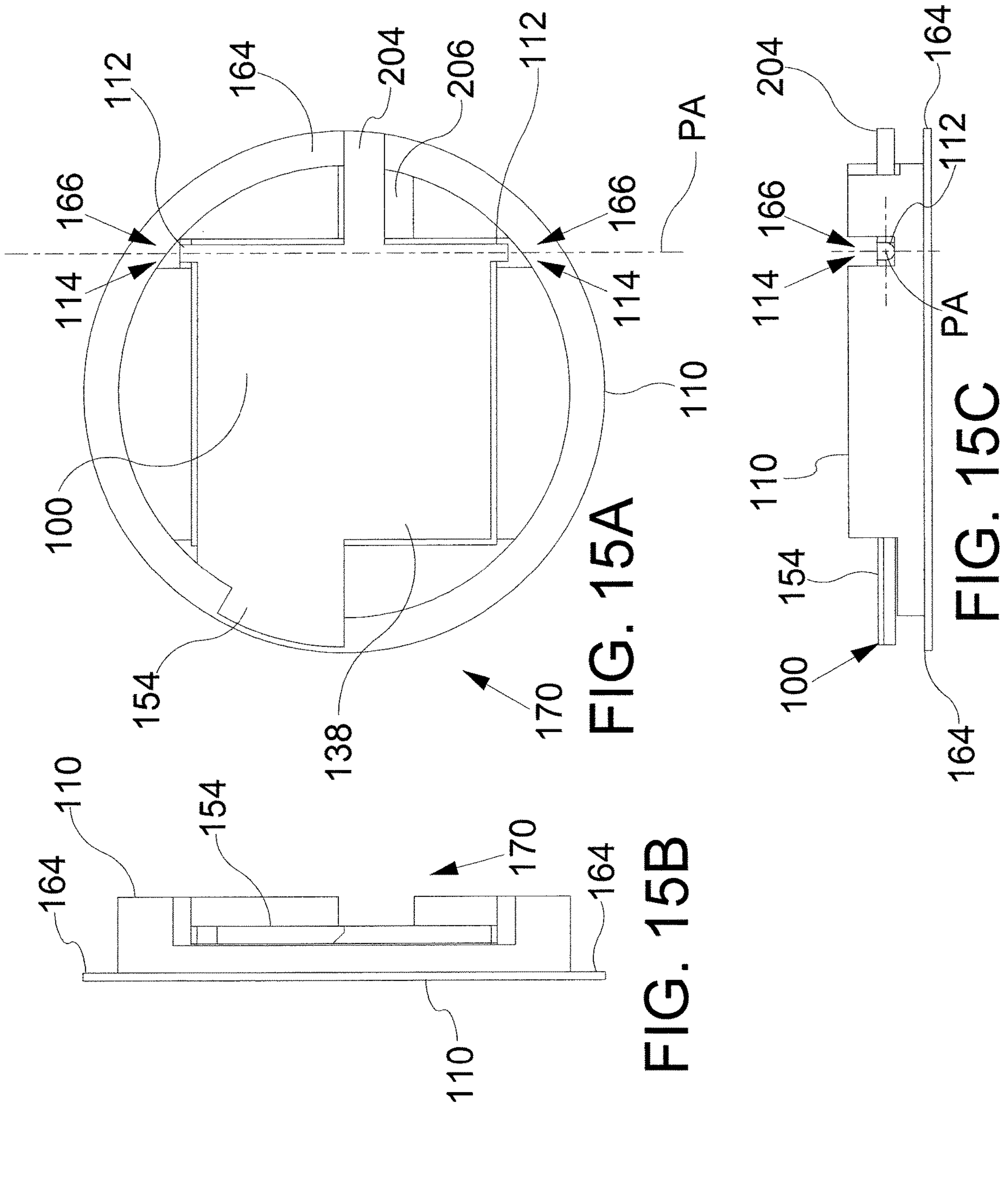
FIG. 15A through FIG. 15F are elevation and plan views showing six sides of an assembly including a baseplate, a magnetic sheet and a core housing.
Figure 15F:
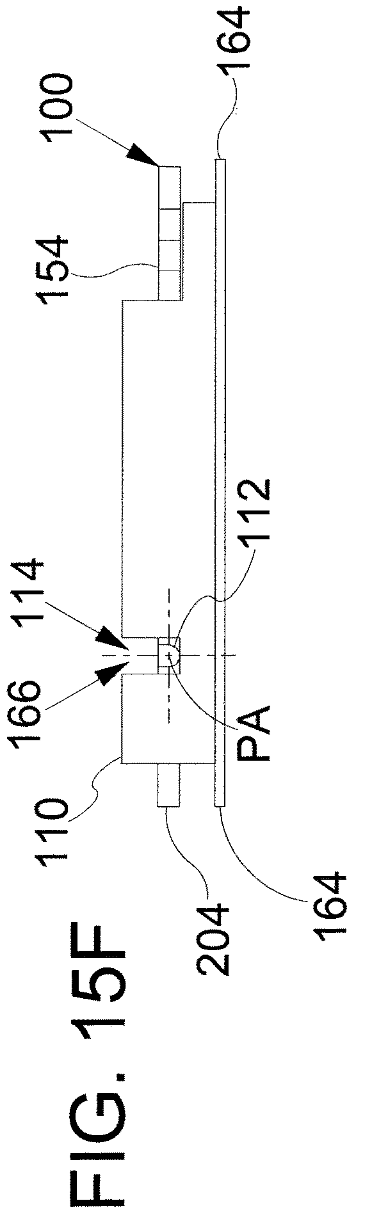
Figure 15D:
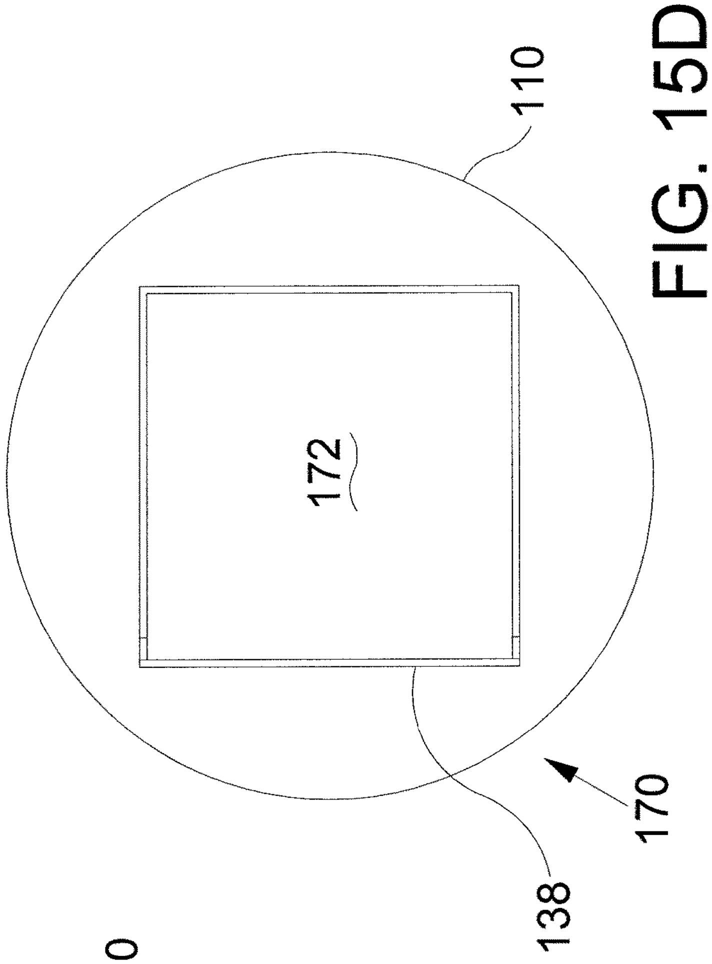
Figure 15E:
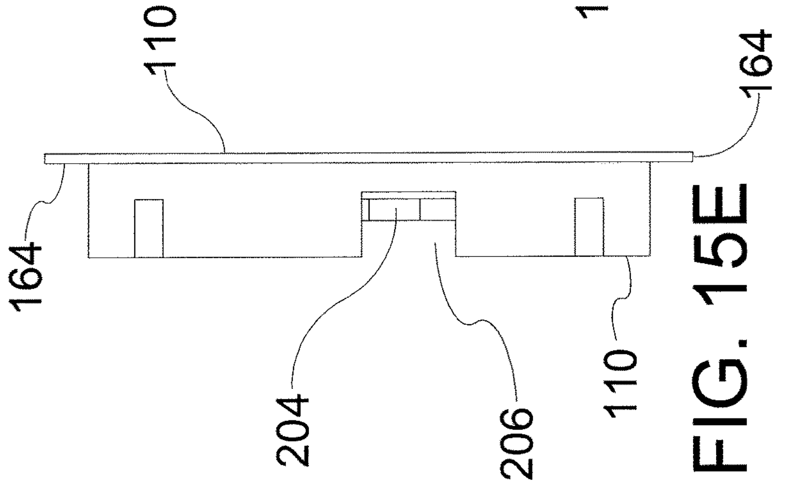
Figure 16:
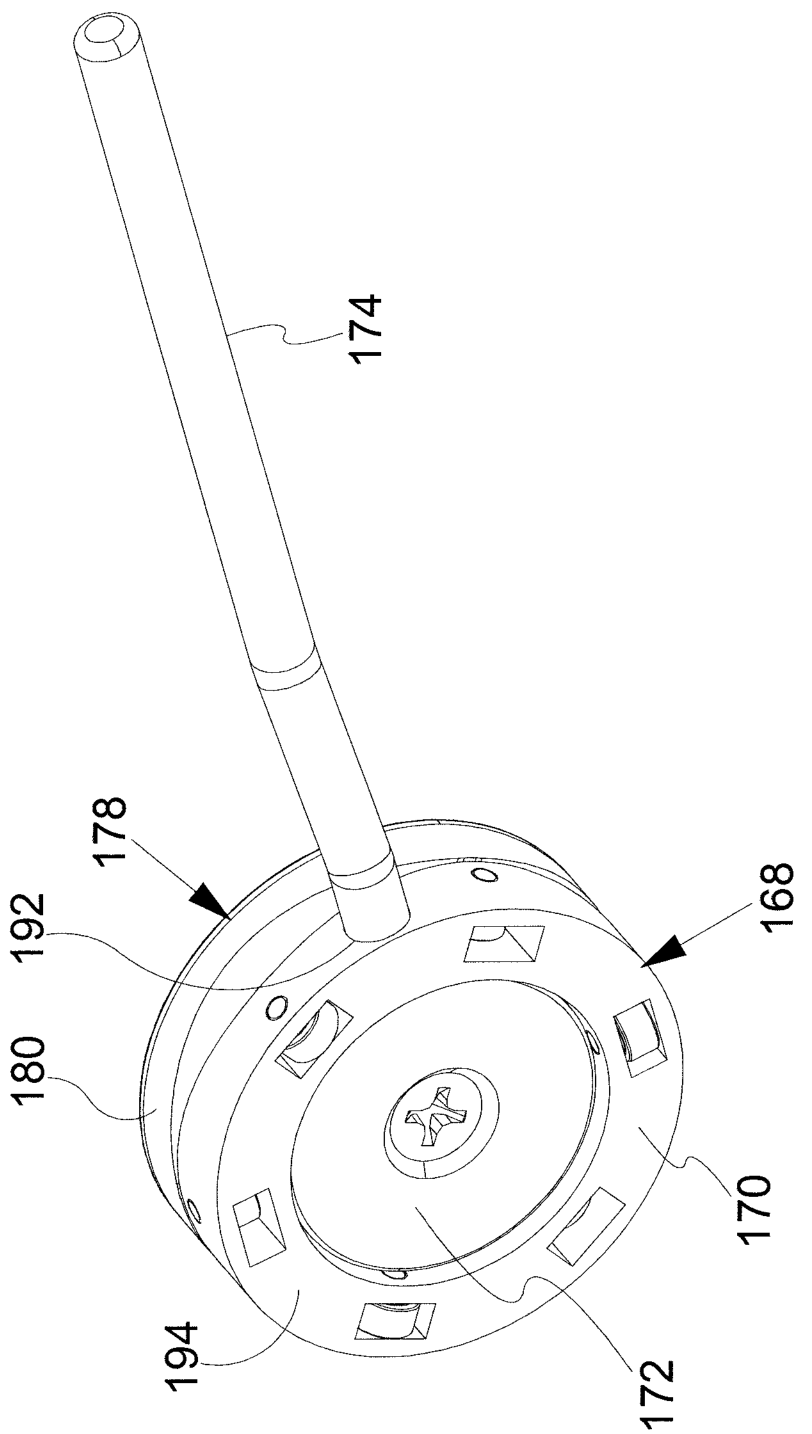
FIG. 16 is a perspective view showing a detachable magnet device in accordance with an additional example embodiment.
Figure 17:
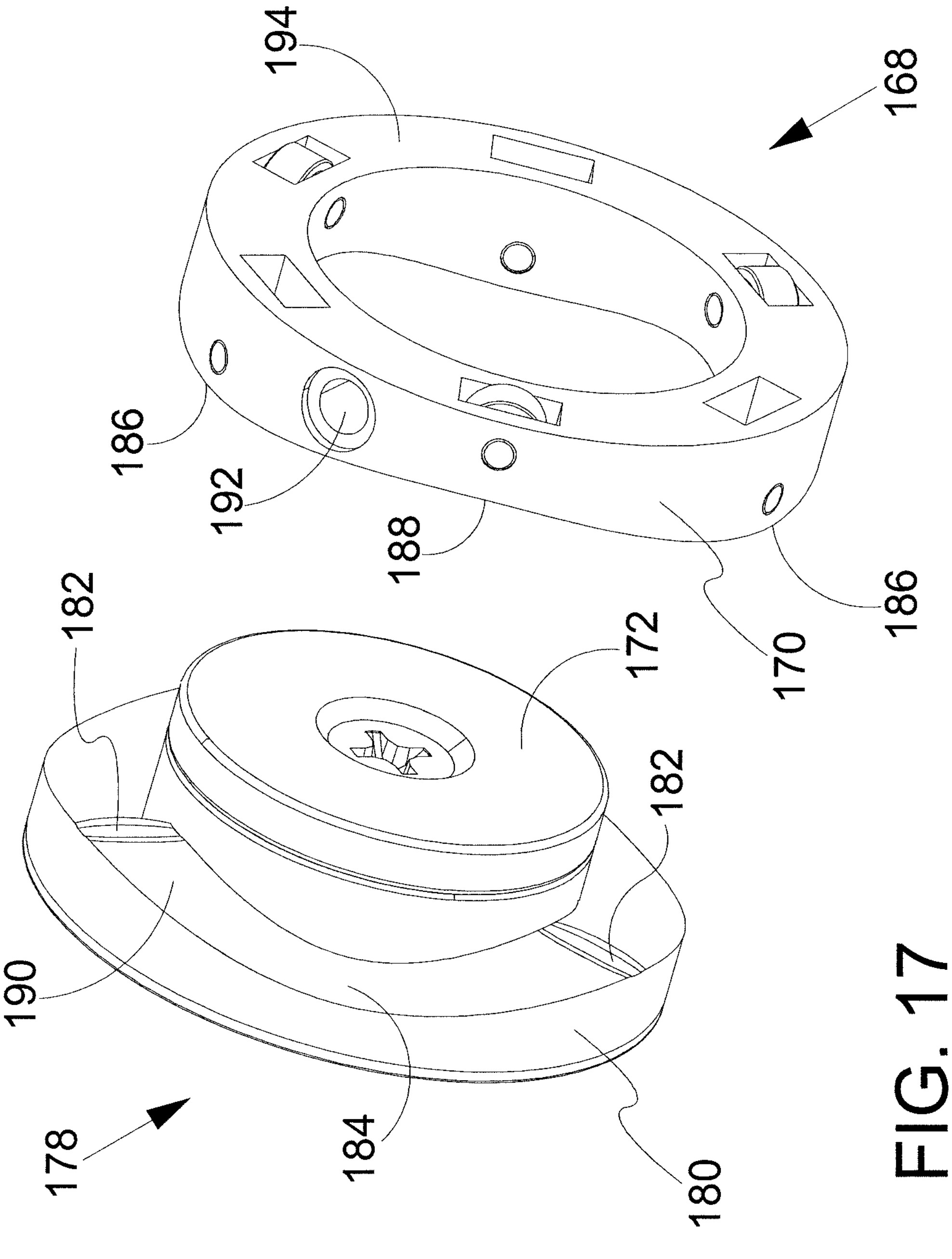
FIG. 17 is an exploded perspective view further illustrating the detachable magnet device shown in FIG. 16.
Figure 18:
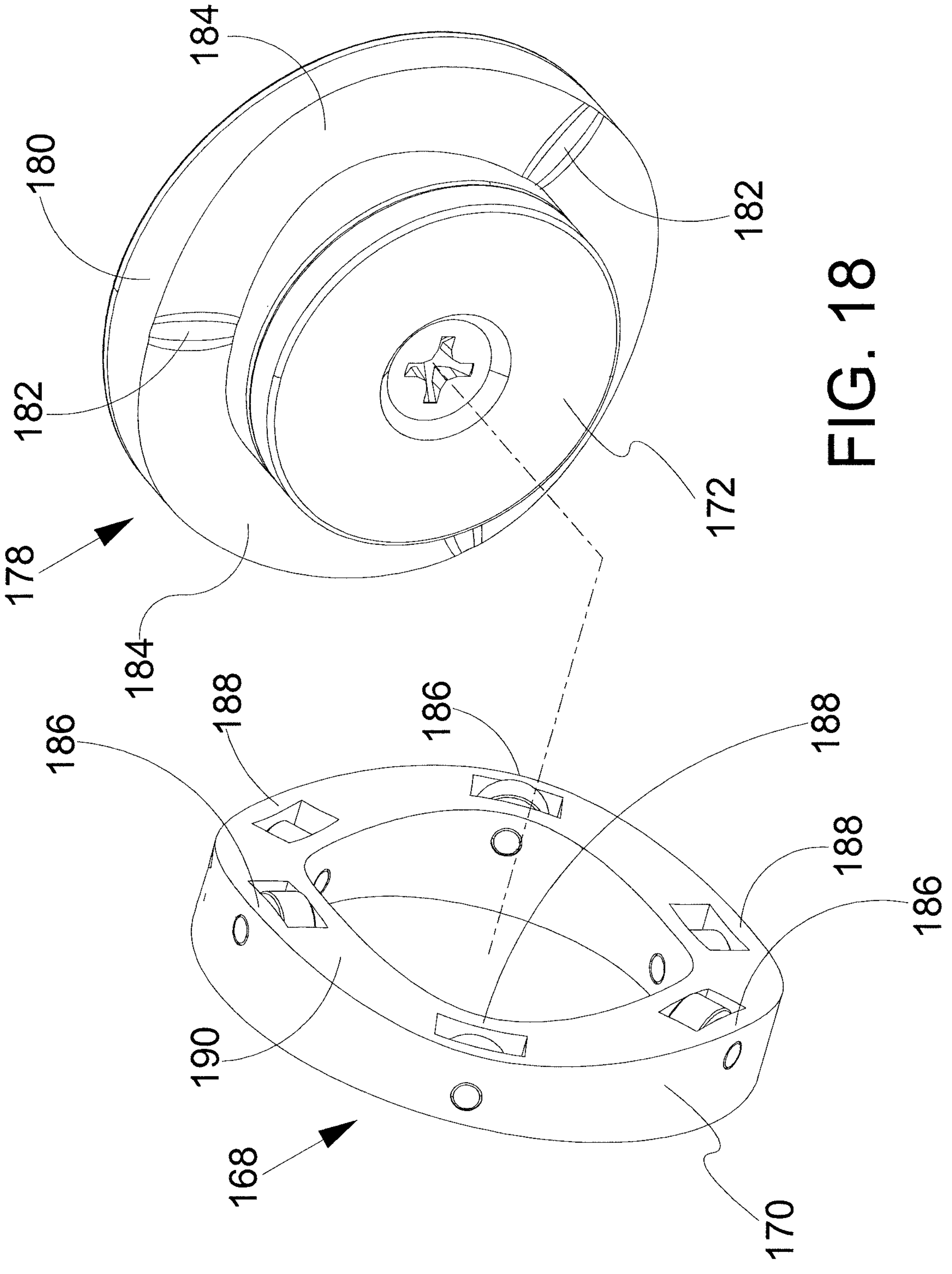
FIG. 18 is an exploded perspective view further illustrating the detachable magnet device shown in FIG. 16.

FIG. 15A through FIG. 15F are elevation and plan views showing six sides of an assembly 170. Engineer graphics textbooks generally refer to the process used to create views showing six sides of a three-dimensional object as multiview projection or orthographic projection. It is customary to refer to multiview projections using terms such as front view, right side view, top view, rear view, left side view, and bottom view. In accordance with this convention, FIG. 15A may be referred to as a front view of the assembly 170, FIG. 15B may be referred to as a left side view of the assembly 170, and FIG. 15C may be referred to as a top view of the assembly 170. FIG. 15A through FIG. 15F may be referred to collectively as FIG. 15. Terms such as front view and top view are used herein as a convenient method for differentiating between the views shown in FIG. 15. It will be appreciated that the elements shown in FIG. 15 may assume various orientations without deviating from the spirit and scope of this detailed description. Accordingly, the terms front view, right side view, top view, rear view, left side view, bottom view, and the like should not be interpreted to limit the scope of the invention recited in the attached claims. FIG. 15D may be referred to as a rear view of the assembly 170, FIG. 15E may be referred to as a right side view of the assembly 170, and FIG. 15F may be referred to as a bottom view of the assembly 170.

In the example embodiment of FIG. 15, the assembly 170 comprises a core housing 110 defining a pocket 138, a magnet assembly 172 disposed in the pocket 138, and a baseplate 100 fixed to the magnet assembly 172. The baseplate 100 includes a tab portion 154 that extends beyond a periphery of the magnet assembly 172 in the example embodiment of FIG. 15. The baseplate 100 includes a pivot portion 112 that engages a corresponding portion 114 of the core housing 110 to form a hinge joint 166 such that the baseplate 100 and the magnet assembly 172 selectively pivot about a pivot axis PA of the hinge joint 166 relative to the core housing 110.

Figure 19:
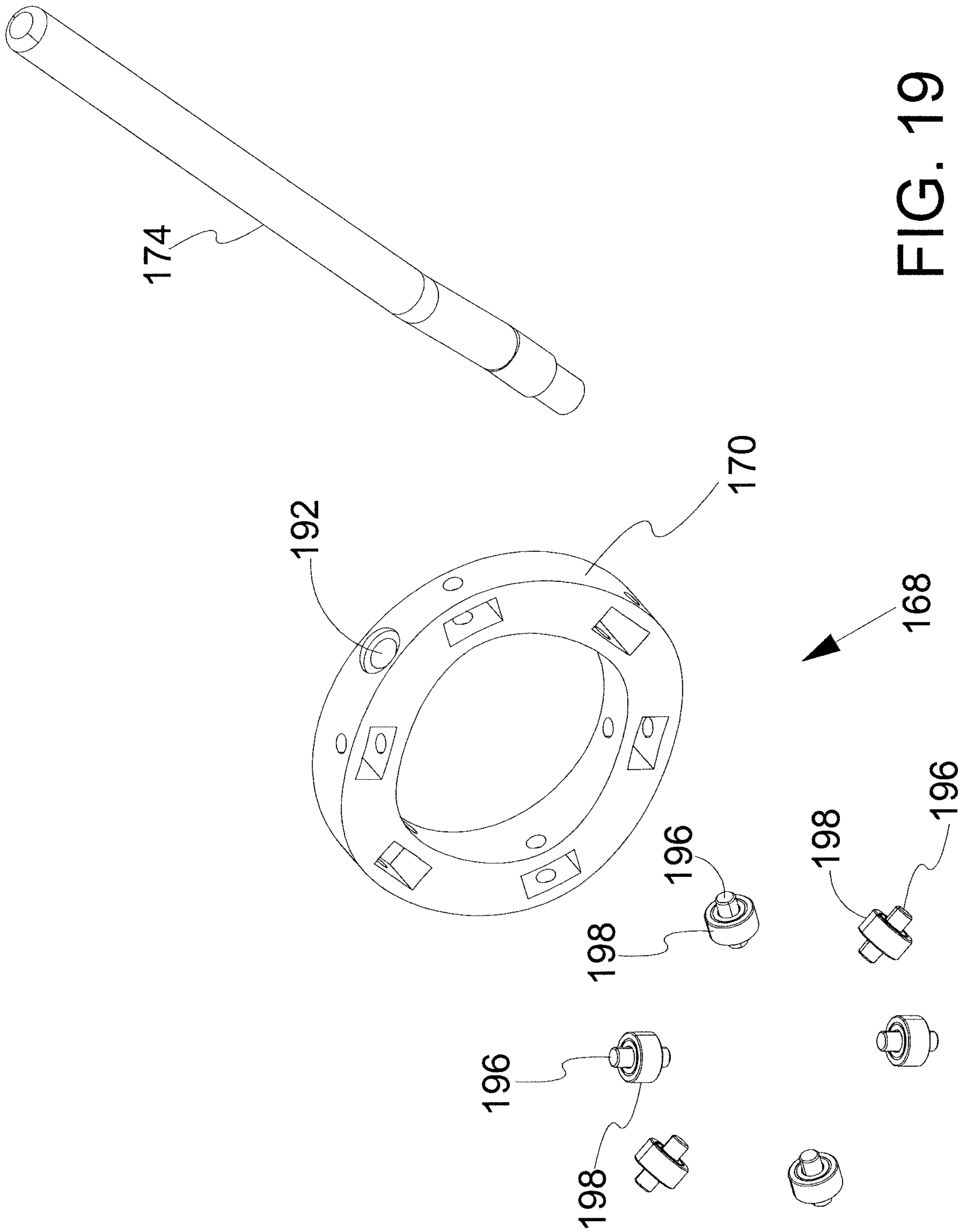
FIG. 19 is an exploded perspective view showing a drive body assembly in accordance with an example embodiment.

FIG. 19 is an exploded perspective view showing a drive body assembly 168 in accordance with an example embodiment. With reference to FIG. 19, it will be appreciated that when the drive body assembly 168 is in an unexploded state, the drive body 170 supports are plurality of rollers 198 and pins 196. In the example embodiment of FIG. 19, each pin extends through the center of a roller and the ends of each pin are supported by the drive body 170.

Figure 20:
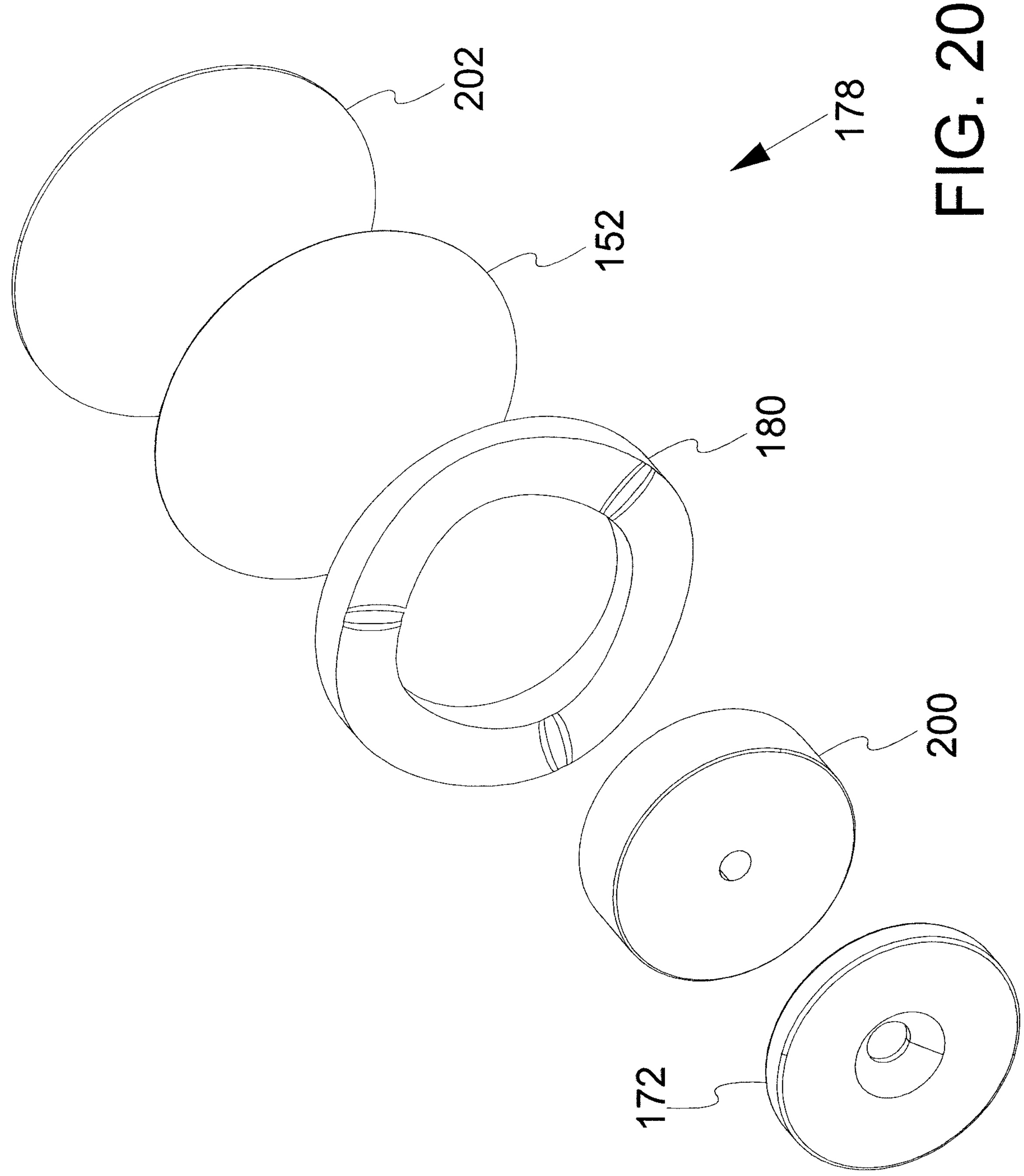
FIG. 20 is an exploded perspective view showing a mating body assembly in accordance with an example embodiment.

FIG. 20 is an exploded perspective view showing a mating body assembly 178 in accordance with an example embodiment. In the example embodiment of FIG. 20, the mating body assembly 178 includes a cover plate 202 that is fixed to the mating body 180 by an adhesive layer 152. With reference to FIG. 20, it will be appreciated that the mating body assembly 178 also includes a magnet assembly 172 and a magnet support 200. In the example embodiment of FIG. 20, the magnet assembly 172 is coupled to the mating body 180 by the magnet support 200 and the cover plate 202. In some example embodiments, a screw is used to attach the magnet assembly 172 to the magnet support 200.

Referring to FIGS. 16 through 20, in some example embodiments, a device for detachable attachment to a ferromagnetic surface comprises a drive body assembly 168 including a ring-shaped drive body 170. In some embodiments, the drive body 170 includes a plurality of raised portions 186, a plurality of recessed portions 188, and an undulating surface 190 extending over the plurality of raised portions 186 and the plurality of recessed portions 188. In some embodiments, the mating body assembly 178 of the device comprises a ring-shaped mating body 180 that includes a plurality of peak portions 182, a plurality of valley portions 184, and an undulating surface 190 extending over the plurality of peak portions 182 and the plurality of valley portions 184. The mating body assembly 178 may further include a magnet assembly 172 that is coupled to the mating body 180. The driving body 180 may have a face 190 that defines a face plane.

Still referring to FIGS. 16 through 20, in some example embodiments, the mating body 180 of the device has an attachment position in which each peak portion of the mating body 180 is received in a corresponding recessed portion of the driving body 170 and each raised portion of the drive body 170 is received in a valley portion of the mating body 180. In these example embodiments, the mating body 180 may also have a maximum displacement position in which each peak portion of the mating body 180 is outside of the corresponding recessed portion of the drive body 170 and each raised portion of the drive body 170 is outside of the corresponding valley portion of the mating body 180. Upon relative rotation between the drive body 170 and the mating body 180, the mating body 180 may move toward the maximum displacement position and the magnetic sheet assembly is displaced by a displacement distance relative to the face plane. In some example embodiments, the distance traveled by the magnetic sheet assembly is greater than an effective zone thickness of a magnetic field produced by the magnetic sheet assembly. In some example embodiments, distance traveled by the magnetic sheet assembly is greater than a baseplate wall thickness of a shunt of the magnetic sheet assembly.

Figure 21:
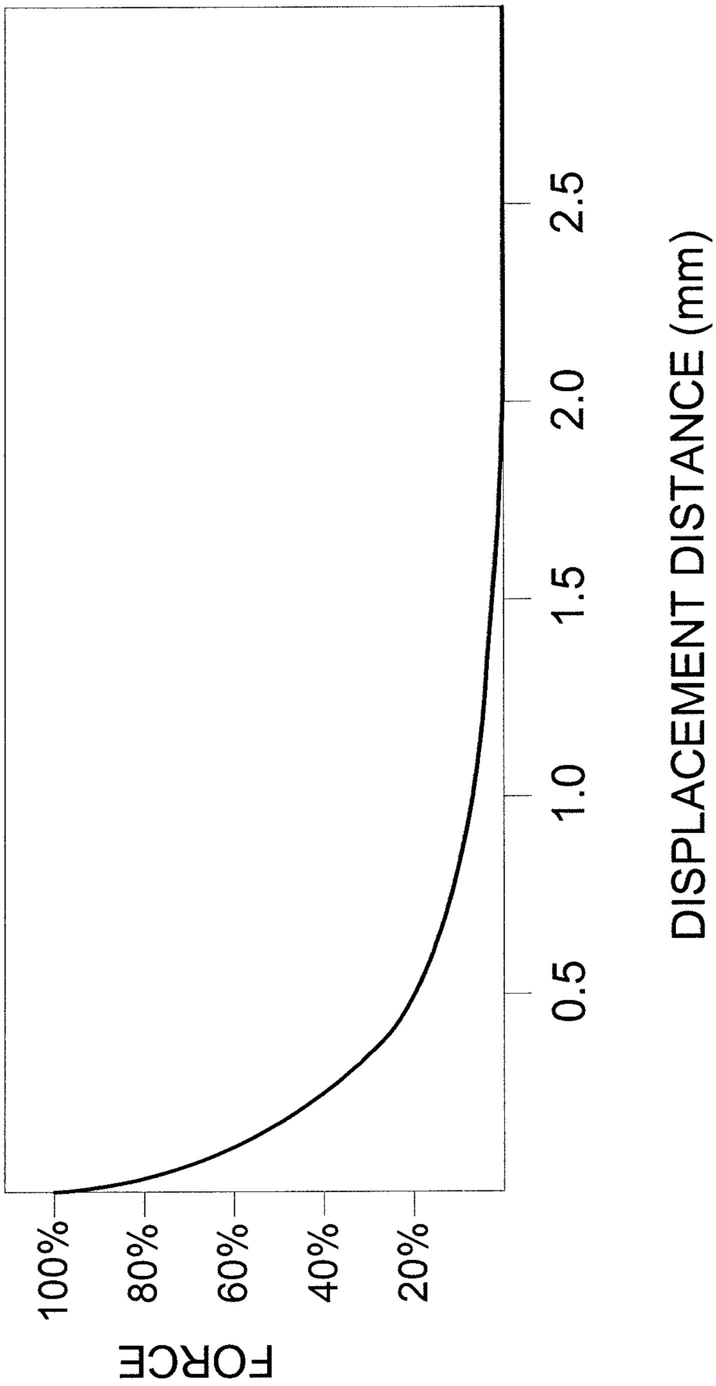
FIG. 21 is a graph illustrating a magnetic attraction force between an example magnet and a ferromagnetic object plotted as a function of the distance between the example magnet and the ferromagnetic object.

FIG. 21 is a graph illustrating a magnetic attraction force between an example magnet and a ferromagnetic object plotted as a function of the distance between the example magnet and the ferromagnetic object. With reference to FIG. 21, it will be appreciated that the magnetic attraction force decreases as the distance between the example magnet and the ferromagnetic object increases. In some example embodiments, the magnetic attraction force decreases by more than 80% when distance between the example magnet and the ferromagnetic object is about 1.0 mm. In some example embodiments, the magnetic attraction force decreases by more than 85% when distance between the example magnet and the ferromagnetic object is about 1.5 mm. In some example embodiments, the magnetic attraction force decreases by more than 90% when distance between the example magnet and the ferromagnetic object is about 2.0 mm.

Figures 22A, 22B, 22C:
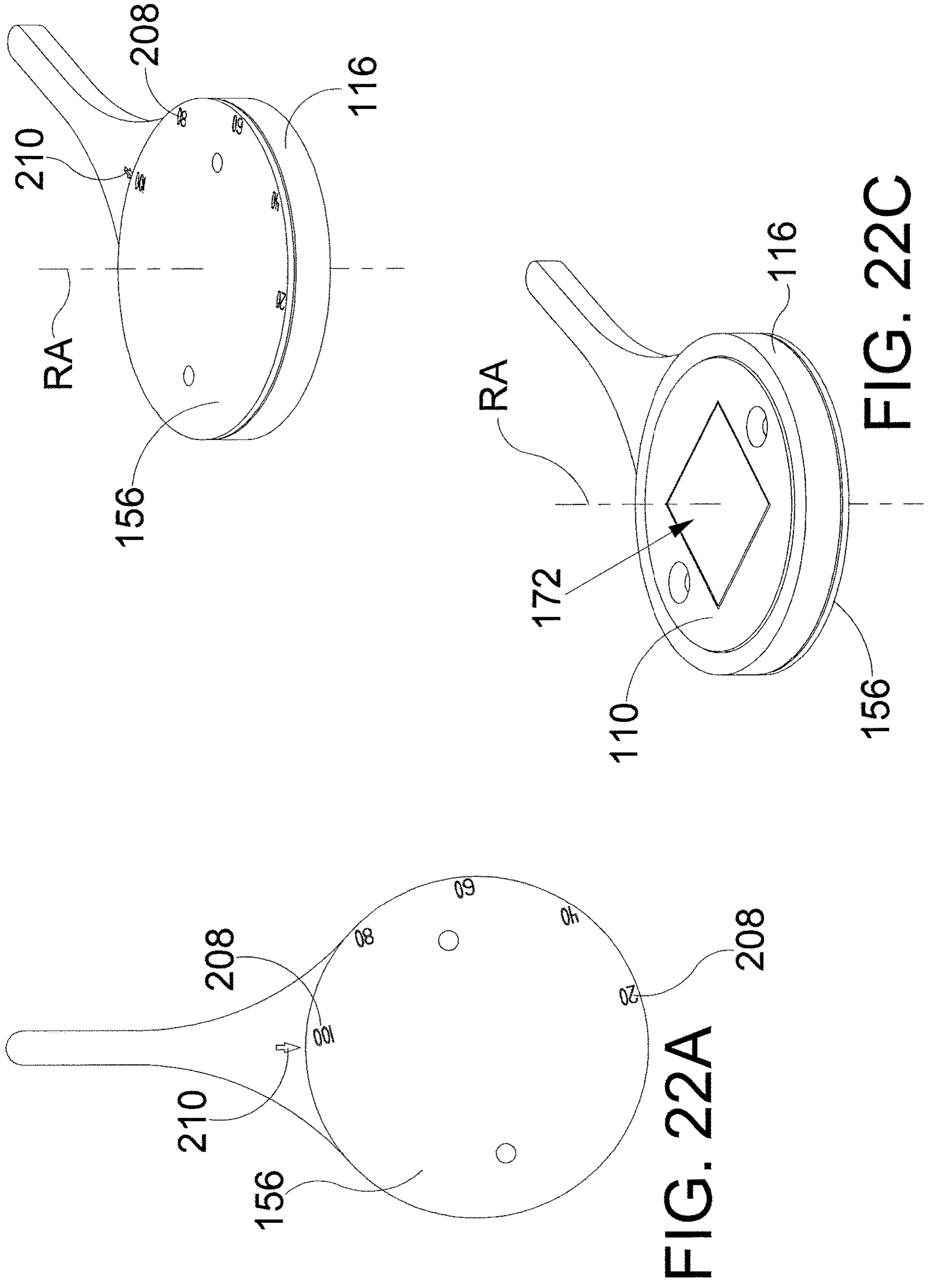
FIGS. 22A through 22C are perspective views showing a detachable magnet device in accordance with an example embodiment.

FIGS. 22A through 22C are perspective views showing a detachable magnet device in accordance with an example embodiment. FIGS. 22A through 22C may be collectively referred to as FIG. 22. The detachable magnet device of FIG. 22 comprises a core housing 110 defining a pocket 138 and a magnet assembly 172 that is received in the pocket 138. In the example embodiment of FIG. 22, an annular body 116 is disposed about the core housing 110 such that the annular body 116 is rotatable about a rotational axis RA relative to the core housing 110. An index mark 210 is located on the annular body 116 in the example embodiment of FIG. 22. Also in the example embodiment of FIG. 22, the device includes a cap member 156 that can be fixed to the core housing 110 with a camming rib of the annular body 116 disposed between the cap member 156 and a flange portion 164 of the core housing 110. A plurality of indicia 208 are located on the cap member 156 in the example embodiment of FIG. 22. In some embodiments, the indicia 208 located on the cap member 156 may be selectively aligned with the index mark 210 located on the annular body 116

Figure 22D:
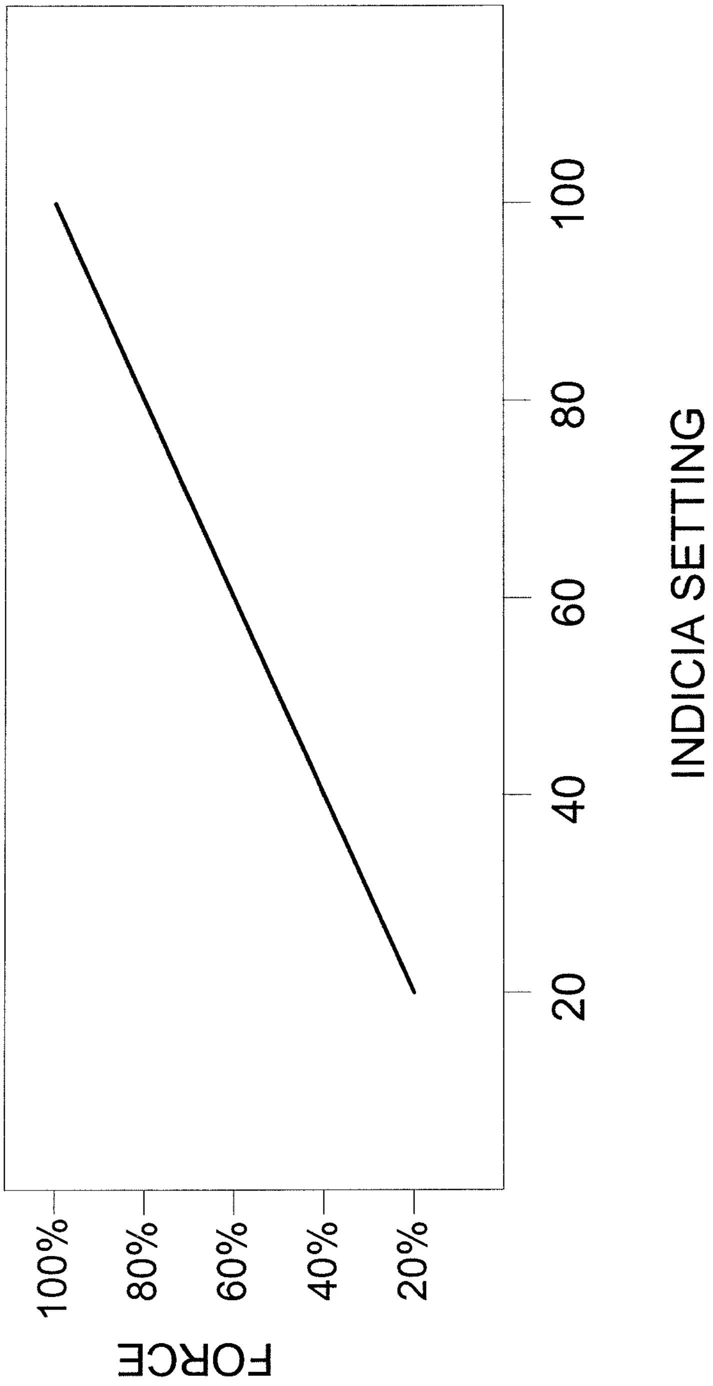
FIG. 22D is a graph illustrating a magnetic attraction force between an example magnet and a ferromagnetic object.

FIG. 22D is a graph illustrating a magnetic attraction force between an example magnet and a ferromagnetic object. In the example embodiment of FIG. 22D, force is plotted on the vertical axis and device indicia settings are plotted on the horizontal axis. In some example embodiments, the magnetic attraction force between the example magnet and the ferromagnetic object is at a maximum when the position of the annular body relative to the core housing corresponds to an indicia setting of "100." In some example embodiments, the magnetic attraction force between the example magnet and the ferromagnetic object is about 80% of maximum when the position of the annular body relative to the core housing corresponds to an indicia setting of "80." In some example embodiments, the magnetic attraction force between the example magnet and the ferromagnetic object is about 60% of maximum when the position of the annular body relative to the core housing corresponds to an indicia setting of "60." In some example embodiments, the magnetic attraction force between the example magnet and the ferromagnetic object is about 40% of maximum when the position of the annular body relative to the core housing corresponds to an indicia setting of "40." In some example embodiments, the magnetic attraction force between the example magnet and the ferromagnetic object is about 20% of maximum when the position of the annular body relative to the core housing corresponds to an indicia setting of "20."

Figure 22E:
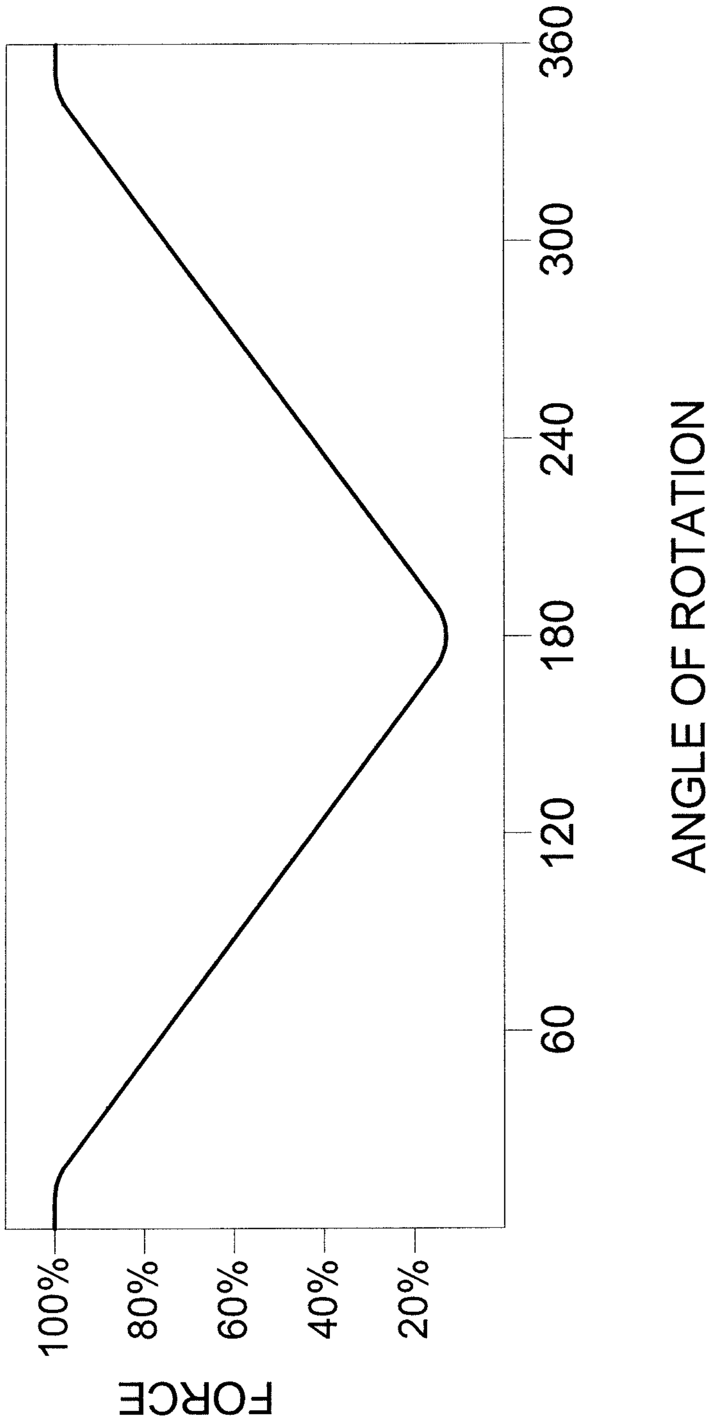
FIG. 22E is a graph illustrating a magnetic attraction force between an example magnet and a ferromagnetic object plotted as a function of the angular orientation of the annular body with respect to the core housing.

FIG. 22E is a graph illustrating a magnetic attraction force between an example magnet and a ferromagnetic object plotted as a function of the angular orientation of the annular body with respect to the core housing. In the example embodiment of FIG. 22E, orientation of the annular body moves through a rotational span of 0 and 360 degrees as it rotates with respect to the core housing. In some example embodiments, the magnetic attraction force is at a maximum for a first portion of the rotational span and the magnetic attraction force is at a maximum for a second portion of the rotational span. In some example embodiments, the minimum magnetic attraction force is greater than zero. In some example embodiments, the minimum magnetic attraction force is greater than 2% of the maximum magnetic attraction force. In some example embodiments, the minimum magnetic attraction force is greater than 6% of the maximum magnetic attraction force. In some example embodiments, the minimum magnetic attraction force is greater than 12% of the maximum magnetic attraction force.

Figure 23C:
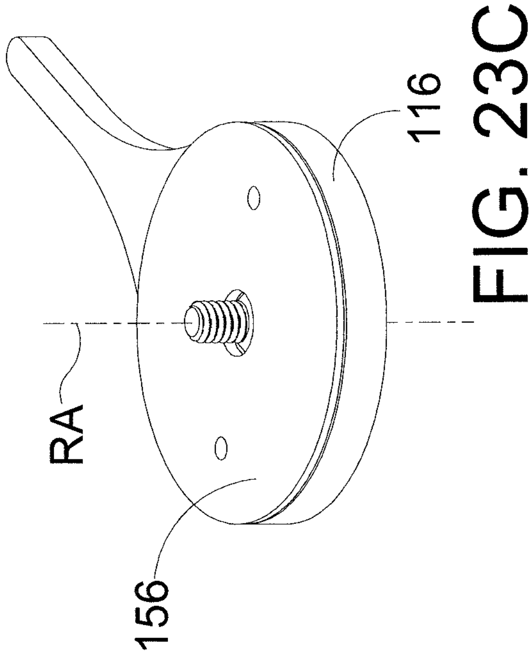
FIGS. 23A through 23C are perspective views showing a selectively detachable magnet device including a mounting post.
Figure 23B:
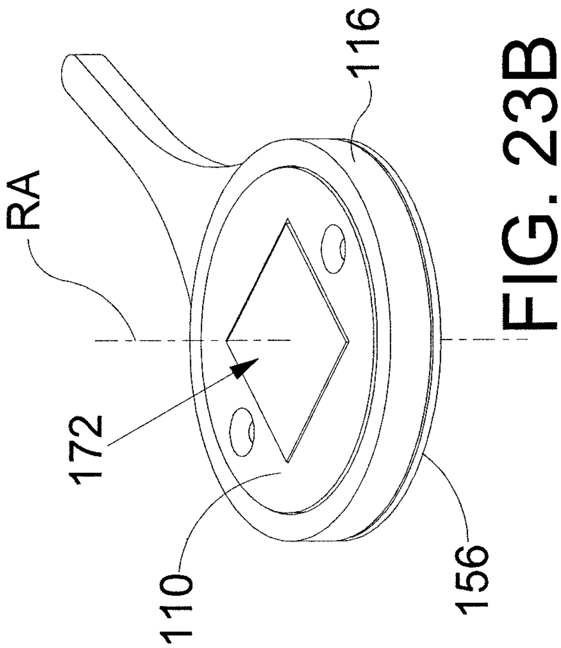
Figure 23A:
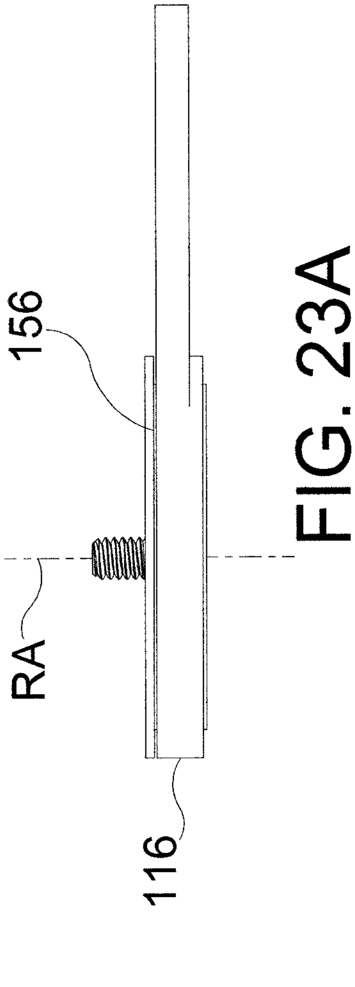

FIGS. 23A through 23C are perspective views showing a selectively detachable magnet device including a mounting post 216. FIGS. 23A through 23C may be collectively referred to as FIG. 23. In the example embodiment of FIG. 23, the mounting post 216 may be used to couple the detachable magnet device to other objects (e.g., a GoPro camera). The detachable magnet device of FIG. 23 comprises a core housing 110 defining a pocket 138 and a magnet assembly 172 that is received in the pocket 138. In the example embodiment of FIG. 23, the magnet assembly 172 includes a magnet 260. In some embodiments, the magnet 260 and the mount post 216 are both fixed to a plate portion of a mount assembly. In the example embodiment of FIG. 23, an annular body 116 is disposed about the core housing 110 such that the annular body 116 is rotatable about a rotational axis RA relative to the core housing 110. The device includes a cap member 156 that may be fixed to the core housing 110 with a camming rib of the annular body 116 disposed between the cap member 156 and a flange portion 164 of the core housing 110 in the example embodiment of FIG. 23.

Figure 24:
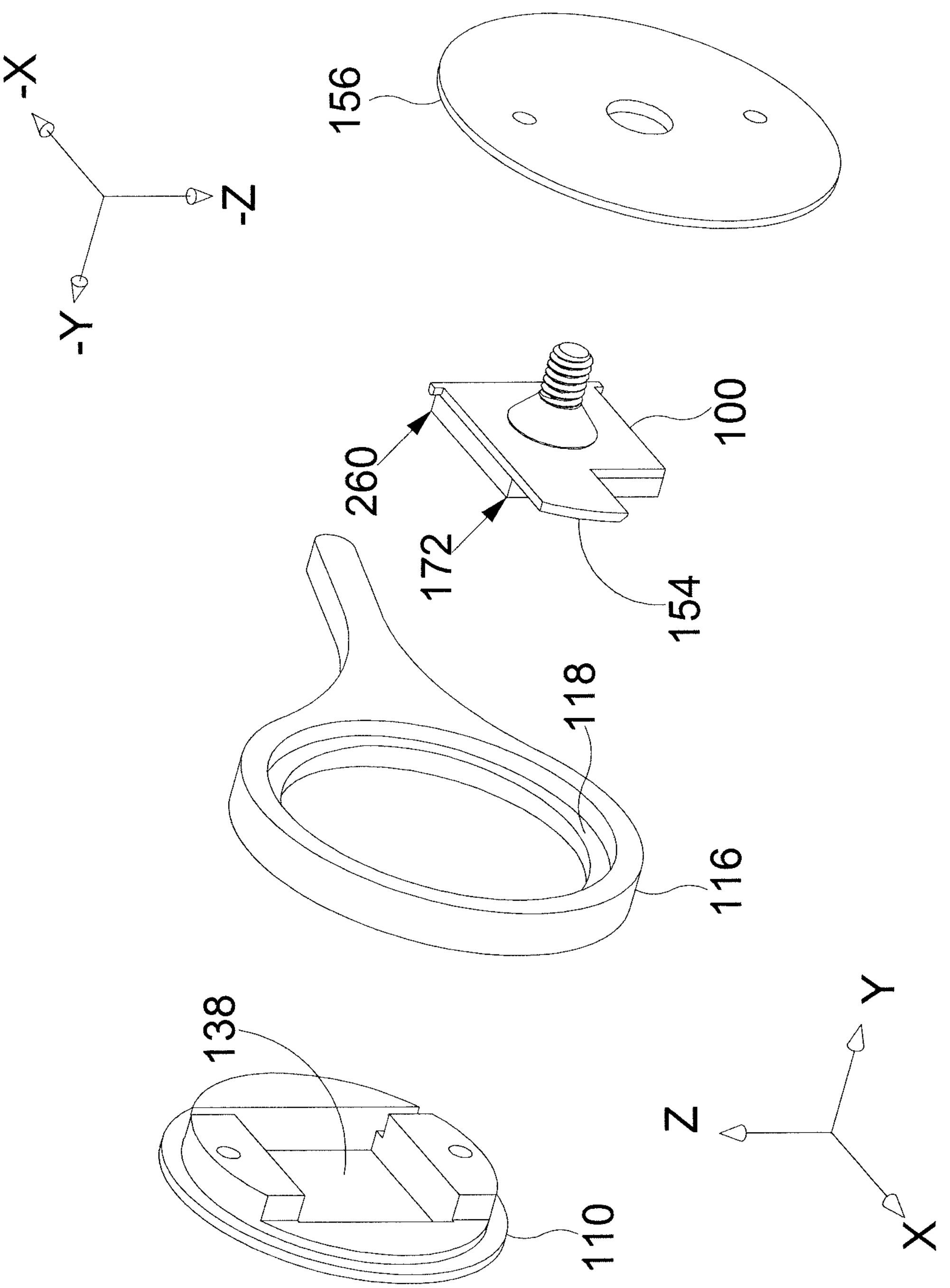
FIGS. 24 and 25 are exploded perspective views showing the detachable magnet device seen in FIG. 23.
Figure 25:
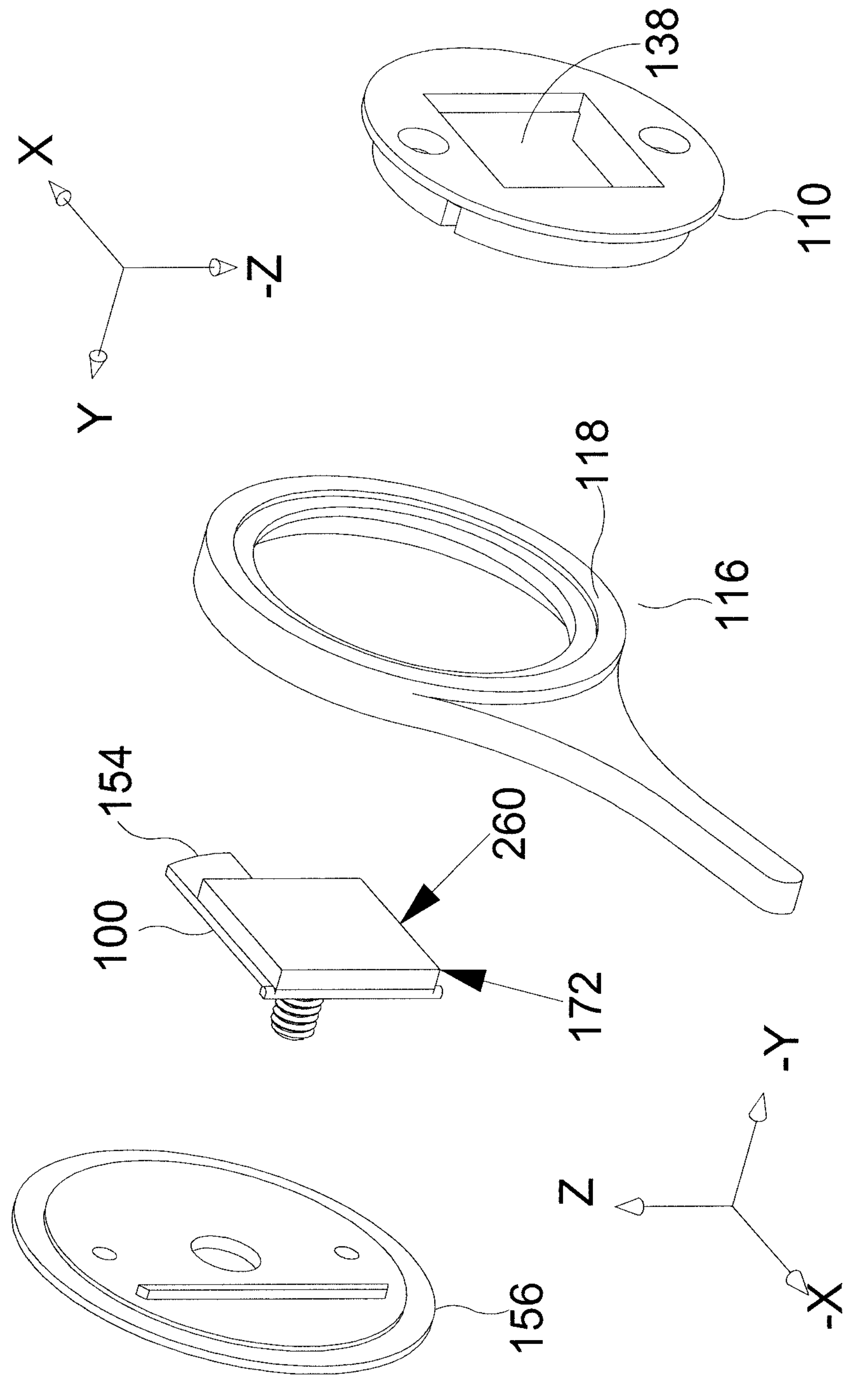

FIGS. 24 and 25 are exploded perspective views showing the detachable magnet device seen in FIG. 23. In the example embodiment of FIGS. 24 and 25, the detachable magnet device comprises a core housing 110 defining a pocket 138, a magnet assembly 172 that is received in the pocket 138. The detachable magnet device of FIGS. 24 and 25 also comprises a mount assembly 212 including a baseplate 100 and a mounting post 216. The magnet assembly 172 is fixed to the baseplate 100 of the mount assembly 212 in the example embodiment of FIGS. 24 and 25. In some embodiments, the baseplate 100 includes a tab portion 154 that extends beyond a periphery of the magnet assembly 172. Also in some embodiments of FIGS. 24 and 25, the baseplate 100 also includes a pivot portion 112 that is received in a corresponding portion 114 of the core housing 110 to form a hinge joint such that the baseplate 100 and the magnet assembly 172 selectively pivot relative to the core housing 110.

Figure 26B:
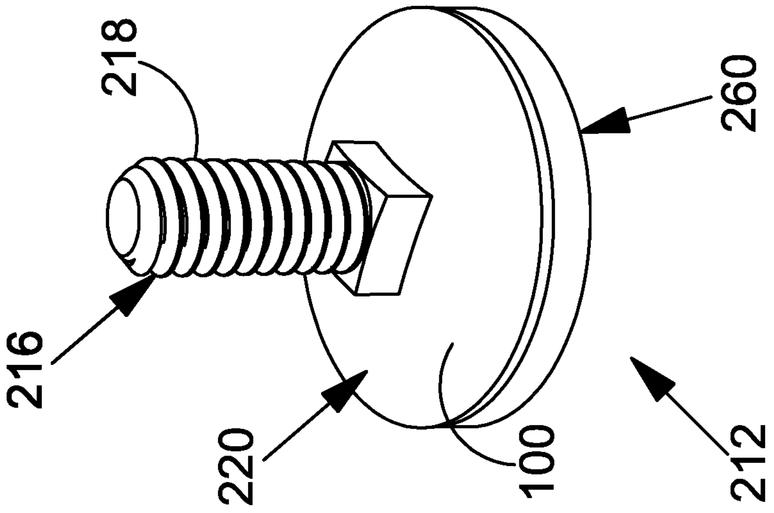
FIG. 26A and FIG. 26B are perspective views showing example mount assemblies in accordance with this detailed description.
Figure 26A:
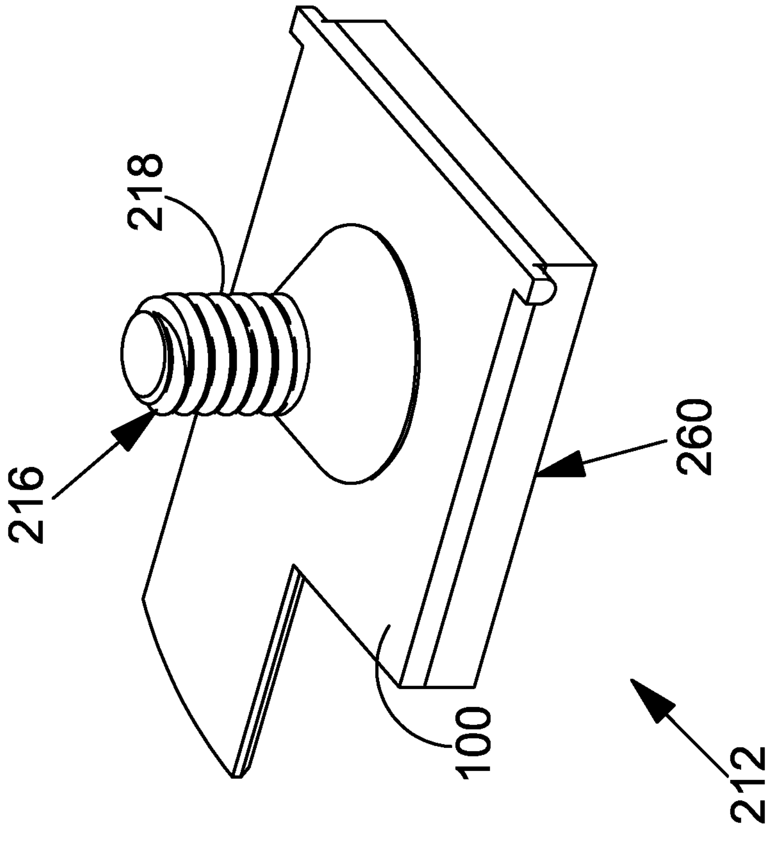

FIG. 26A and FIG. 26B are perspective views showing example mount assemblies 212 in accordance with this detailed description. Each mount assembly 212 includes mounting post 216 that is fixed to a baseplate 100 in the example embodiments of FIG. 26A and FIG. 26B. In some embodiments, each mounting post 216 comprises a thread 218. A magnet 260 is also fixed to the baseplate 100 in the example embodiments of FIG. 26A and FIG. 26B. In some embodiments, a mount assembly 212 may comprise an elevator bolt 220 (as shown in FIG. 26B).

Figure 27B:
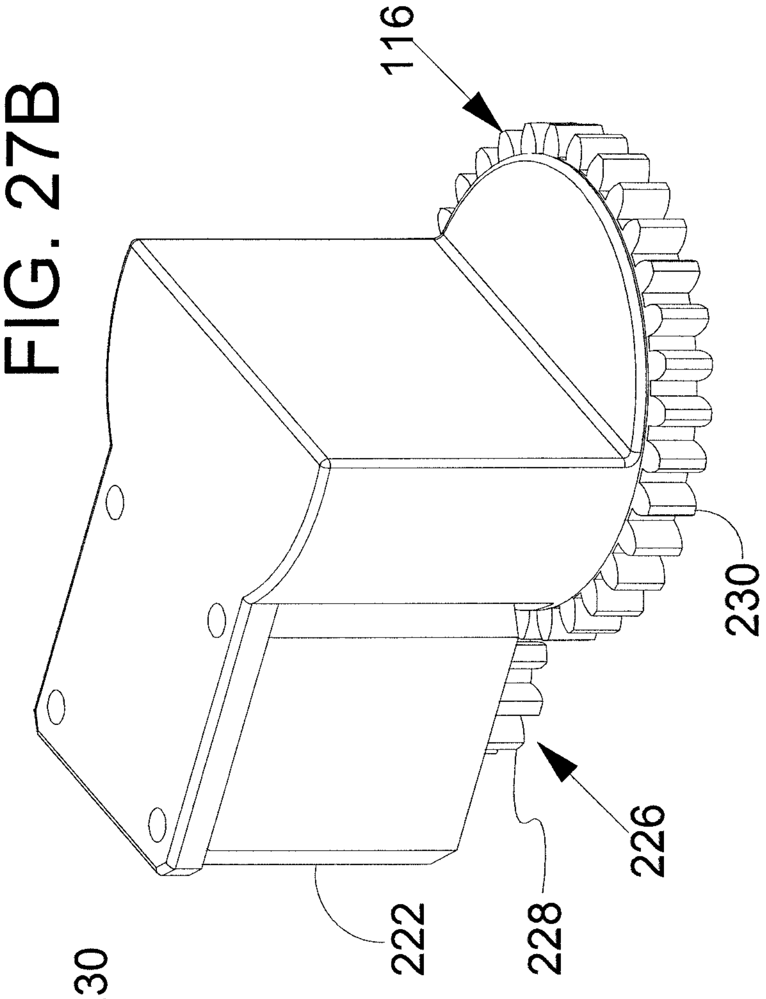
FIGS. 27A and 27B are perspective views showing a system including an actuator and a magnet assembly.
Figure 27A:
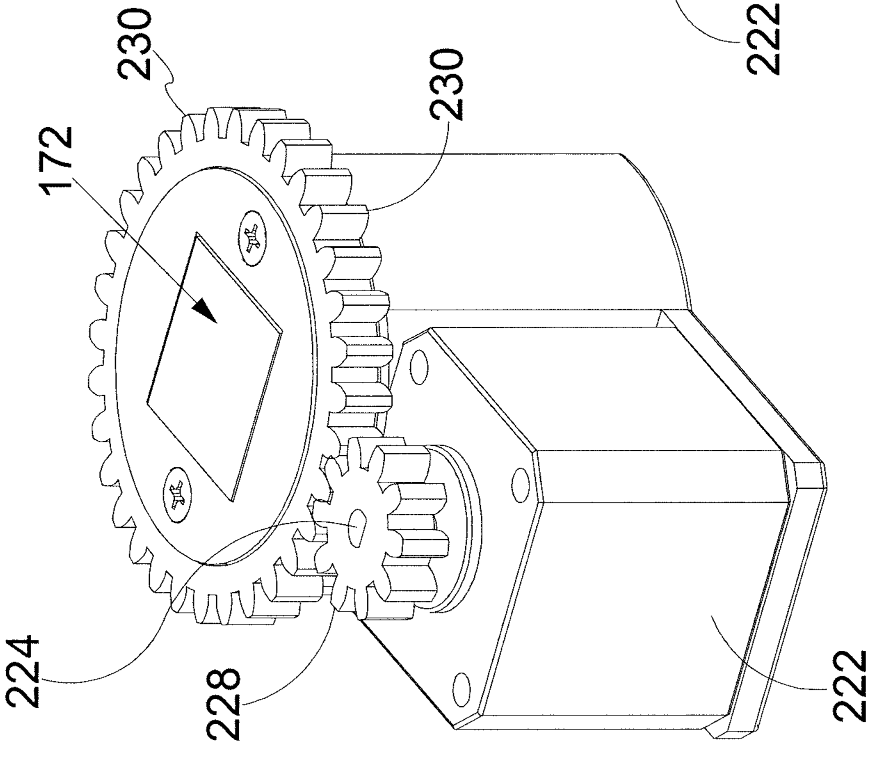

FIGS. 27A and 27B are perspective views showing a system 262 including an actuator 232 and a magnet assembly 172. FIGS. 27A and 27B may be collectively referred to as FIG. 27. In the example embodiment of FIG. 27, the actuator 232 comprises a motor 222 having a drive shaft 224. A drive gear 226 having drive teeth 228 is coupled to the drive shaft 224 of the motor 222 in the example embodiment of FIG. 27. In FIG. 27, the drive teeth 228 of the drive gear 226 can be seen operatively engage driven teeth 230 of an annular body 116. In some example embodiments, the annular body 116 rotates when the drive gear 226 rotates.

Figure 28:
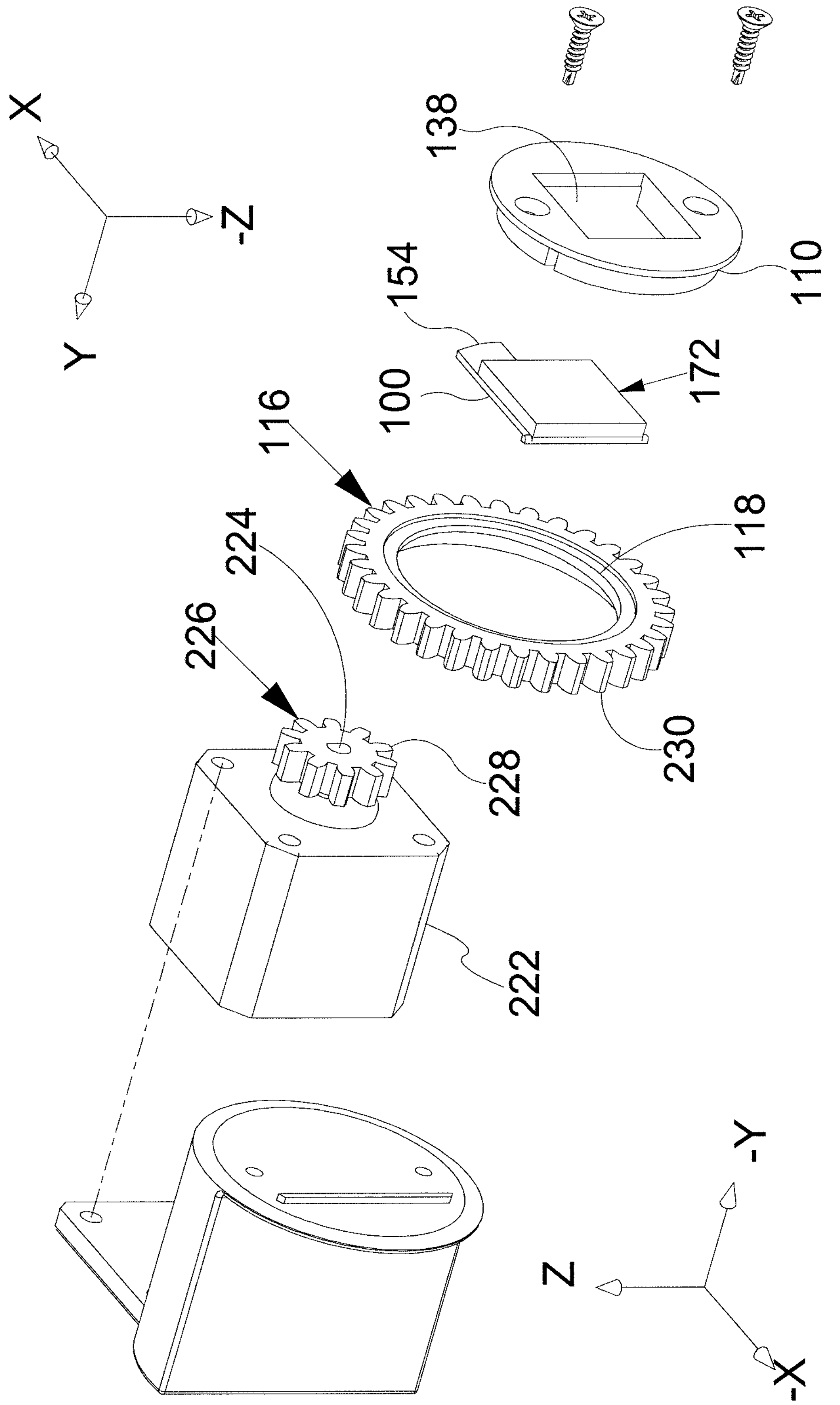
FIGS. 28 and 29 are exploded perspective views showing the system device in seen in FIG. 27.
Figure 29:
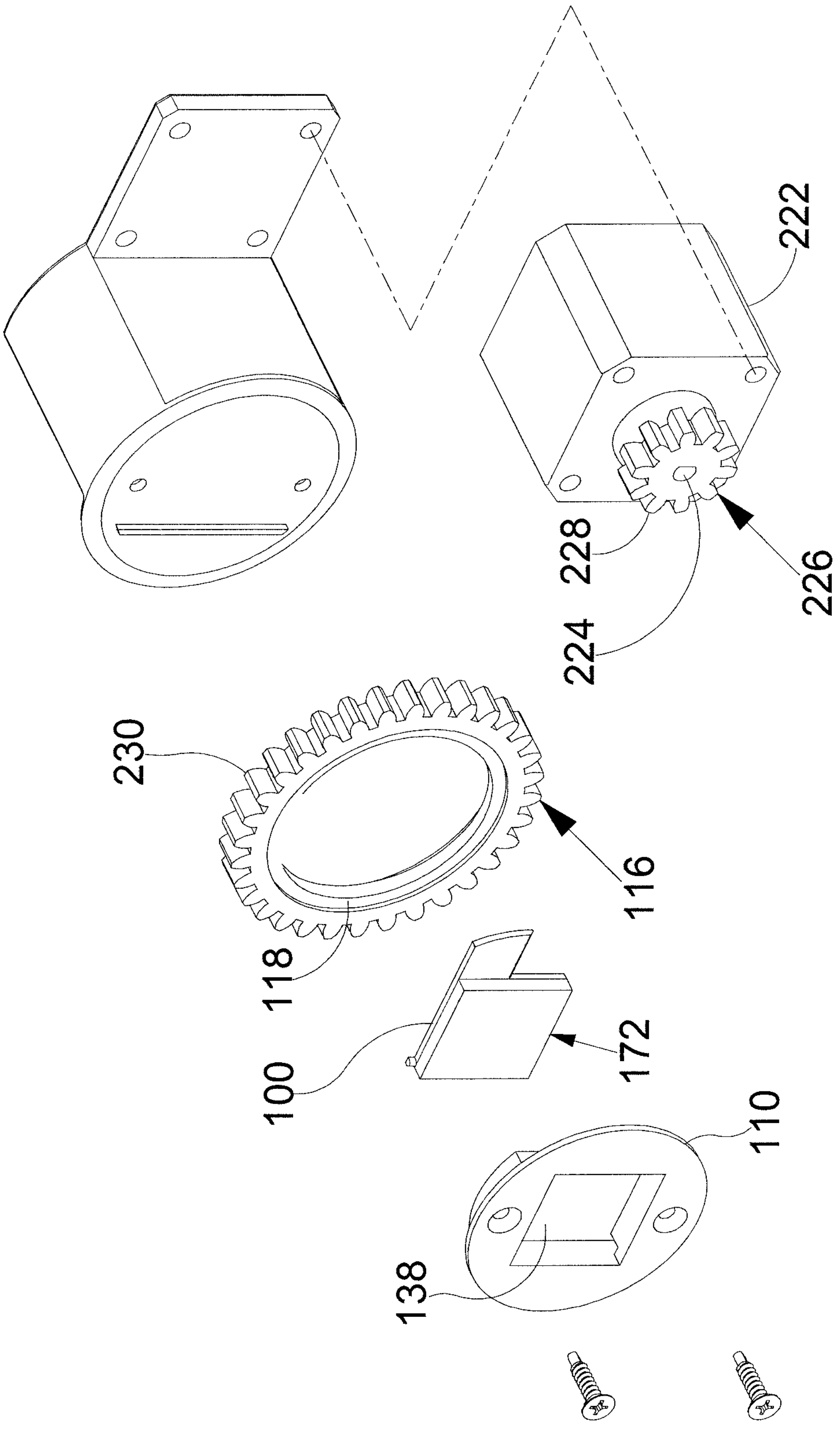

FIGS. 28 and 29 are exploded perspective views showing the system seen in FIG. 27. With reference to FIGS. 28 and 29, it will be appreciated that the system includes a core housing 110 defining a pocket 138, a magnet assembly 172 that is received in the pocket 138, and a baseplate 100 that is fixed to the magnet assembly 172. In the example embodiment of FIGS. 28 and 29, the baseplate 100 includes a tab portion 154 that extends beyond a periphery of the magnet assembly 172. Also in the example embodiment of FIGS. 28 and 29, the baseplate 100 also includes a pivot portion 112 that is received in a corresponding portion 114 of the core housing 110 to form a hinge joint such that the baseplate 100 and the magnet assembly 172 selectively pivot relative to the core housing 110.

In the example embodiment of FIGS. 28 and 29, the annular body 116 has a camming rib 118 that operatively engages a baseplate 100 that is fixed to a magnet assembly 172. In some embodiments, the camming rib 118 applies a camming force to a portion of the baseplate 100 upon rotation of the annular body 116 relative to the baseplate 100 and the camming force urges the magnet assembly 172 and the baseplate 100 to pivot about a pivot axis of a hinge joint 166. In some embodiments, the pivot axis is formed at a pivot portion of the baseplate 100 that engages a corresponding portion of the core housing 110. In some embodiments, the camming rib 118 applies a camming force to the portion of the baseplate 100 upon rotation of the annular body 116 relative to the baseplate 100 and the camming force urges the magnet assembly 172 and the baseplate 100 to pivot about the pivot axis of the hinge joint 166. In some example embodiments, the annular body 116 rotates when the motor 222 of the actuator 232 is energized. In the embodiment of FIGS. 28 and 29, the actuator 232 comprises a motor 222 having a drive shaft 224. A drive gear 226 having drive teeth 228 is coupled to the drive shaft 224 of the motor 222 in the example embodiment of FIGS. 28 and 29. In some embodiments, the drive teeth 228 of the drive gear 226 operatively engage driven teeth 230 of an annular body 116.

Figure 30:
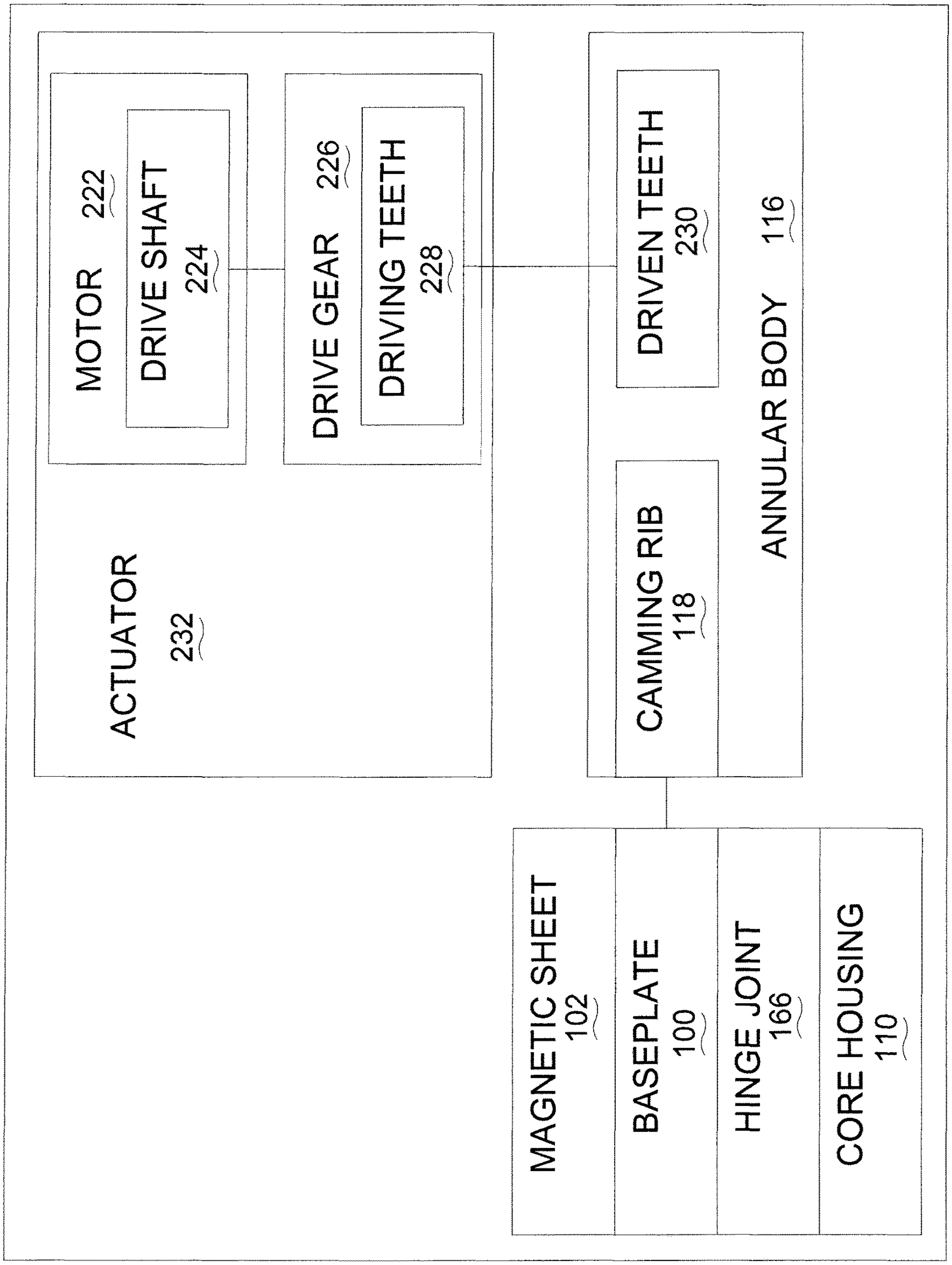
FIG. 30 illustrates a system including an actuator and a magnet assembly.

FIG. 30 illustrates a system 262 including an actuator 232 and a magnet assembly 172. In some embodiments, the system 262 is capable of selective magnetic attachment to a ferromagnetic object or surface. The illustration shown in FIG. 30 is not meant to imply physical or architectural limitations to the manner in which an illustrative embodiment may be implemented. Other components in addition to or in place of the ones illustrated may be used. Some components may be optional. Also, some blocks may illustrate functional components. One or more of these blocks may be combined, divided, or combined and divided into different blocks in some implementations. In the embodiment of FIG. 30, the actuator 232 comprises a motor 222 having a drive shaft 224. A drive gear 226 having drive teeth 228 is coupled to the drive shaft 224 of the motor 222 in the example embodiment of FIG. 30. In some embodiments, the drive teeth 228 of the drive gear 226 operatively engage driven teeth 230 of an annular body 116. In the example embodiment of FIG. 30, the annular body 116 has a camming rib 118 that operatively engages a baseplate 100 that is fixed to a magnet assembly 172. In some embodiments, the camming rib 118 applies a camming force to a portion of the baseplate 100 upon rotation of the annular body 116 relative to the baseplate 100 and the camming force urges the magnet assembly 172 and the baseplate 100 to pivot about a pivot axis of a hinge joint 166. In some embodiments, the pivot axis is formed at a pivot portion of the baseplate 100 that engages a corresponding portion of the core housing 110. In some embodiments, the camming rib 118 applies a camming force to the portion of the baseplate 100 upon rotation of the annular body 116 relative to the baseplate 100 and the camming force urges the magnet assembly 172 and the baseplate 100 to pivot about the pivot axis of the hinge joint 166.

Figure 31A:
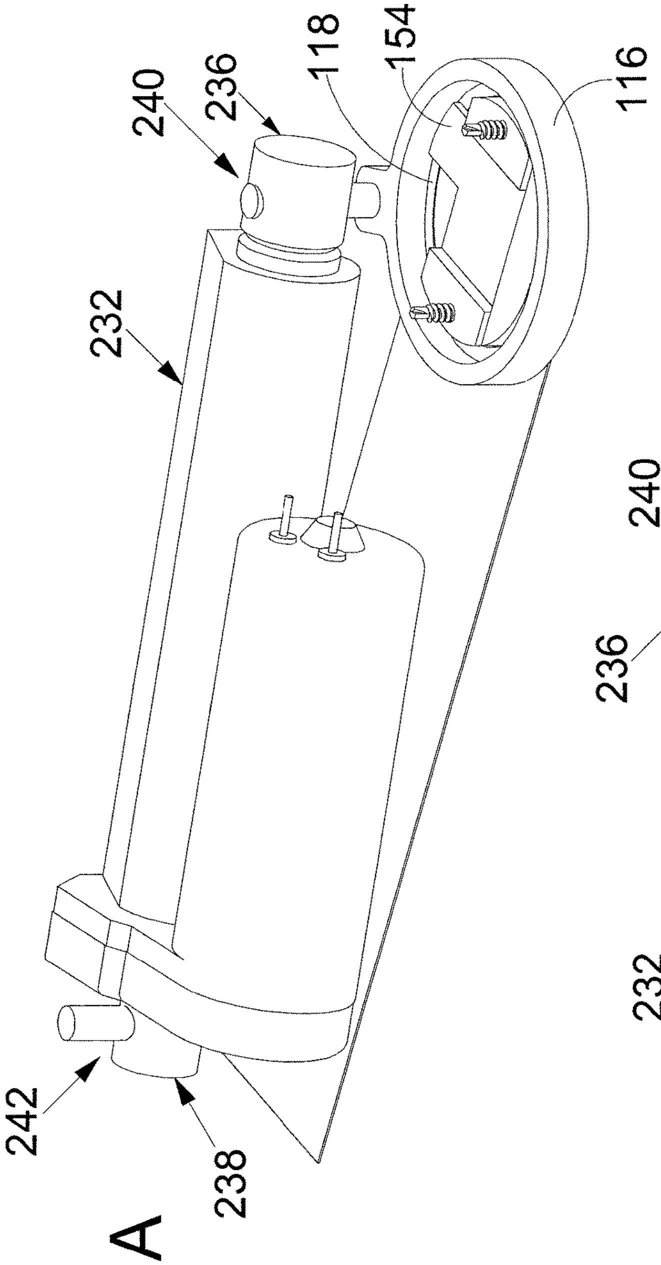
FIGS. 31A and 31B are perspective views showing a system including an actuator and a magnet that is fixed to a baseplate.
Figure 31B:
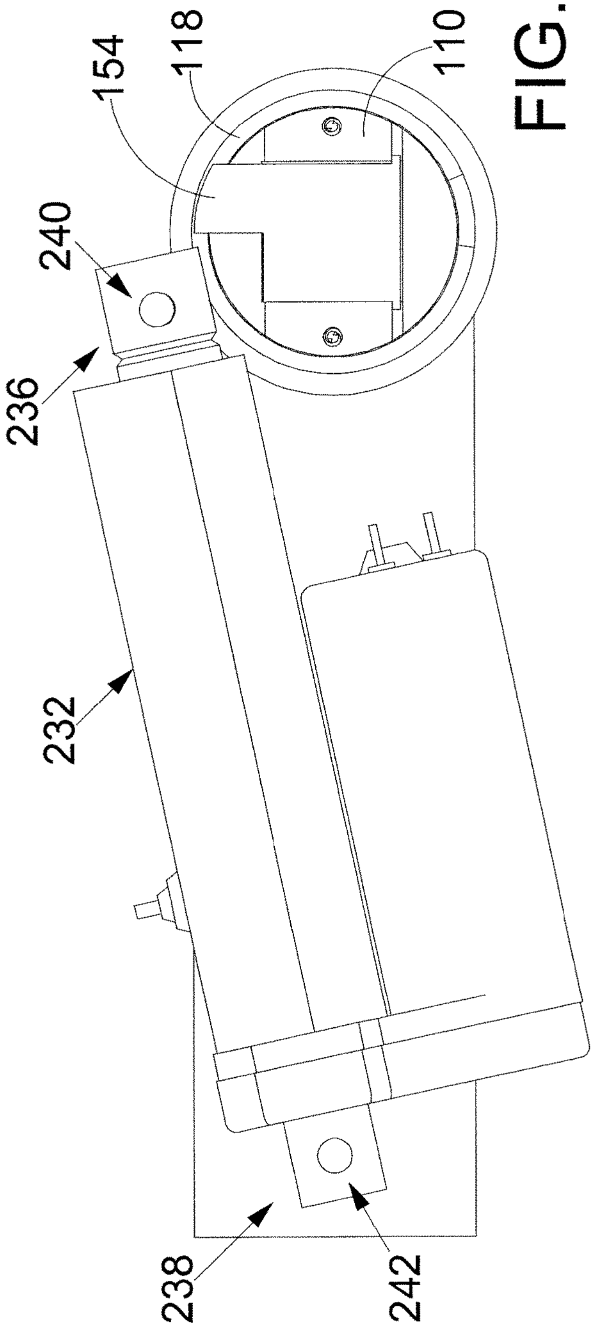

FIGS. 31A and 31B are perspective views showing a system 262 including an actuator 232 and a magnet assembly 172 that is fixed to a baseplate 100. FIGS. 31A and 31B may be collectively referred to as FIG. 31. In the example embodiment of FIG. 31, the actuator 232 comprises a linear actuator. With reference to FIG. 31, will be appreciated that actuator 232 has a first end portion 236 that is coupled to an annular body at a first pivot joint 240. Actuator 232 also has a second end portion 238 that is coupled to a frame member at a second pivot joint 242. In the example embodiment of FIG. 31, the annular body 116 rotates when a motor of the actuator 232 is energized. With reference to FIG. 31, it will be appreciated that annular body 116 includes a camming rib 118. In some embodiments, the camming rib 118 applies a camming force to a tab portion 154 of the baseplate 100 upon rotation of the annular body 116 relative to the baseplate 100. In some embodiments, the camming force applied by the camming rib 118 urges a magnet assembly and the baseplate 100 to pivot about a pivot axis of a hinge joint.

Figure 32A:
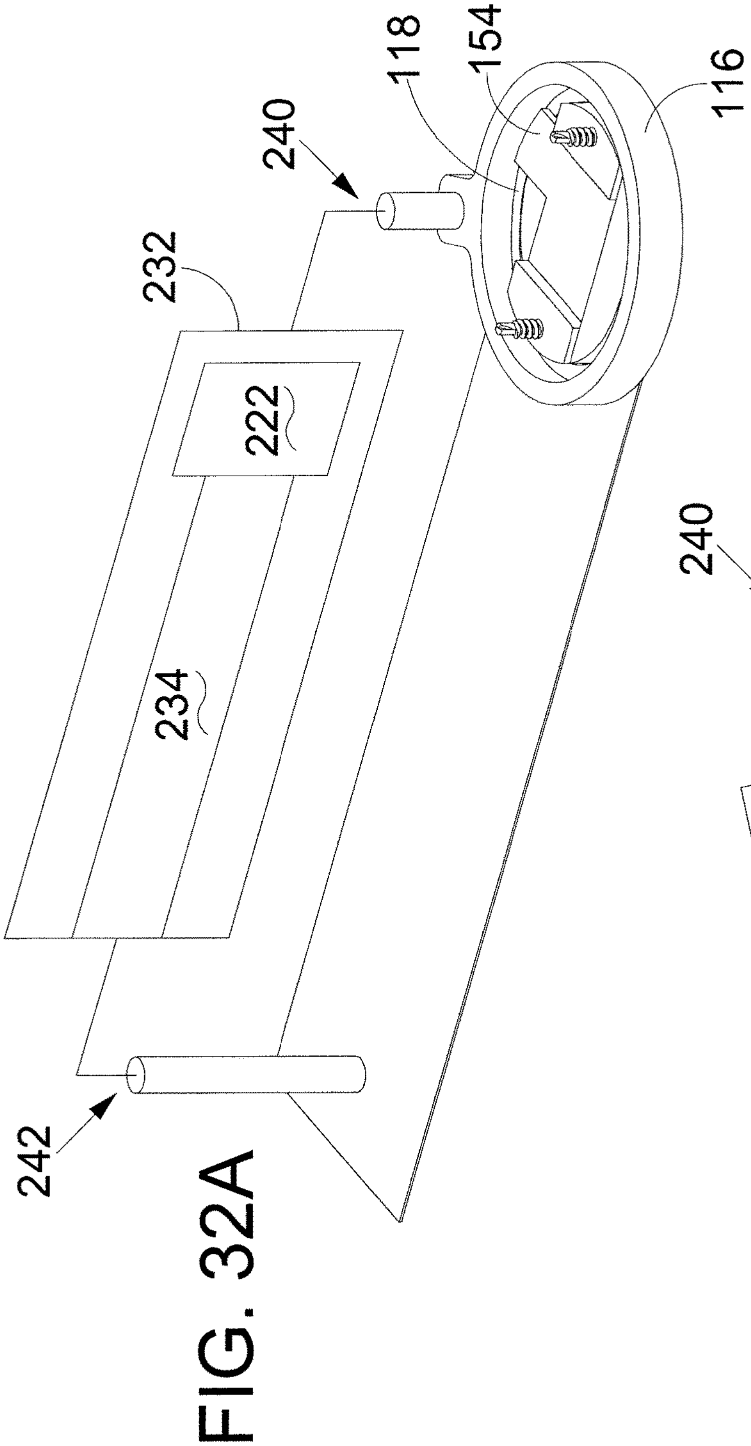
FIGS. 32A and 32B are stylized perspective views showing a system including an actuator and a magnet that is fixed to a baseplate.
Figure 32B:
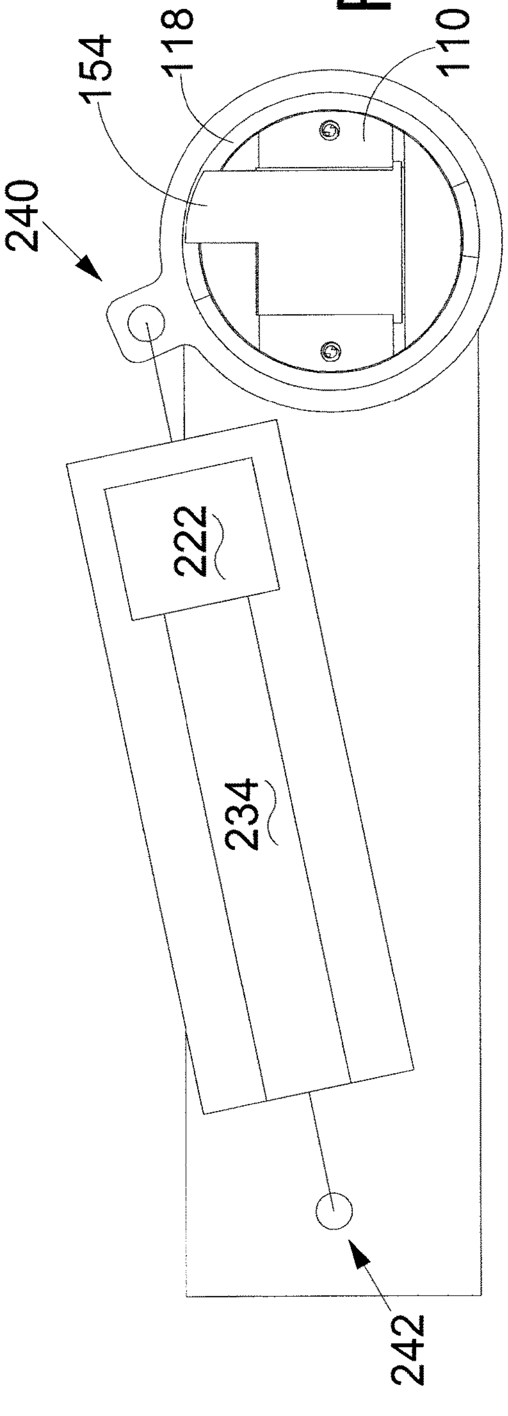

FIGS. 32A and 32B are stylized perspective views showing a system 262 including an actuator 232. FIGS. 32A and 32B may be collectively referred to as FIG. 32. In the embodiment of FIG. 32, the actuator 232 comprises a motor 222 and a lead screw 234. With reference to FIG. 32, it will be appreciated that the system includes an annular body 116 that is disposed about a core housing 110. The system also includes a baseplate 100 that is fixed to a magnet assembly. In the example embodiment of FIG. 32, the baseplate 100 includes a tab portion 154 that engages a camming rib 118 of the annular body 116. In some embodiments, the camming rib 118 applies a camming force to the tab portion 154 of the baseplate 100 upon rotation of the annular body 116 relative to the baseplate 100. With reference to FIG. 32, will be appreciated that actuator 232 has a first end portion 236 that is coupled to an annular body at a first pivot joint 240. Actuator 232 also has a second end portion 238 that is coupled to a frame member at a second pivot joint 242. In the example embodiment of FIG. 32, the annular body 116 rotates when the motor 22 of the actuator 232 is energized.

Figure 33B:
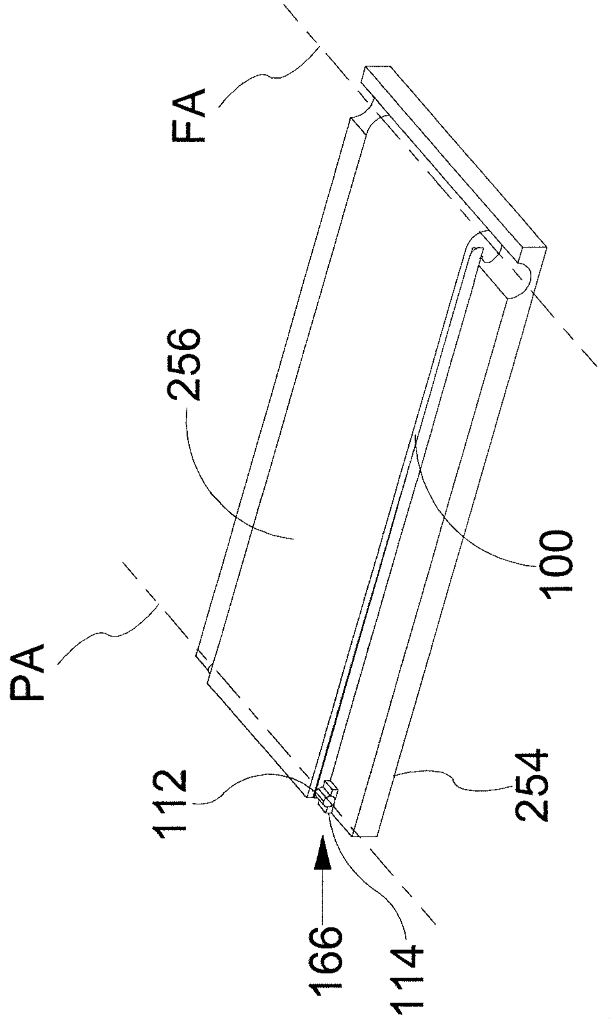
FIGS. 33A and 33B are perspective views showing a device for detachable attachment to a ferromagnetic object or surface.
Figure 33A:
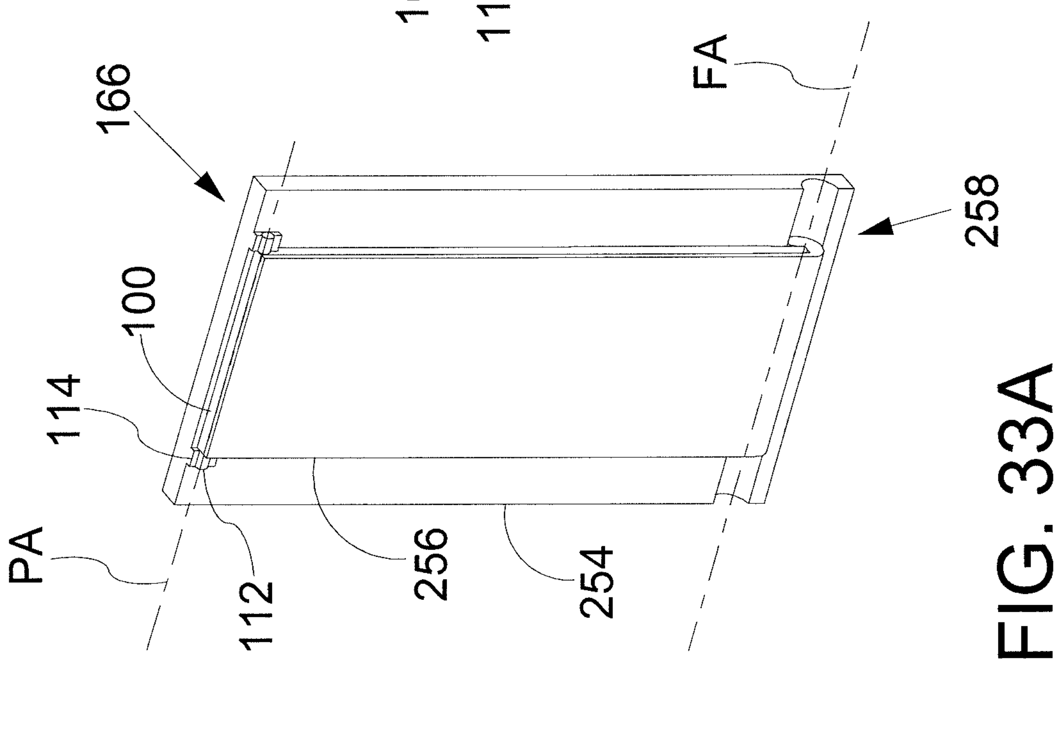

FIGS. 33A and 33B are perspective views showing a device for detachable attachment to a ferromagnetic object or surface. In the example embodiment shown in FIGS. 33A and 33B, the device comprises a base housing 254 defining a pocket that receives a magnet. In some embodiments, a baseplate 100 is fixed to the magnet and portions of the baseplate 100 extending beyond the periphery of the magnet overlay a front surface of the base housing 254. In some embodiments, the baseplate 100 has the pivot portion 112 that engages a corresponding portion 114 of the base housing 254 to form a hinge joint 166. In some embodiments, the baseplate 100 and the magnet selectively pivot about a pivot axis PA of a hinge joint 166 relative to the base housing 254. In some embodiments, the device includes a lever body 256 including a camming portion 258 that engages a portion of the baseplate 100. In some embodiments, the lever body 256 is rotatable about a fulcrum axis FA relative to the base housing 254. In some embodiments, forces applied to the baseplate by the camming portion 258 of the lever body 256 urging the magnet and the baseplate 100 to pivot about the pivot axis PA. In some embodiments, the magnet and the baseplate 100 rotate about the pivot axis PA as the lever body 256 pivots about the fulcrum axis FA.

Figures 34A, 34B, 34C:
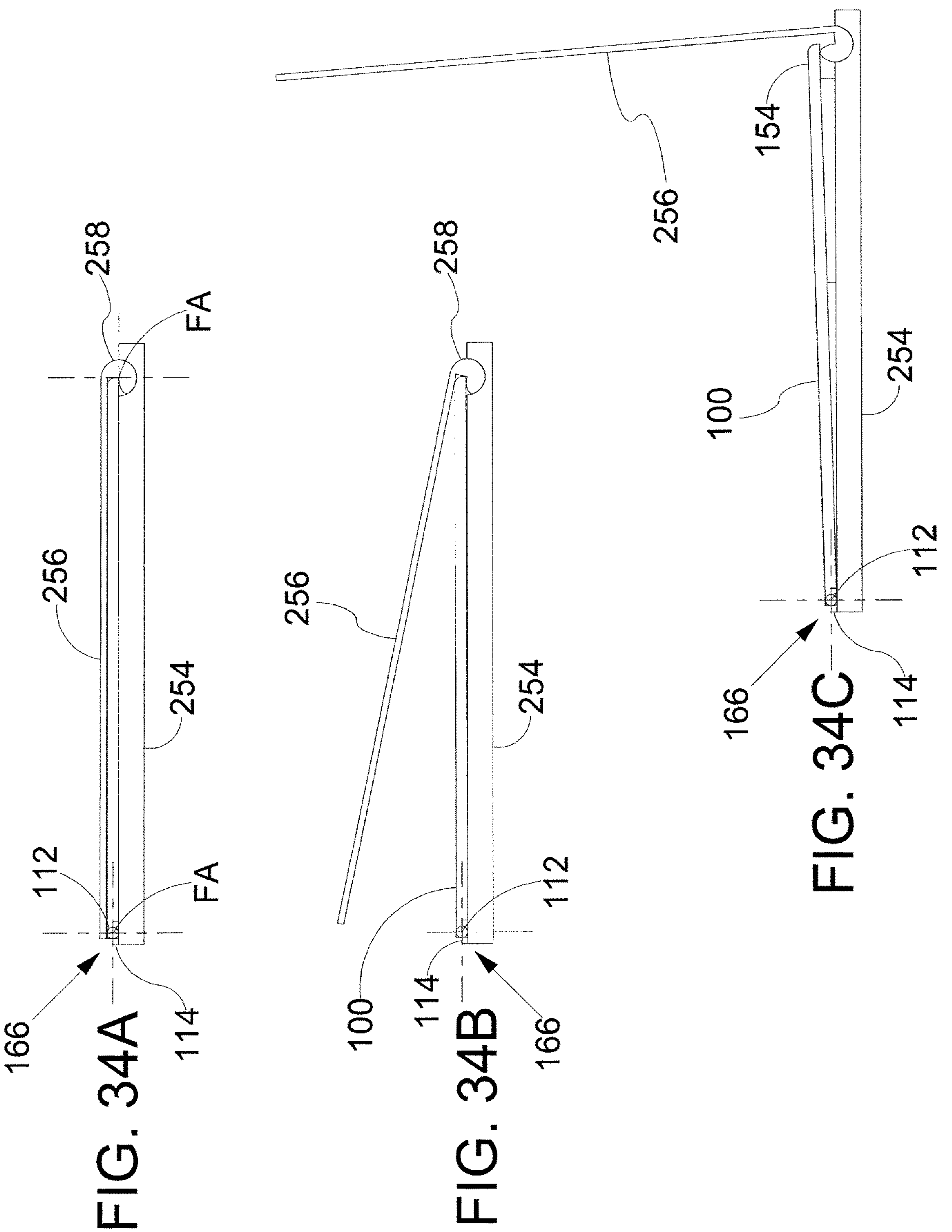
FIGS. 34A, 34B and 34C are a series of side views showing a device for detachable attachment to a ferromagnetic object or surface.
Figure 35C:
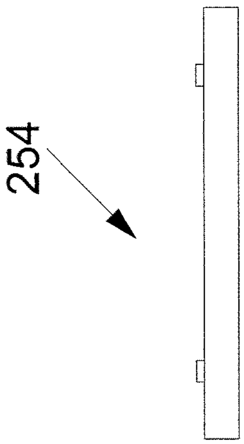
FIG. 35A through FIG. 35F are front, rear, top, bottom and side views showing six sides of a base housing.
Figure 35B:
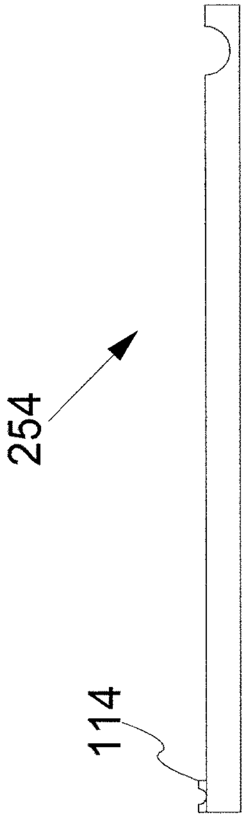
Figure 35A:
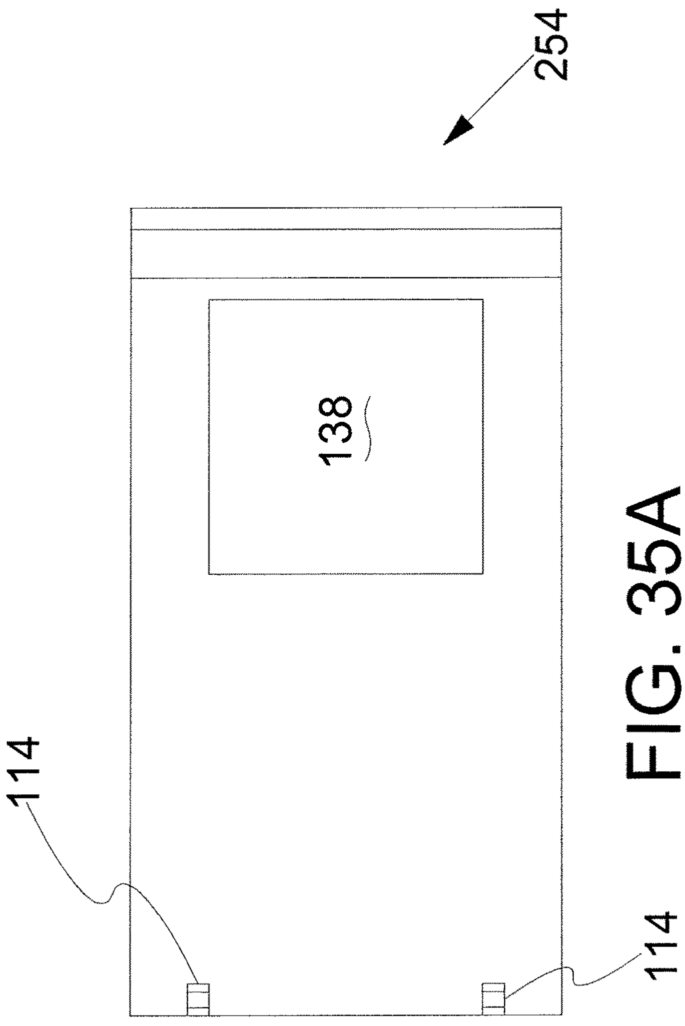
Figure 35D:
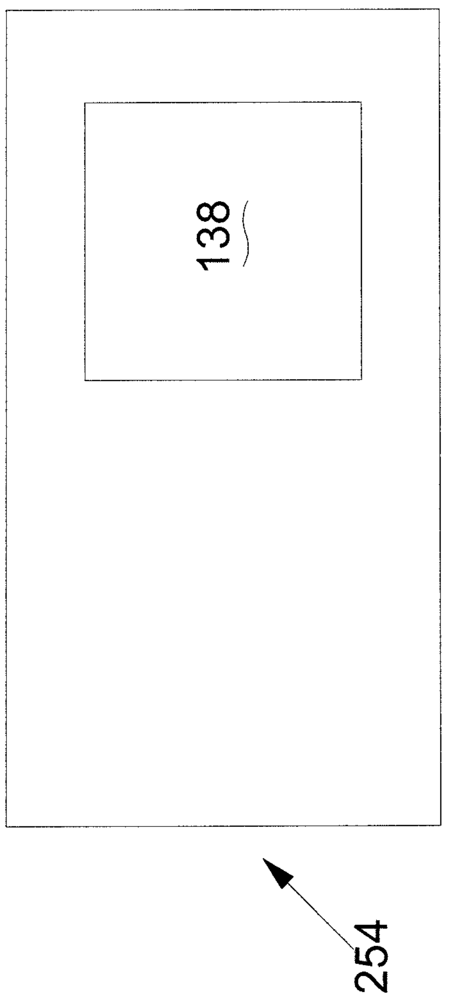
Figure 35E:
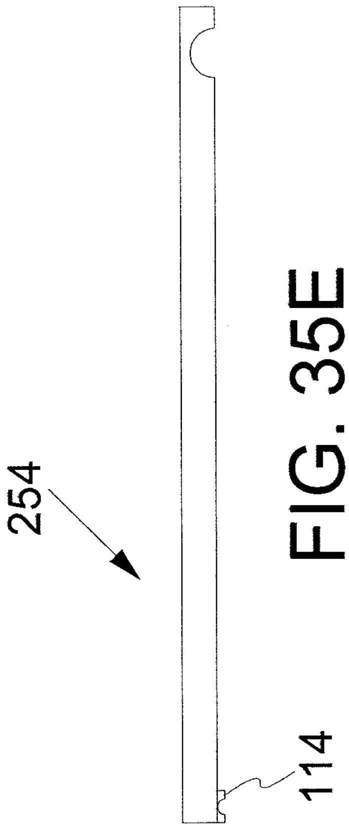
Figure 35F:
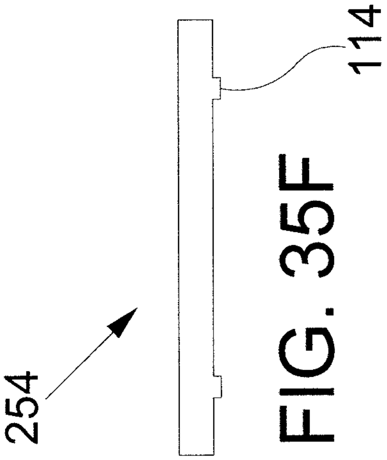
Figure 36A:
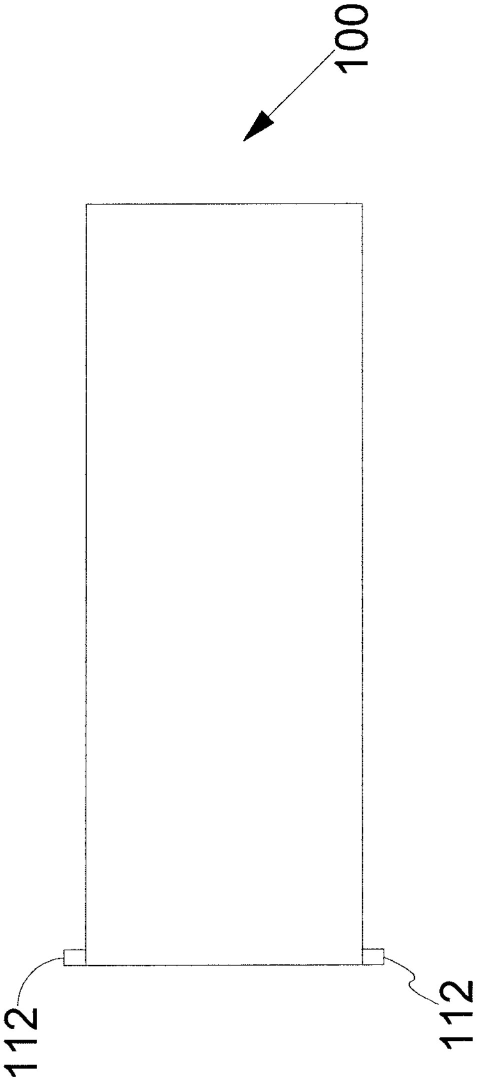
FIG. 36A through FIG. 36F are front, rear, top, bottom and side views showing six sides of an assembly including a magnet and a baseplate.
Figure 36B:
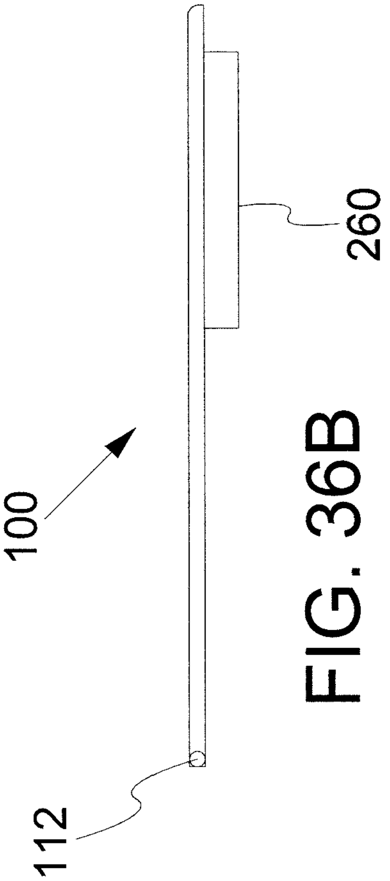
Figure 36C:
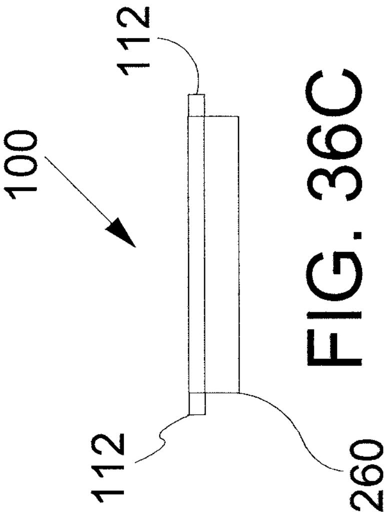
Figure 36D:
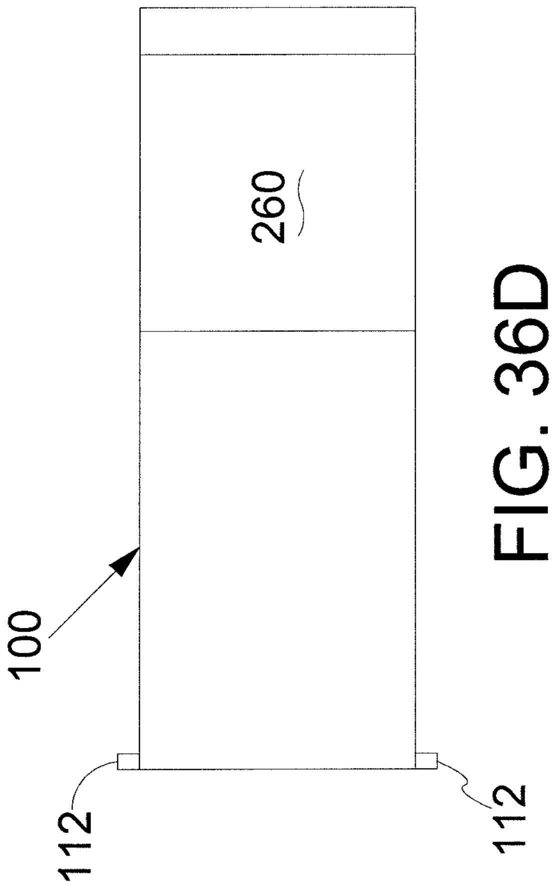
Figure 36E:
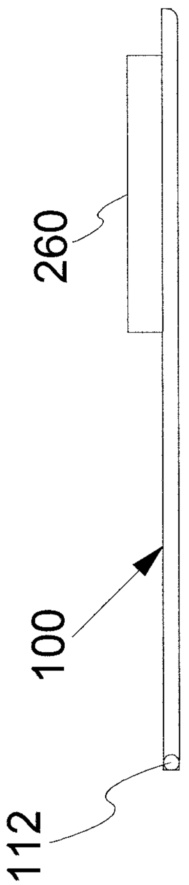
Figure 36F:
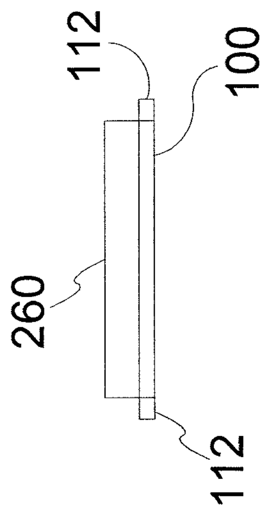
Figure 37C:
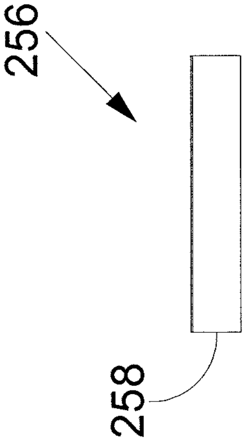
FIG. 37A through FIG. 37F are front, rear, top, bottom and side views showing six sides of a lever body.
Figure 37A:
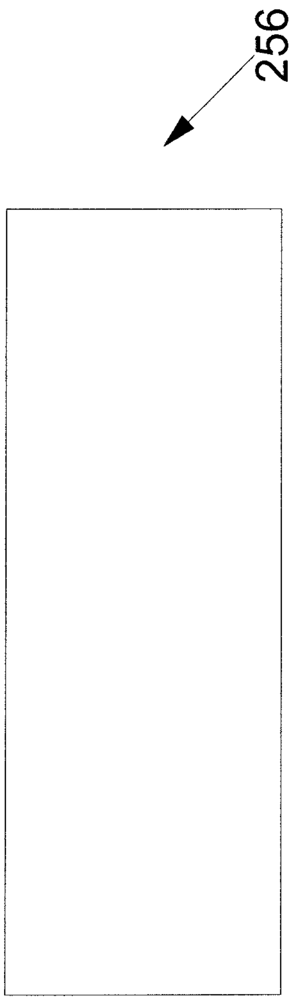
Figure 37B:
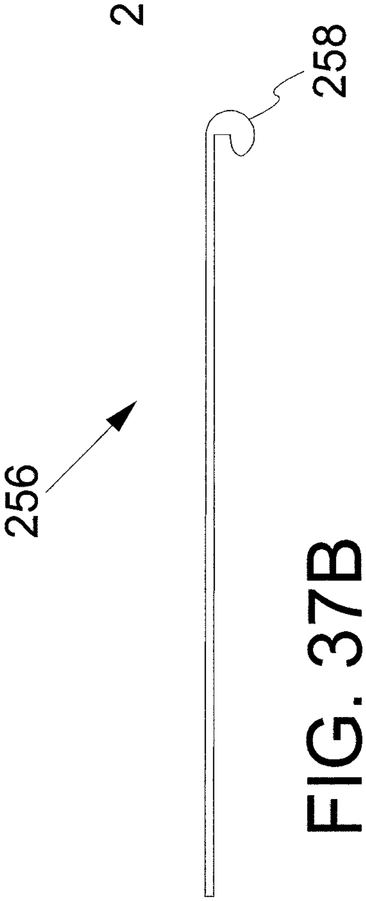
Figure 37D:
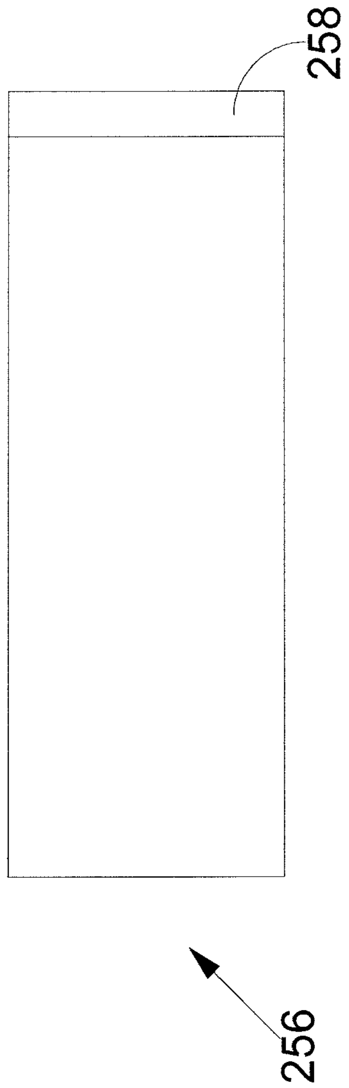
Figure 37E:
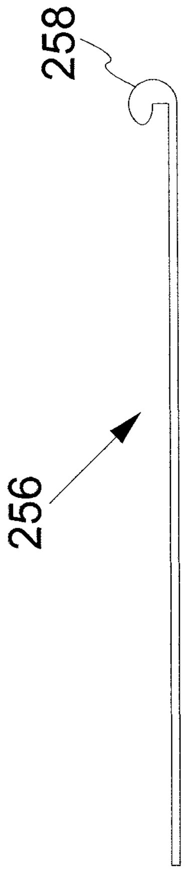
Figure 37F:
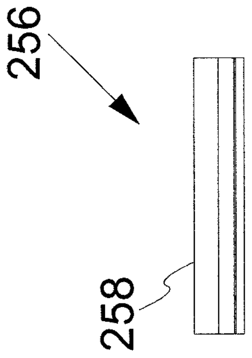

FIGS. 34A, 34B and 34C are a series of side views showing a device for detachable attachment to a ferromagnetic object or surface. FIGS. 34A, 34B and 34C may be collectively referred to as FIG. 34. In the example embodiment shown in FIG. 34, the device comprises a base housing 254 defining a pocket that receives a magnet and a baseplate 100 that is fixed to the magnet. With reference to FIG. 34 it will be appreciated that portions of the baseplate 100 extending beyond the periphery of the magnet overlay a front surface of the base housing 254. The baseplate 100 has the pivot portion 112 that engages a corresponding portion 114 of the base housing 254 to form a hinge joint 166 in the example embodiment of FIG. 34. The device also includes a lever body 256 including a camming portion 258 that engages a portion of the baseplate 100 in the example embodiment of FIG. 34. By comparing the positions of the lever body 256 in each of FIGS. 34A, 34B and 34C, it will be appreciated that the lever body 256 is rotatable about a fulcrum axis FA relative to the base housing 254. In the example embodiment of FIG. 34, the magnet and the baseplate 100 rotate about the pivot axis PA as the lever body 256 pivots about the fulcrum axis FA. In some embodiments, forces applied to the baseplate by the camming portion 258 of the lever body 256 urging the magnet and the baseplate 100 to pivot about the pivot axis PA.'

FIG. 35A through FIG. 35F are front, rear, top, bottom and side views showing six sides of a base housing 254. FIG. 36A through FIG. 36F are front, rear, top, bottom and side views showing six sides of an assembly including a magnet 260 and a baseplate 100. FIG. 35A through FIG. 35F and FIG. 36A through FIG. 36F may be referred to collectively as FIG. 35 and FIG. 36, respectively. Terms such as front view and top view are used herein as a convenient method for differentiating between the views shown in FIG. 35 and FIG. 36. It will be appreciated that the elements shown in FIG. 35 and FIG. 36 may assume various orientations without deviating from the spirit and scope of this detailed description. Accordingly, the terms front view, right side view, top view, rear view, left side view, bottom view, and the like should not be interpreted to limit the scope of the invention recited in the attached claims. In the example embodiment shown in FIG. 35, the base housing 254 defines a pocket that is dimensioned and configured to receive a magnet such as magnet 260 shown in FIG. 36. With reference to FIG. 35 it will be appreciated that portions of the baseplate 100 extending beyond the periphery of the magnet 260. The baseplate 100 (shown in FIG. 36) has the pivot portions 112 that may engage corresponding portions 114 of the base housing 254 (shown in FIG. 35) to form a hinge joint.

FIG. 37A through FIG. 37F are front, rear, top, bottom and side views showing six sides of a lever body 256. FIG. 37A through FIG. 37F may be collectively referred to as FIG. 37. In the example embodiment of FIG. 37, the lever body 256 includes a camming portion 258 may engage a portion of the baseplate 100 (shown in FIG. 36) and a cam receiving portion of the base housing 254 (shown in FIG. 5). In some embodiments, the lever body 256 is rotatable about a fulcrum axis relative to the base housing 254. In some embodiments, forces applied to the baseplate by the camming portion 258 of the lever body 256 urging the magnet and the baseplate 100 to pivot about pivot axis defined by a hinge joint.

Referring to FIGS. 33A through 37F, in some example embodiments, a device for detachable attachment to a ferromagnetic object or surface comprises a base housing 254 defining a pocket 138 and a magnet 260 disposed in the pocket 138 defined by the base housing 254. The magnet 260 may generate a magnetic field and the magnetic field may produce a magnetic attraction force between the magnet 260 and the ferromagnetic object. In some embodiments, a baseplate 100 is fixed to the magnet 260. In some embodiments, the baseplate 100 includes a tab portion 154 extending beyond a first side of a periphery of the magnet 260 and a pivot portion 112 located beyond a second side of the periphery of the magnet 260 opposite the tab portion 154. In some embodiments, the pivot portion 112 of the baseplate 100 engages a corresponding portion 114 of the base housing 254 to form a hinge joint 166. In some embodiments, the baseplate 100 and the magnet 260 selectively pivot about a pivot axis PA of a hinge joint 166 relative to the base housing 254. In some embodiments, the device includes a lever body 256 including a camming portion 258 that engages the tab portion 154 of the baseplate. In some embodiments, the lever body 256 is rotatable about a fulcrum axis FA relative to the base housing. In some embodiments, the camming portion 258 of the lever body 256 applies a force to the tab portion 154 of the baseplate 100 upon rotation of the lever body 256 relative to the base housing 254. In some embodiments, forces applied to the tab portion 154 of the baseplate by the camming portion 258 of the lever body 256 urging the magnet 260 and the baseplate 100 to pivot about the pivot axis PA. In some embodiments, the magnet 260 and the baseplate 100 rotate about the pivot axis PA as the lever body 256 pivots about the fulcrum axis FA.

Figure 38B:
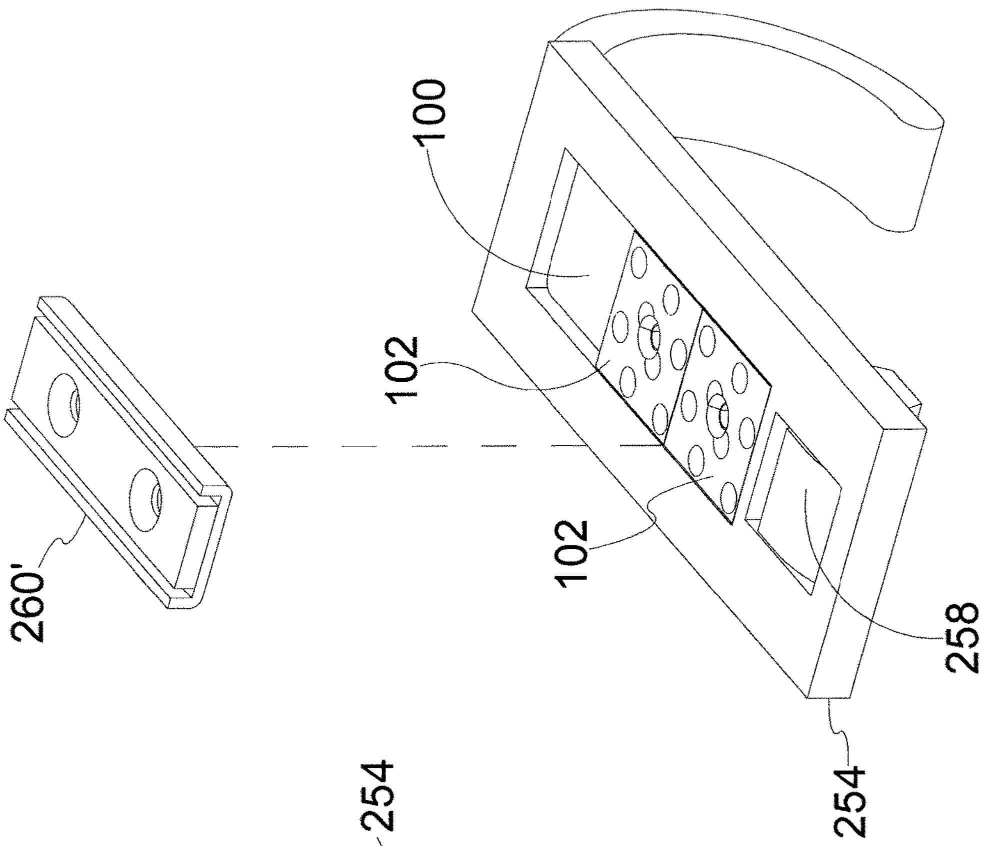
FIGS. 38A and 38B are perspective views showing a device for detachable attachment to a ferromagnetic object or surface.
Figure 38A:
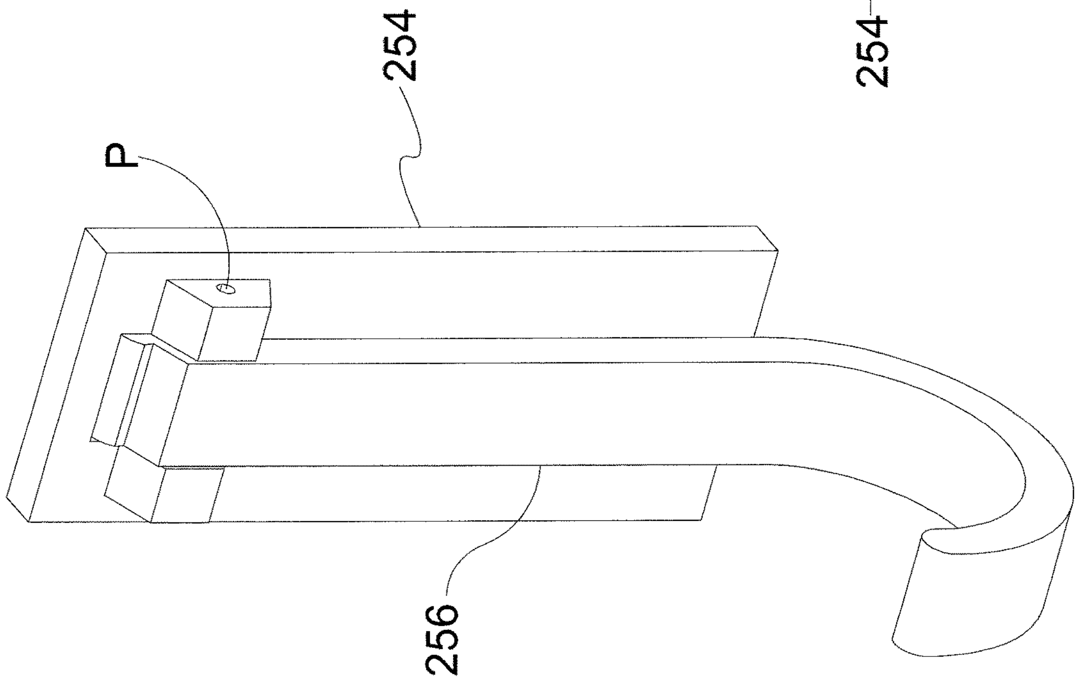

FIGS. 38A and 38B are perspective views showing a device for detachable attachment to a ferromagnetic object or surface. FIGS. 38A and 38B may be collectively referred to as FIG. 38. In the example embodiment shown in FIG. 38, the device comprises a base housing 254 defining a pocket 138 and a magnet 260 that is located inside the pocket 138 defined by the base housing 254. In some embodiments, the device includes a magnet 260 comprising two magnetic sheets 102. In other embodiments, the device includes a magnet 260' comprising a channel magnet. In the example embodiment of FIG. 38, the device includes a lever body 256 that is pivotally coupled to the base housing 254 by a pin P. In the example embodiment of FIG. 38, the lever body 256 includes a hook portion and a camming portion 258. In some embodiments, the lever body 256 is rotatable about the pin P relative to the base housing 254. In some embodiments, forces applied to an adjacent object or surface by the camming portion 258 of the lever body 256 urge the magnet 260 away from the object or surface.

Figure 39A:
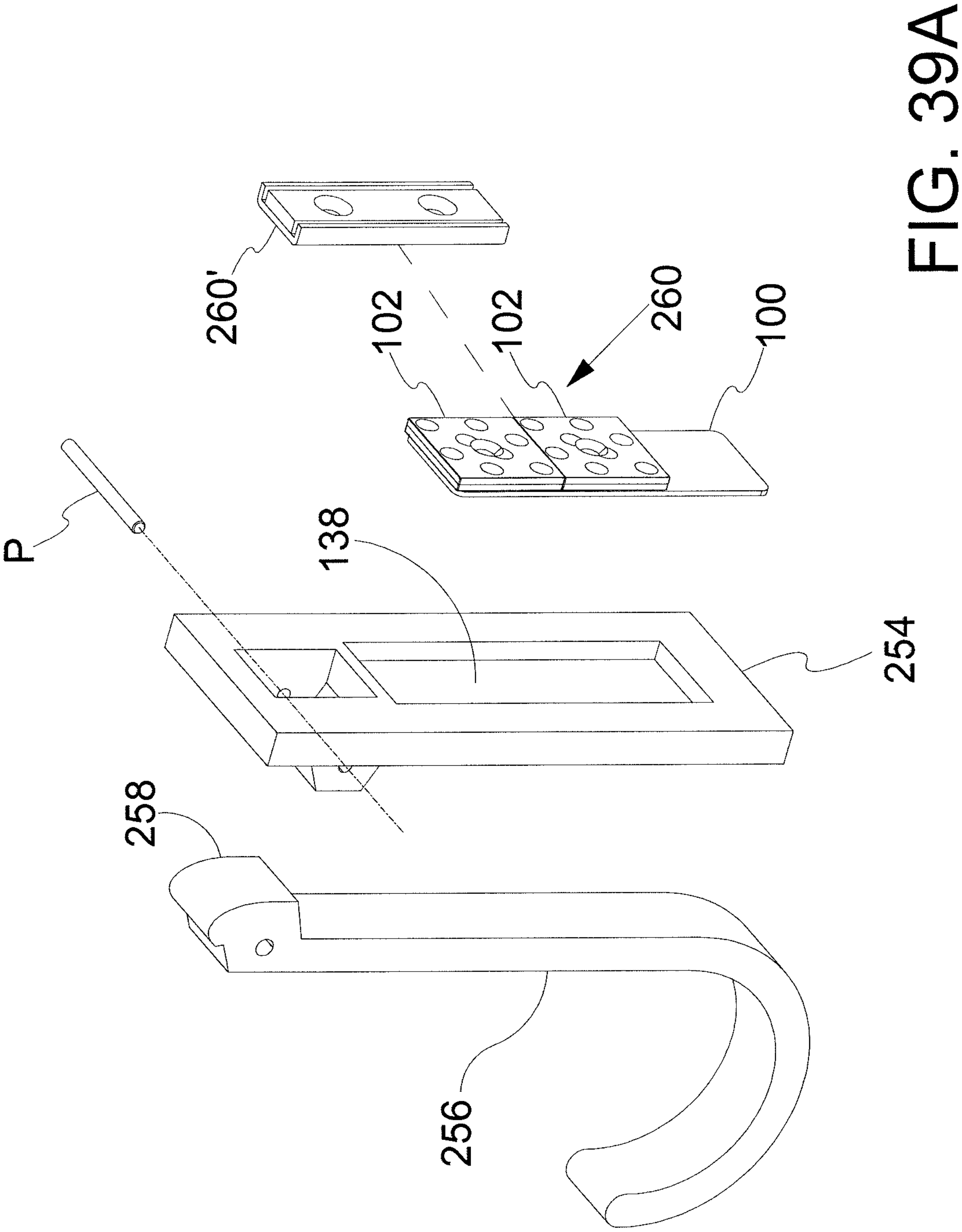
FIGS. 39A and 39B are exploded perspective views showing a device for detachable attachment to a ferromagnetic object or surface.
Figure 39B:
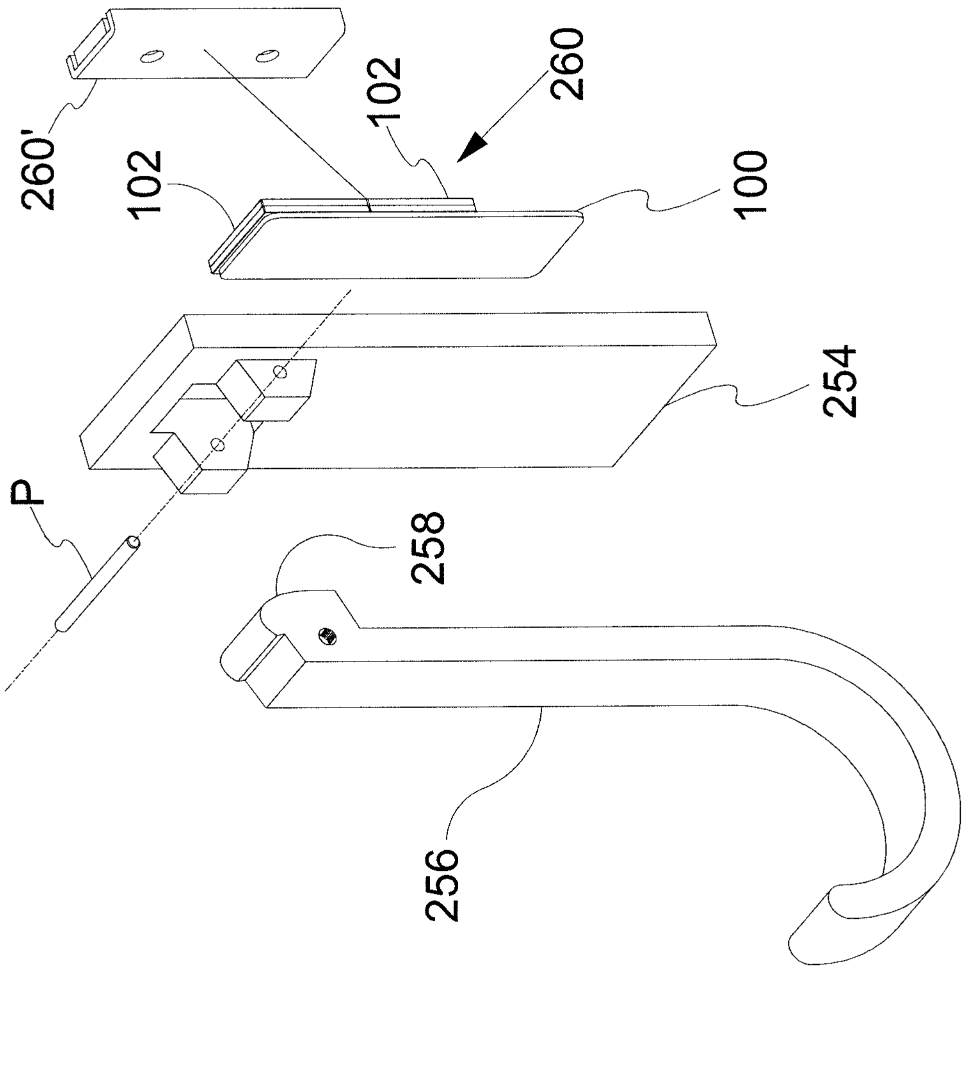

FIGS. 39A and 39B are exploded perspective views showing a device for detachable attachment to a ferromagnetic object or surface. FIGS. 39A and 39B may be collectively referred to as FIG. 39. In the example embodiment shown in FIG. 39, the device comprises a base housing 254 defining a pocket 138 that receives a magnet 260. In some embodiments, the device includes a magnet 260 comprising two magnetic sheets 102. In other embodiments, the device includes a magnet 260' comprising a channel magnet. In the example embodiment of FIG. 39, a baseplate 100 is fixed to the magnet 260 and portions of the baseplate 100 extend beyond the periphery of the magnet 260. In the example embodiment of FIG. 39, the device includes a lever body 256 that is pivotally coupled to the base housing 254 by a pin P. In the example embodiment of FIG. 39, the lever body 256 includes a hook portion and a camming portion 258. In some embodiments, the lever body 256 is rotatable about the pin P relative to the base housing 254. In some embodiments, forces applied to an adjacent object or surface by the camming portion 258 of the lever body 256 urge the magnet 260 away from the object or surface.

Figure 40:
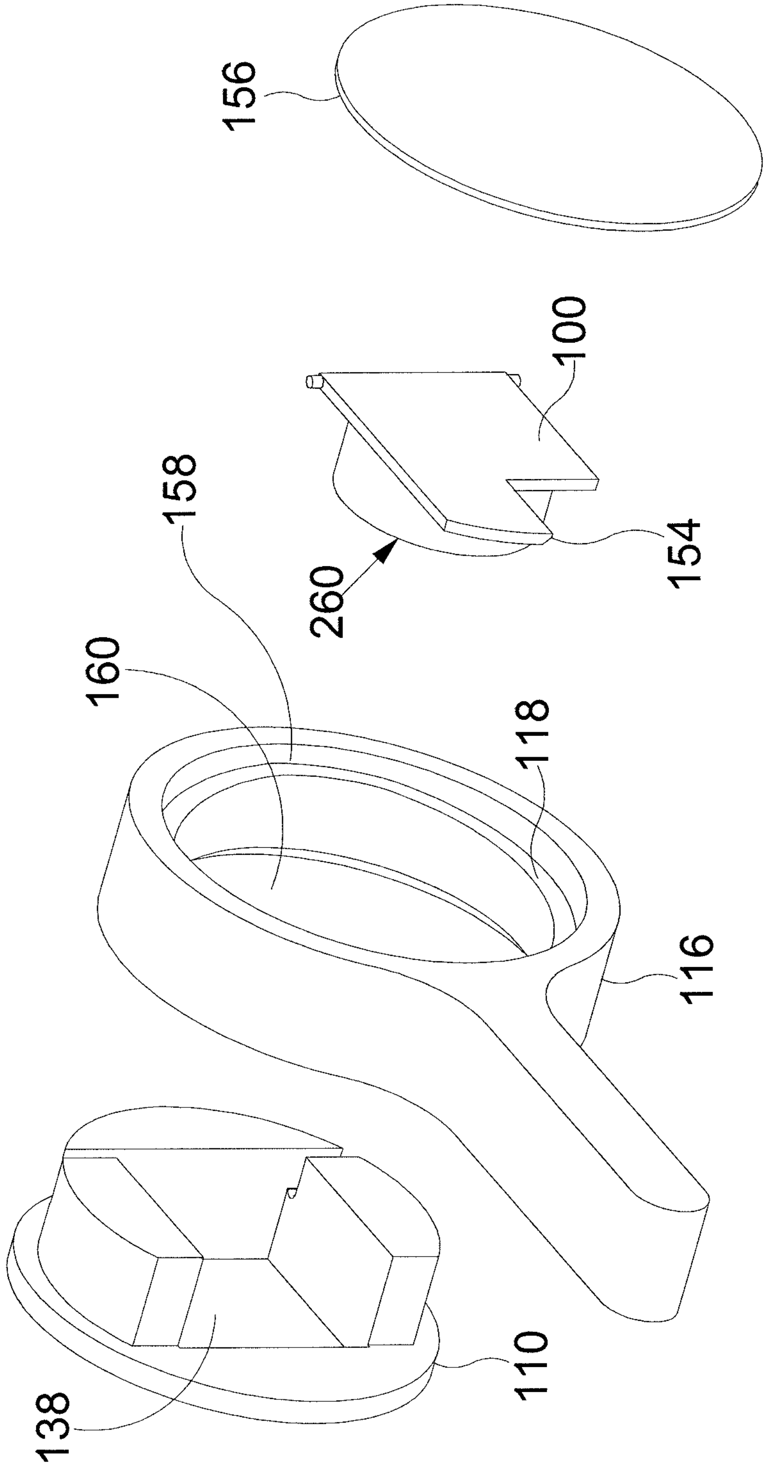
FIGS. 40 and 41 are exploded perspective views showing a detachable magnet device in accordance with an additional example embodiment.
Figure 41:
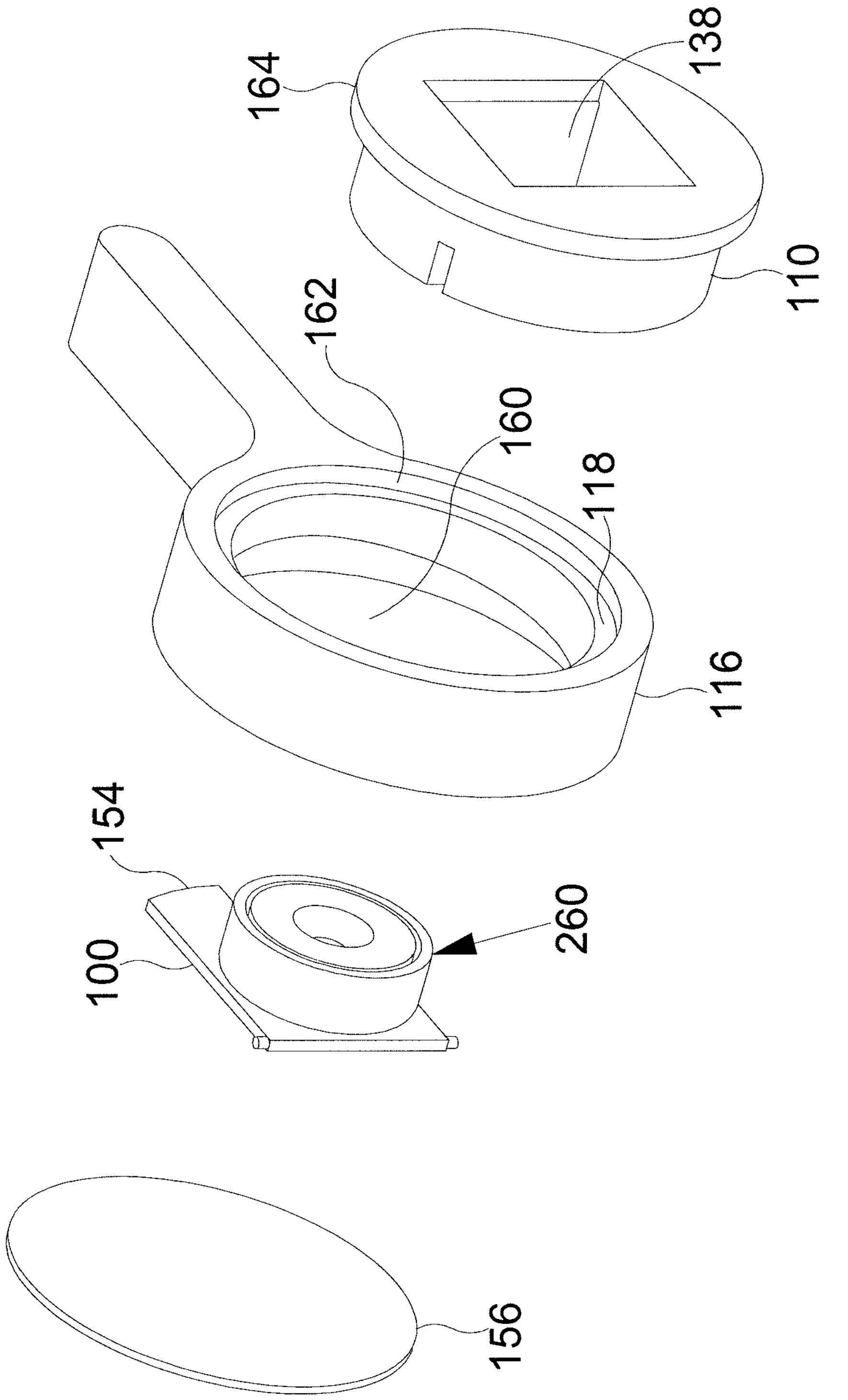
Figure 43:
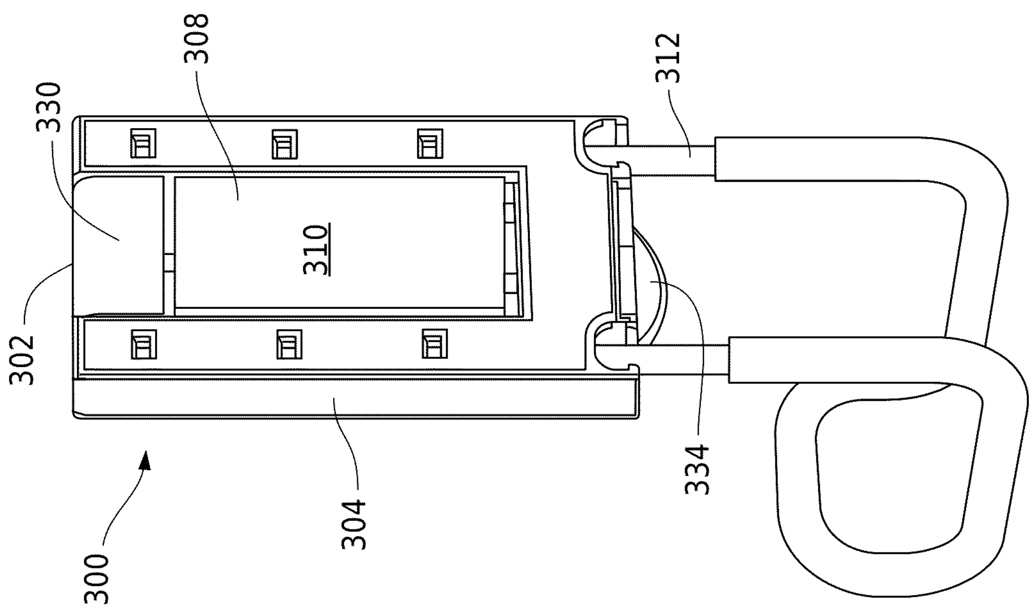
FIG. 43 is a rear perspective view of the detachable magnet device of FIG. 42.
Figure 42:
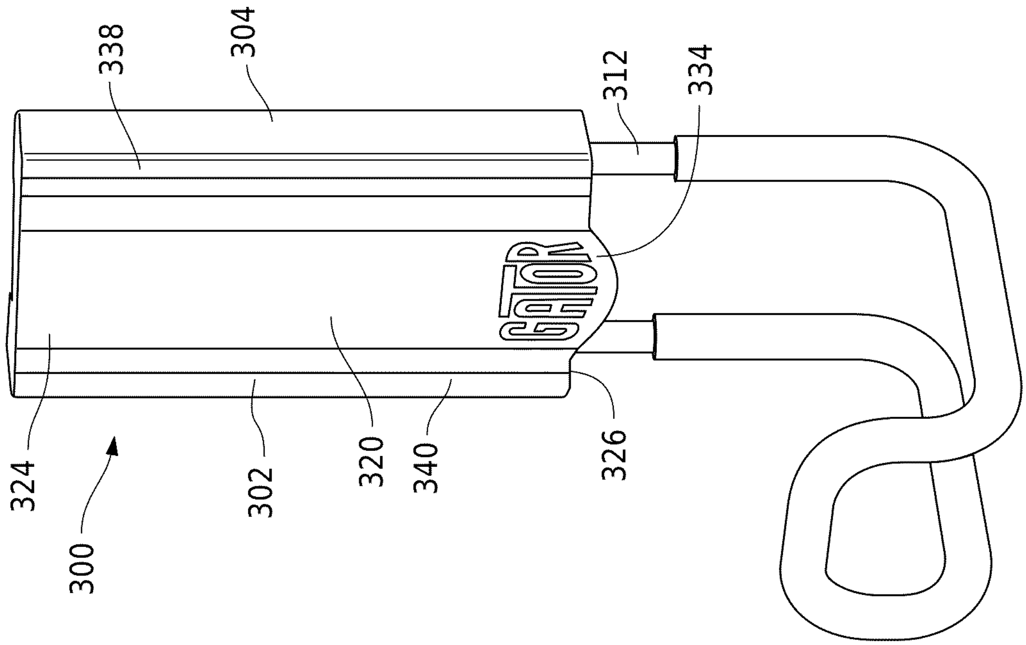
FIG. 42 is a front perspective view of a detachable magnet device, according to an embodiment.
Figure 45:
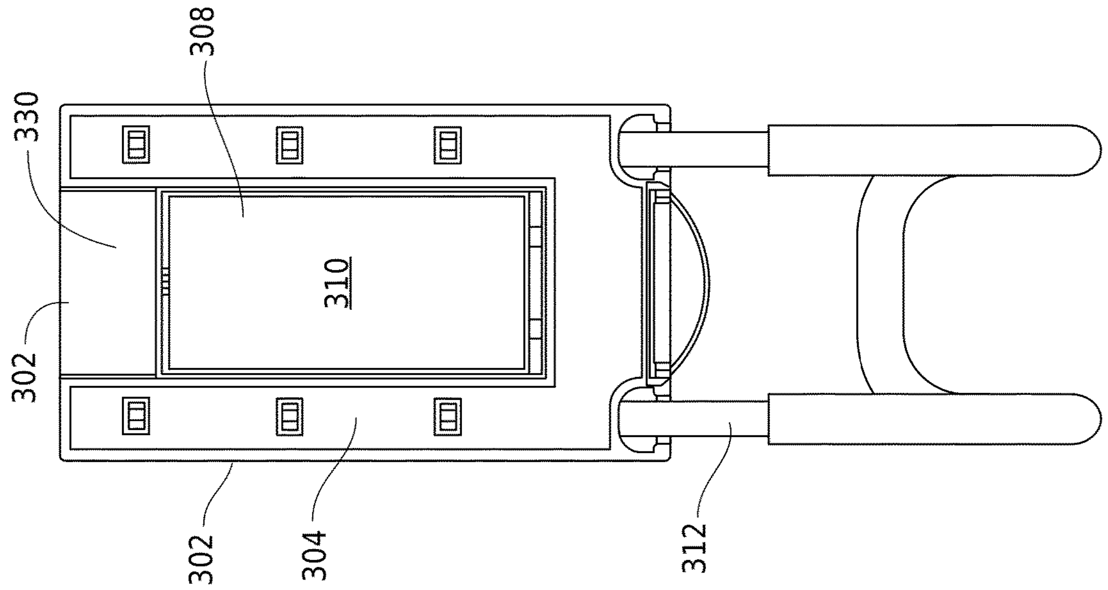
FIG. 45 is a rear view of the detachable magnet device of FIG. 42.

FIGS. 40 and 41 are exploded perspective views showing a detachable magnet device in accordance with an additional example embodiment. In the example embodiment of FIGS. 40 and 41, the detachable magnet device comprises a core housing 110 defining a pocket 138, a magnet 260 that is received in the pocket 138, and a baseplate 100 that is fixed to the magnet 260. In the example embodiment of FIGS. 40 and 41, the magnet 260 comprises a cup magnet. With reference to FIGS. 40 and 41, it will be appreciated that the baseplate 100 includes a tab portion 154 that extends beyond a periphery of the magnet 260 in the example embodiment shown. Also in the example embodiment of FIGS. 40 and 41, the baseplate 100 also includes a pivot portion 112 that is received in a corresponding portion 114 of the core housing 110 to form a hinge joint such that the baseplate 100 and the magnet 260 selectively pivot relative to the core housing 110.

In the example embodiment of FIGS. 40 and 41, the device includes a cap member 156 that can be fixed to the core housing 110 with the camming rib 118 disposed between the cap member 156 and a flange portion 164 of the core housing 110. In the example embodiment of FIGS. 40 and 41, the annular body 116 defines a counterbore 162 and the flange portion 164 of the core housing 110 is disposed at least partially in the counterbore 162 defined by the annular body 116 when the device is assembled. Also in the example embodiment of FIGS. 40 and 41, the annular body 116 defines a relief 158 and a portion of the cap member 156 is disposed in the relief 158 defined by the annular body 116 when the device is assembled. In some embodiments, the annular body 116 has a counterbore 162 opening in a first direction, a relief 158 opening in a second direction, and a camming rib 118 disposed between the counterbore 162 and the relief 158. In some embodiments, the cap member 156 has a disk-shaped body. In some embodiments, the cap member 156 has a circular shape when viewed as an orthographic projection.

Referring to FIGS. 42-74, another embodiment of a device 300 for detachable attachment to a ferromagnetic object with attachment surface, is depicted. In an embodiment, device 300 is configured to achieve a maximum frictional holding force of device 300 affixed to a vertically-oriented ferromagnetic attachment surface (though other orientations may be used). Maximizing the frictional holding force of device 300 enables relatively heavy objects to be connected to, or hung from, device 300, while maintaining attachment to the attachment surface. As explained further below, a number of factors contribute to a maximized frictional holding force of device 300, including an inventive mechanical structure, magnetic flux configurations, and a combination of optimized materials. Further, in addition to maximizing holding force, device 300 is also configured to be released from an attached object with minimal release force required.

In an embodiment, device 300 is a magnetic device that includes a holding or hanging portion 312, which may be a hook or a hangar, as described in further detail below, and is particularly optimized for detachable attachment to a vertically-positioned surface of a ferrous or ferromagnetic object. As also described further below, holding or hook portion 312 may be used to hold, hook or otherwise retain an object, such as a held item or object O (see also FIG. 63) adjacent to the ferromagnetic object to which device 300 is magnetically attached. For example, device 300 may be magnetically attached to a surface of a ferromagnetic object, e.g., a steel cabinet, and another object, for example, a tool (object O), may be placed on holding portion 312 so as to hold the tool near or at the surface of the ferromagnetic object, e.g., the steel cabinet. In an embodiment, the surface of the ferromagnetic object may be painted or otherwise coated, though in some embodiments, the target object. Hereinafter, device 300 for detachable attachment to the surface of the ferromagnetic object will simply be referred to as "magnetic attaching device" 300 or "device" 300.

Figure 49:
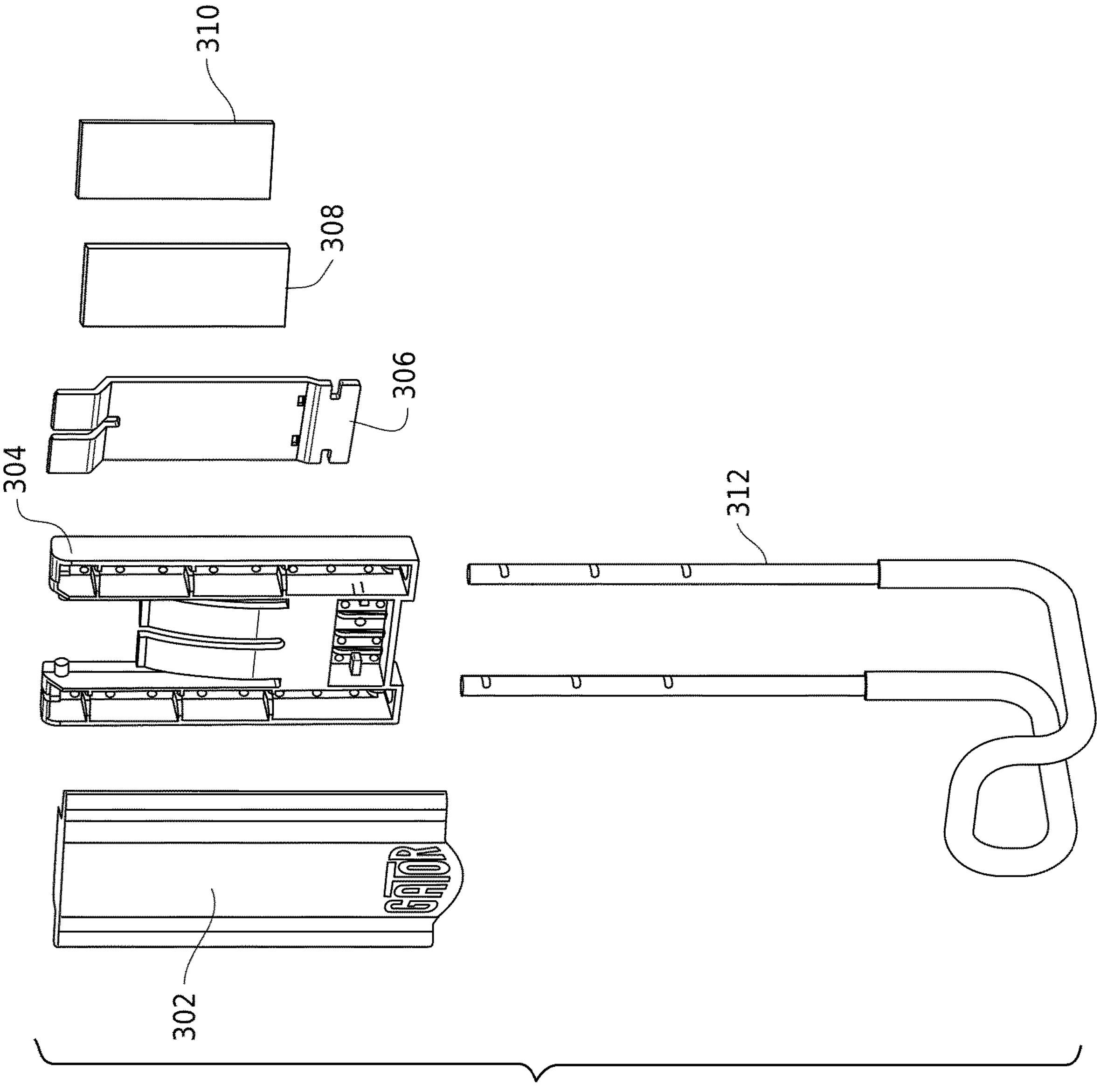
FIG. 49 is an exploded view of the detachable magnet device of FIG. 42.

Various views of an assembled embodiment of magnetic attaching device 300 are depicted in FIGS. 42-48; an exploded view of magnetic attaching device 300 is depicted in FIG. 49.

Referring to specifically to FIG. 49, in an embodiment, magnetic attaching device 300 comprises cover 302, base 304, magnet-retaining portion 306, magnetic device 308, optional magnet surface cover 310, and holding portion 312.

Figure 51:
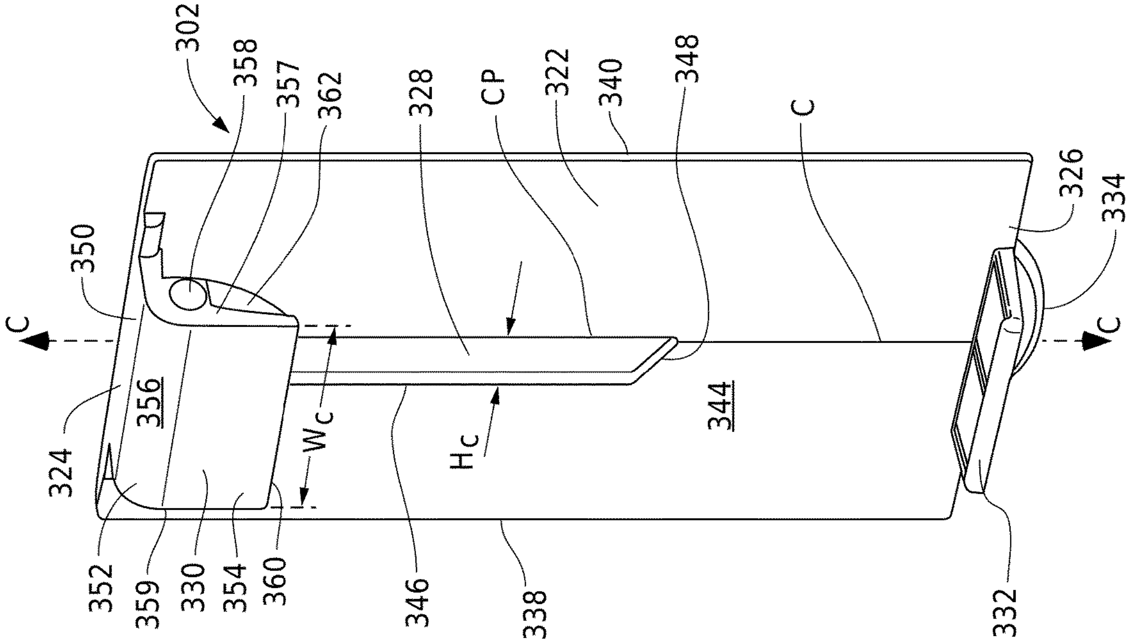
FIG. 51 is a rear perspective view of the levering cover of FIG. 50.
Figure 50:
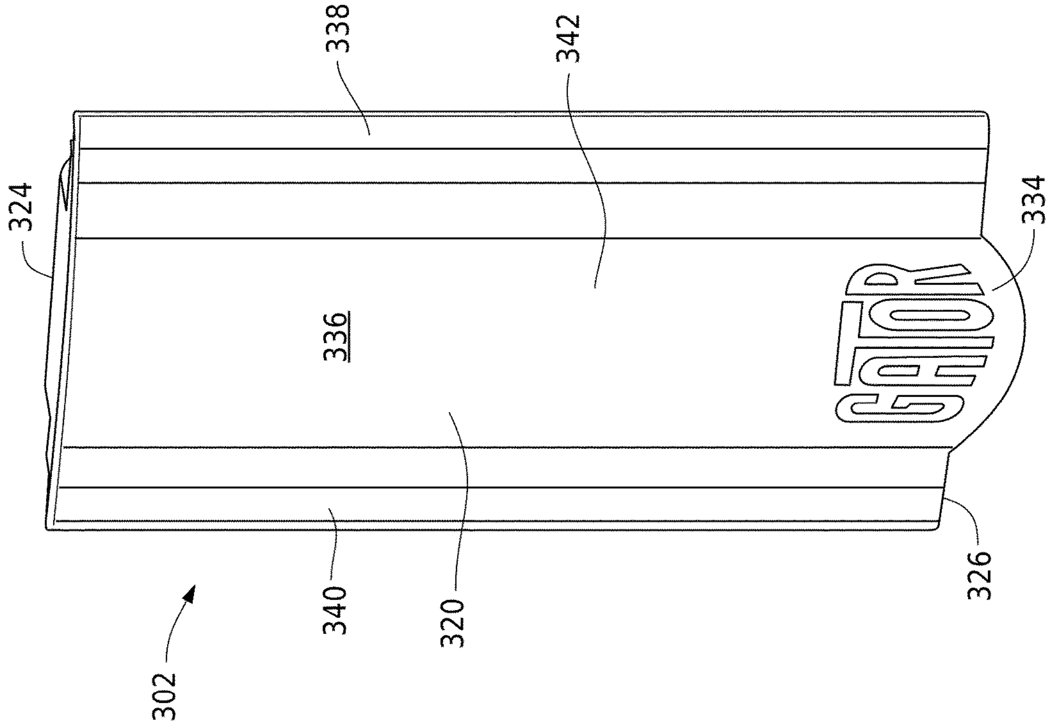
FIG. 50 is a front perspective view of a levering cover of the detachable magnet device of FIG. 42, according to an embodiment.
Figure 52:
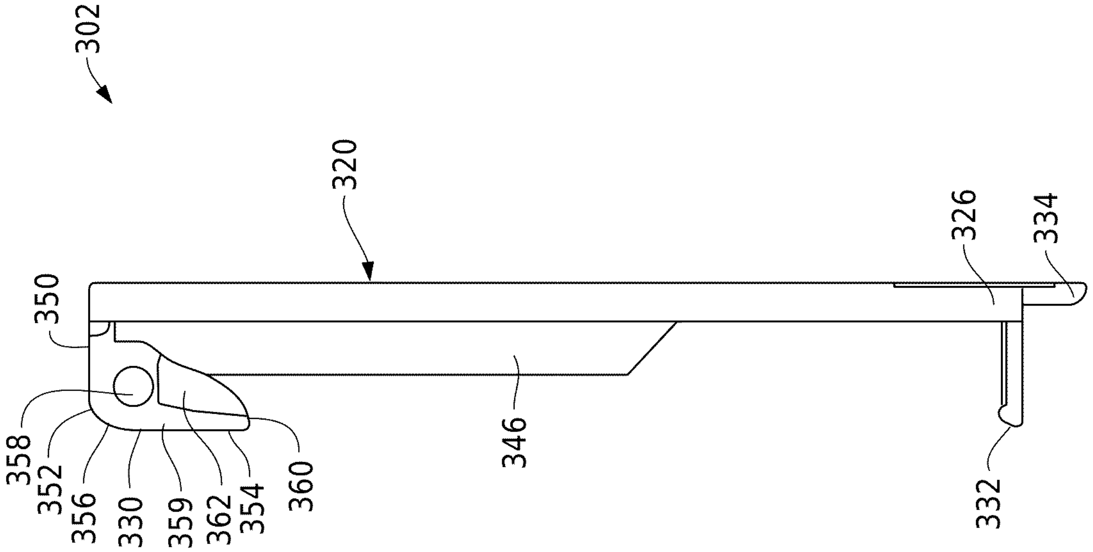
FIG. 52 is a left-side view of the levering cover of FIG. 50, with some hidden elements depicted with dashed lines.

Referring to FIGS. 50-52, an embodiment of cover 302 is depicted. In this embodiment, cover 302 is a single-piece, unitary structure which may provide not only some manufacturing cost advantages, but may also provide some strength benefits since in an embodiment, and as depicted herein, cover 302 is and acts as a lever, and is therefore a rotatable levering cover 302. However, in other embodiments, levering cover 302 may comprise a multi-portion assembled structure.

In an embodiment, levering cover 302 comprises a polymer material, such as polyvinylchloride (PVC) polypropylene (PP), polyethylene, ABC, DEF, and so on. Other embodiments of levering cover 302 may comprise materials other than polymers, such as metals, composite materials, and so on.

As depicted, and in an embodiment, levering cover 302 includes front side 320, rear side 322, top portion 324, and bottom portion 326.

Lever cover 302 may also include support portion 328 projecting from rear side 322, magnet lifting portion 330 at top portion 324, fastening portion 332 at bottom portion 326 and projection or tab portion 334 at bottom portion 326.

Referring specifically to FIG. 50, front side 320 includes front surface 336, first or right edge 338, second or left edge 340, central portion 342 and projection or tab portion 334. In an embodiment, front surface 336 may be generally flat and planar at central portion 336, extending from top portion 324 to bottom portion 326. First and second edges 338 and 340 may be curved or beveled, in an embodiment, such that central portion 342 projects normally away from front surface 336 further than first and second edges 338 and 340.

Projection portion 334, in an embodiment, is generally flat and projects downward in a top-to-bottom direction and away from bottom portion 326, forming a tab or other shape easily accessible to, or graspable by, a user.

Referring to FIG. 51, rear side 322 includes rear surface 344 and may be generally flat, or may define a curvature to enhance the strength of levering cover 302, and/or to provide clearance for adjacent portions of magnetic attachment device 300, as described further below.

Support portion 328 extends centrally along central vertical axis C from top portion 324 toward bottom portion 326, and projects outwardly and away from rear surface 344. In the embodiment depicted, support portion extends along its length from approximately a top-most portion of top portion 324 toward bottom portion 326, terminating past a center point CP on central vertical axis C, though in other embodiments, support portion 328 may terminate between center point CP and top portion 324, or alternatively, terminate at another point along central vertical axis C that is between center point CP and bottom portion 326.

In an embodiment, and as depicted, support portion comprises a generally flat wall or fin shape, includes top edge 346, terminal edge 348 and defines a height Hc. In an embodiment, terminal edge 348 may be sloped so as to form an obtuse angle with central vertical axis C.

Support portion 328 provides structural support and strength to levering cover 302, with a longer length providing more support. A length and height Hc of support portion 328 may be defined not only by desired strength, but also by desired fitment with base 302 and magnet-retaining portion 306, which are described further below.

Referring also to FIG. 52, lifting portion 330, in an embodiment and as depicted, includes first portion 350, second portion 352, third portion 354, outer surface 356, first side portion 357 and second side portion 359. First portion 350 is connected to top portion 324 of levering cover 302; second portion 352 is between first portion 350 and third portion 354; and third portion 354 forms an end of lifting portion 330. Lifting portion 330 defines a width Wc at third portion 354. In an embodiment, width Wc is less than an overall width of levering cover 302.

In an embodiment, and as depicted, first portion 350 may be a generally planar portion extending horizontally and away from rear surface 344.

Second or middle portion 352 may be a curved portion with a curved outer surface, and defines channel 358. In an embodiment, channel 358 is a through channel that extends the entire width Wc of lifting portion 330. In another embodiment, channel 358 is a first blind channel or hole, and an opposite side of second portion 352 defines a second blind channel or hole. Channel 358 is configured to receive a pivot pin or projection(s) that acts as a fulcrum and about which levering cover 302 pivots, as described further below. A central axis extending through a center of channel 358 may define a rotation or fulcrum axis for cover 302.

Third portion 354, also described herein as a magnet-retaining-portion lifter, may be a generally planar portion extending vertically and away from second or middle portion 352. In an embodiment, third portion 354 includes, and terminates at, edge 360, which is configured to engage with magnet-retaining portion 306.

First and second sides 357, 359 of lifting portion 330 extend between, and join first, second and third portions 350, 352 and 354, and define clearance recess 362 on each side.

Figure 54:
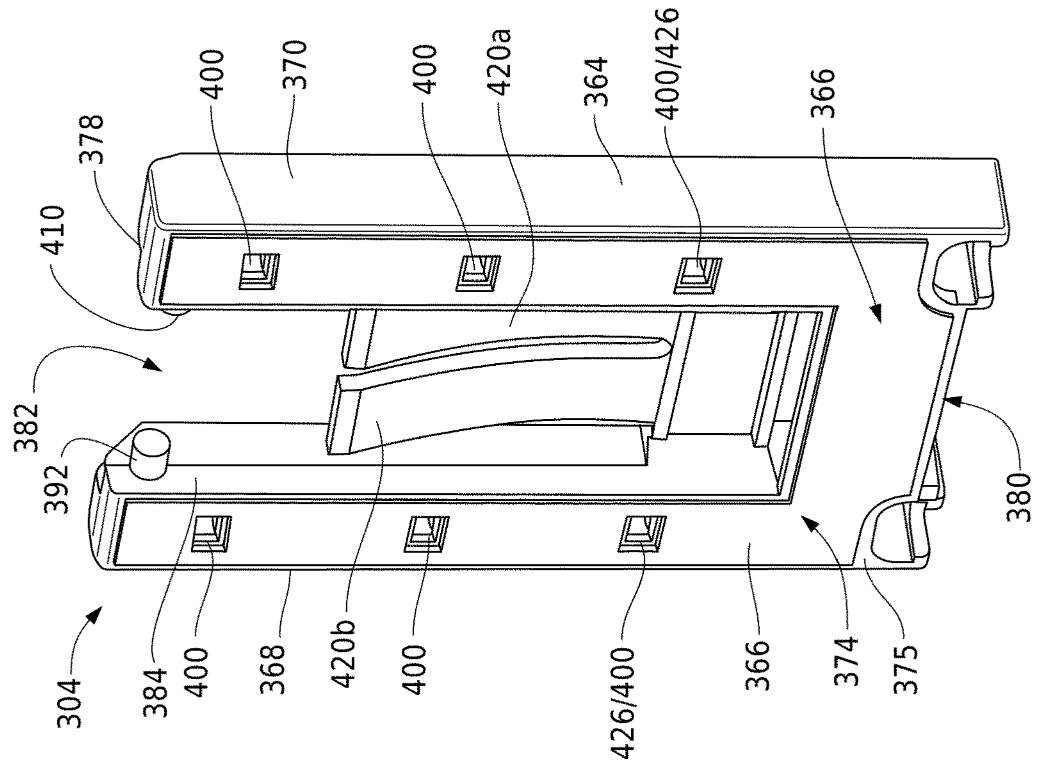
FIG. 54 is a rear perspective of the base of FIG. 53.
Figure 53:
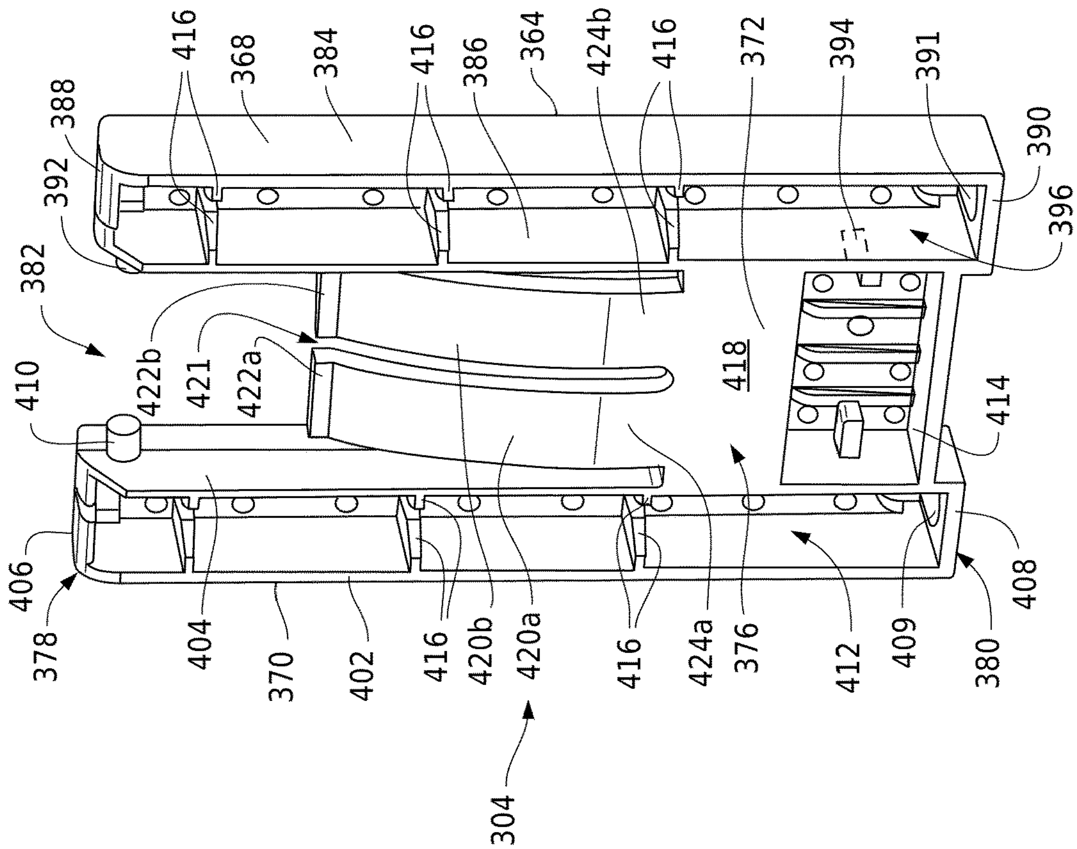
FIG. 53 is a front perspective of a base of the detachable magnet device of FIG. 42, according to an embodiment.
Figure 57:
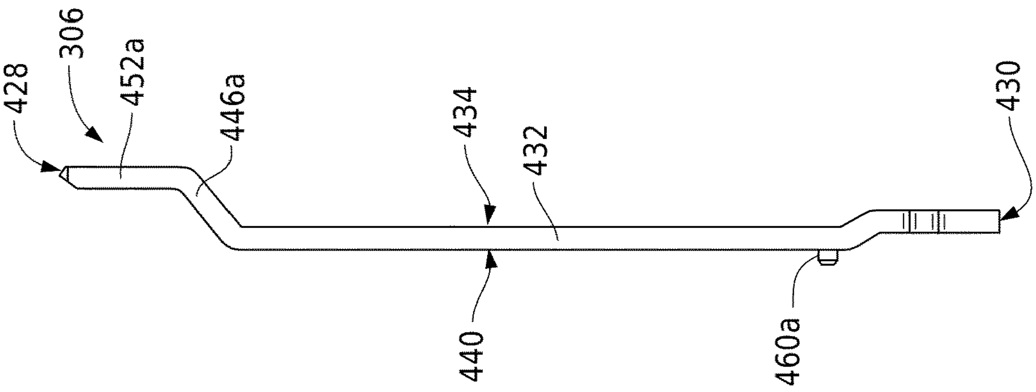
FIG. 57 is a side view of the magnet-retaining portion of FIG. 55.
Figure 56:
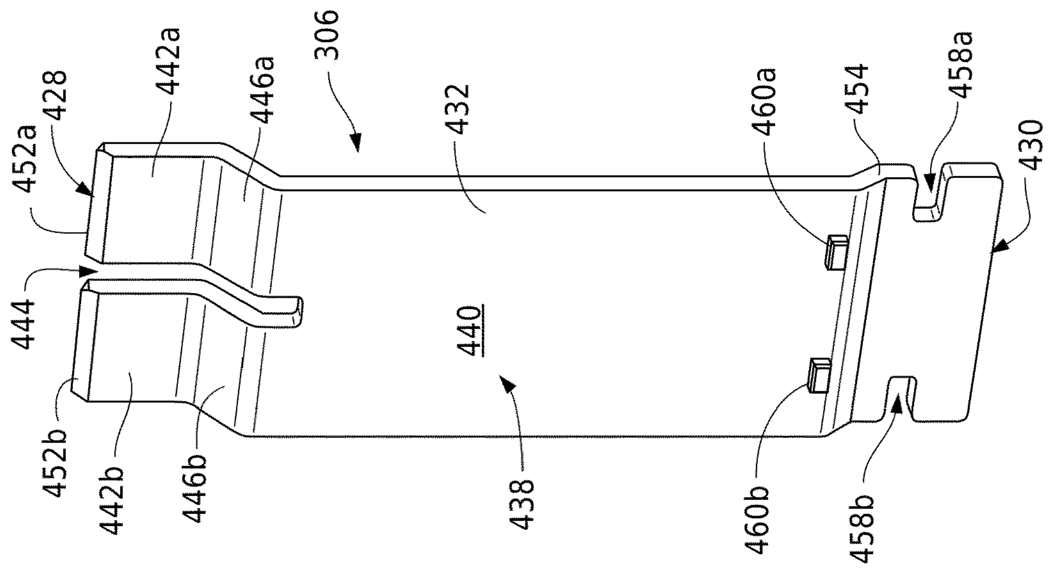
FIG. 56 is a rear perspective of the magnet-retaining portion of FIG. 55.
Figure 55:
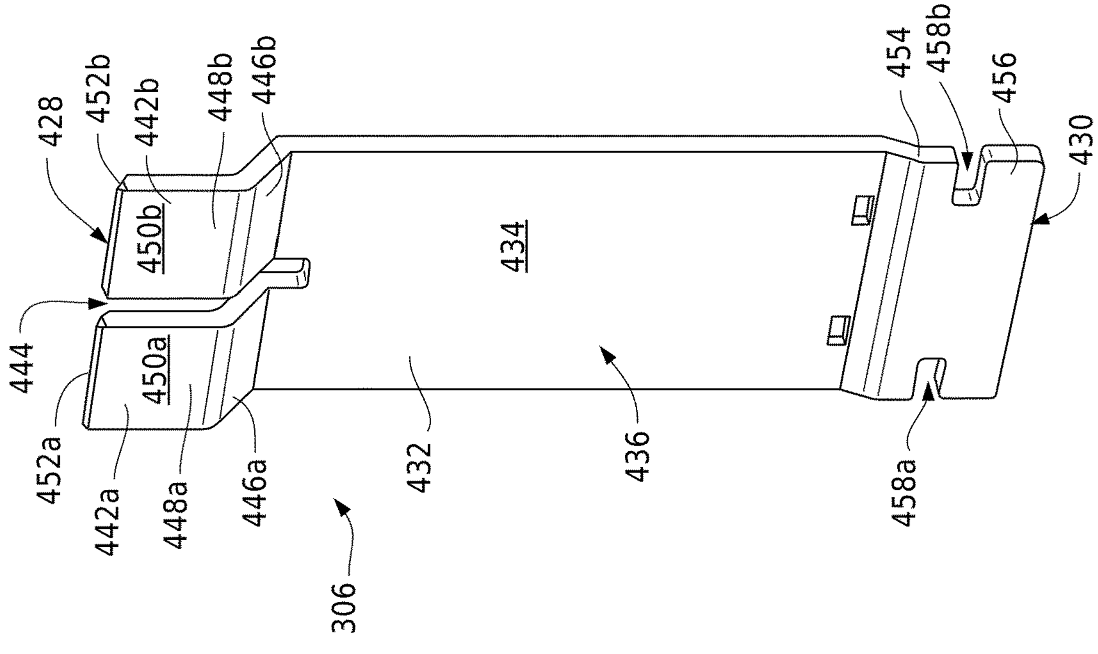
FIG. 55 is a front perspective of a magnet-retaining portion of the detachable magnet device of FIG. 42, according to an embodiment.

Referring to FIGS. 53-54, base portion 304, is depicted. In an embodiment, and as depicted, base portion 304 includes main base portion or frame portion 364 and contact or grip portion 366.

Frame portion 364 includes first or right portion 368, second or left portion 370, and middle portion 372, rear side 374 with rear surface 375, front side 376, top end 378 and bottom end 380. Base portion 304 also defines gap or cavity 382 between first portion 368 and second portion 370, which in an embodiment is configured to receive magnet-retaining portion 306 with magnetic device 308.

In an embodiment, frame portion 364 may comprise a first relatively rigid material, such as a relatively rigid polymer material, including PVC, PE, and so on. Embodiments wherein frame 364 comprises a more rigid material may be advantageous by transmitting forces applied by magnetic device 308 with limited compression. As described further below, in contrast, grip portion 366 may comprise a second relatively soft gripping material on rear side 374 for contacting the attachment surface, allowing for more compression and improved grip.

First base portion 368 extends generally vertically, from top end 378 to bottom end 380 and includes first, outside wall 384 extending vertically from top to bottom, second, inside wall 386 also extending vertically from top to bottom, third horizontally-extending, top wall 388 and fourth, bottom horizontally-extending wall 390 with opening 391, first (upper) projection 392 and second (lower) projection 394. The four walls 384-390 define channel 396, and add strength and rigidity to first base portion 368 and frame portion 364.

First projection 392 may be a pivot projection or pin at top end 378, extending inwardly into gap 382, and functioning as a fulcrum or pivot point for cover 302. Second projection 394 at bottom end 380 also extends inwardly.

In an embodiment, first base portion 368 may also define a plurality of holes 400, which may be through holes, useful in manufacturing plastic embodiments of first base portion 368. In other embodiments, holes 400 may not be present.

Second base portion 370 extends generally vertically, from top end 378 to bottom end 380 and includes first, outside wall 402 extending vertically from top to bottom, second, inside wall 404 also extending vertically from top to bottom, third horizontally-extending, top wall 406 and fourth, bottom horizontally-extending wall 408 with opening 409, first projection 410 and second projection 412. The four walls 402-408 define channel 414, and add strength and rigidity to second base portion 370 and frame portion 364.

First projection 410 of second base portion 370 may be a pivot projection or pin at top end 378, extending inwardly (left to right) into gap 382, and function as a fulcrum or pivot point for cover 302, in conjunction with projection 392. Second projection 412 at bottom end 380 also extends inwardly.

In an embodiment, second base portion 370 may also define a plurality of holes 400 which may be through holes, useful in manufacturing plastic embodiments of second base portion 378. In other embodiments, holes 400 may not be present.

In the embodiment depicted, each wall 384, 386 includes three projections or ribs 416, though more or fewer ribs may be present.

Middle portion 372 of frame portion 364 is connected to each of first and second portions 368 and 370 at bottom end 380 by connecting portion 418. In an embodiment, and as depicted, middle portion 372 includes, in addition to connecting portion 418, at least one arm 420 or living hinge, which may apply pressure to magnet-retaining portion 306. In the embodiment depicted, middle portion 372 includes two arms 420, namely, arm 420*a* and 420*b*, defining gap 421 therebetween.

Each arm 420 includes a first end 422 connected to first connecting portion 418, and a second end 424, which terminates in free space. As such, arm 420*a* includes first end 422*a* and second, free end 424*a*, and arm 420*b* includes first end 422*b* and second, free end 424*b*. In an embodiment, each arm 420 is curved. In this embodiment, each arm 420 curves from front side 376 of frame portion 364 toward rear side 374.

Referring specifically to FIG. 54, grip portion 366 is depicted connected to frame portion 364. In an embodiment, grip portion 366 is connected to rear surface 375 of rear side 374 of frame 364. In an embodiment, rear surface 375 is generally flat or planar; in another embodiment, rear surface 375 defines a recess into which grip portion 366 is received.

In the embodiment depicted, grip portion 366 substantially covers rear surface 375. In this embodiment, grip portion 366 is generally U-shaped, and is placed against or is on first portion 368, second portion 370, and part of middle portion 372. Grip portion 366 includes contact or grip surface 367, which also may be described as an outer surface, and in an embodiment, may define holes 426 that align with holes 400 of frame portion 366.

In an embodiment, grip portion 366 extends in a front-to-back direction away from rear surface 375. The amount of extension may be equal to a thickness of grip portion 366 when front surface 375 is flat and grip portion 366 is not recessed into frame portion 366.

In an embodiment, grip portion 366 is a separate component attached to frame portion 364 by various means, such as via an adhesive, friction welding, and so on. In an embodiment, grip portion 366 is an overmold of a first relatively soft material over frame 364 of a second relatively hard material. In other embodiments, grip portion 366 is integral with frame portion 366, such that grip portion 366 and frame portion 366 are a unitary component, which may comprise a same material.

Because grip portion 366 is intended to contact the attachment surface at its grip surface 367, as described further below, grip portion 366, in an embodiment, may comprise a material with a high static coefficient of friction when interacting with a coated or uncoated surface of a ferromagnetic material of the ferromagnetic object, and/or with a low hardness or durometer, such as TPE, TPU and so on, as described further below.

Referring now to FIGS. 49 and 55-57, an embodiment of magnet-retaining portion 306 is depicted. In the embodiment depicted, magnet-retaining portion 306 includes top end 428, bottom end 430, middle portion 432 with generally-flat or planar front surface 434, front side 436 and rear side 438 with rear or outer surface 440.

In this particular embodiment, top end 428 includes first lever portion 442*a* and a second lever portion 442*b*. Top end 428 defines gap or slot 444 between first and second lever portions 442*a,b*, configured to receive support portion 328 of levering cover 302 (as described above with respect to FIGS. 49 and 50-52), and extending in a vertical, or top-to-bottom direction. Each of first lever portion 442*a* and second lever portion 442*b* is angled or bent outward and away from front surface 434.

First lever portion 442*a* includes first portion 446*a* and second portion 448*a*. First portion 446*a* extends outward and away from middle portion 432 and connects middle portion 432 to second portion 448*a*. In an embodiment, first portion 446*a* is generally flat, and forms an obtuse angle with front surface 434 and middle portion 432. Second portion 448*a* is connected to first portion 446*a* and includes front surface 450*a* and end 452*a*. In an embodiment, front surface 450*a* may be parallel or substantially parallel to front surface 434 of middle portion 432.

Second lever portion 442*b* is substantially the same as first lever portion 442*a*, and includes first portion 446*b* and second portion 448*b*. First portion 446*b* extends outward and away from middle portion 432 and connects middle portion 432 to second portion 448*b*. In an embodiment, first portion 446*b* is generally flat, and forms an obtuse angle with front surface 434 and middle portion 432. Second portion 448*b* is connected to first portion 446*b* and includes front surface 450*b* and end 452*b*. In an embodiment, front surface 440*b* may be parallel or substantially parallel to front surface 434 of middle portion 432, as well as front surface 450*a*.

Bottom end 430 of magnet-retaining portion 306, in an embodiment, also is bent or angled with respect to middle portion 432, and includes first portion 454 and second portion 456. First portion 454 is connected to middle portion 432 and angles away from middle portion 432 in a rear-to-front direction, connecting middle portion 432 to second portion 456. Second portion 456, in an embodiment, is generally flat and an in embodiment, may be parallel to middle portion 432. Second portion 456 defines a pair of opposing slots 458*a* and 458*b*.

Middle portion 432, in an embodiment, and as depicted, forms a flat plate-like structure having front surface 434 and rear surface 440, and may also include projections or stops 460*a* and 460*b* near bottom end 430, projecting in a front-to-rear direction. Middle portion 432 is configured to receive magnetic device 308 on rear surface 440 and position magnetic device 308 to interact with a surface of a ferromagnetic object.

In an embodiment, a thickness of magnet-retaining portion 306 is substantially uniform. In one such embodiment, magnet-retaining portion 306 is formed from a substantially flat plate of uniform thickness by twice bending each of top end 428 and bottom end 430, as depicted. The degree of bending, and subsequent angle with respect to middle portion 432 may vary based on a thickness of magnetic device 508 so that magnetic devices 508 with varying thicknesses may be used with the same base 304. For example, a larger degree of bending will accommodate a thicker magnetic device 308, including holding an outer surface of magnetic device in a same location as a thinner magnetic device 308.

In an embodiment, a thickness of magnet-retaining portion 306 is in a range of 1 mm to 3 mm. In an embodiment, magnet-retaining portion 306 is approximately 2 mm thick. A higher thickness minimizes deformation and improves transfer of magnetic flux to the target attachment surface. On the other hand, a thinner thickness improves manufacturability and reduces cost. A thickness of magnet-retaining portion 306 in the ranges described herein strikes a particularly useful balance for device 300.

Figure 59:
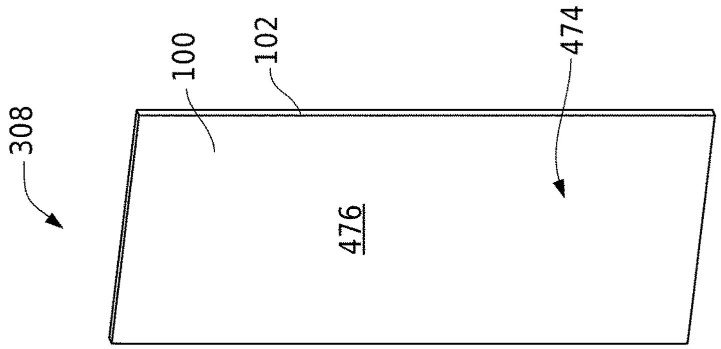
FIG. 59 is a front perspective of the magnetic device of FIG. 58.
Figure 58:
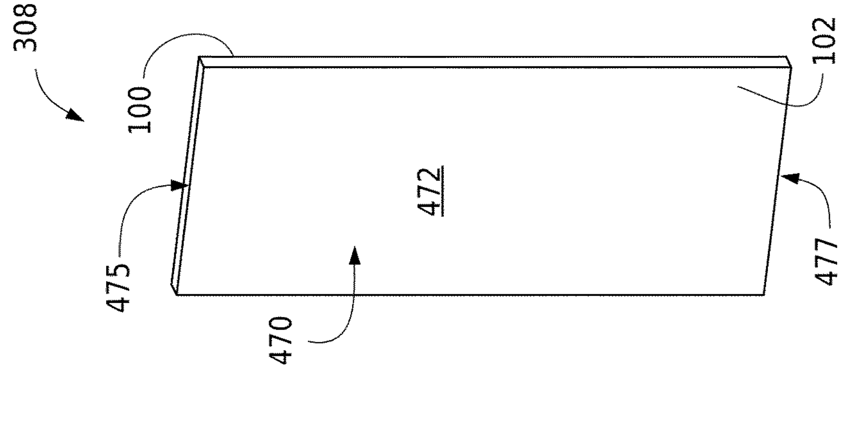
FIG. 58 is a rear perspective of a magnetic device of the detachable magnet device of FIG. 42, according to an embodiment.
Figure 65:
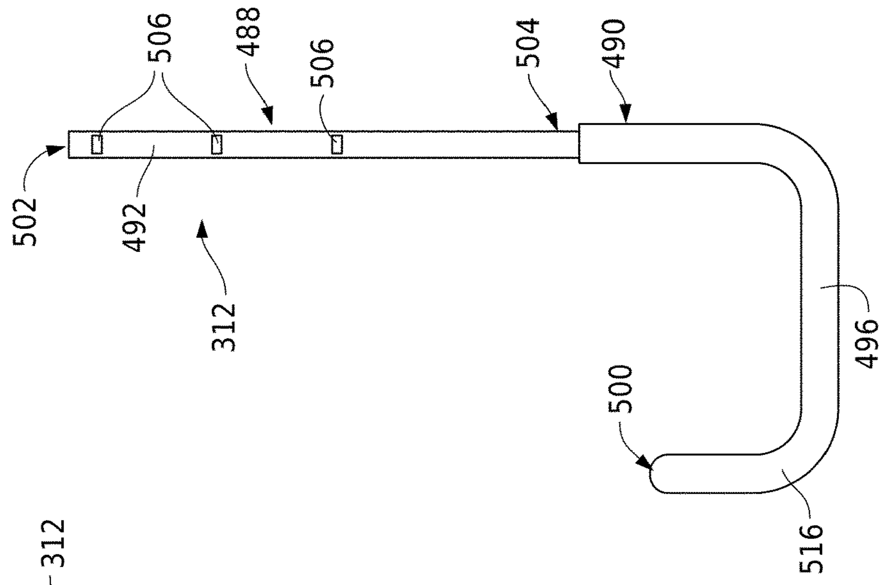
FIG. 65 is a side view of the holding or hook portion of FIG. 63.
Figure 64:
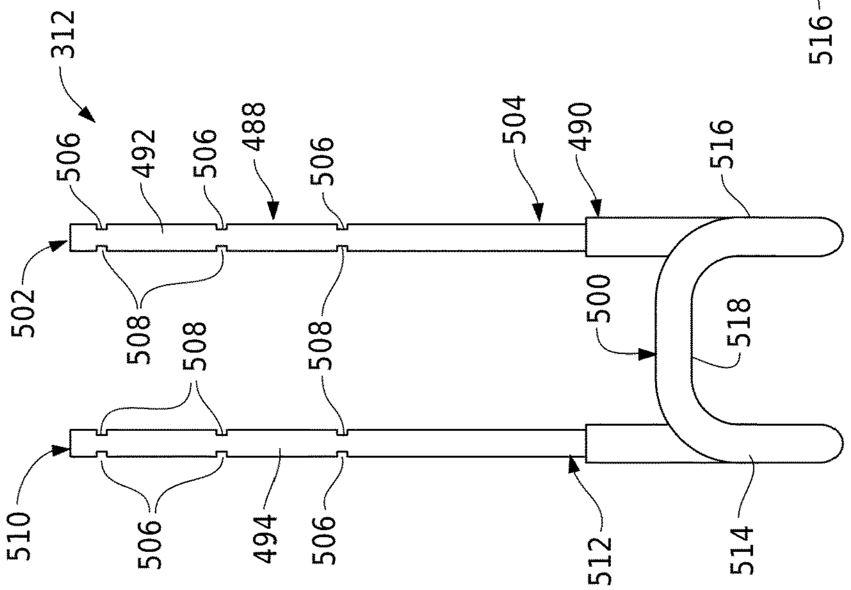
FIG. 64 is a front view of the holding or hook portion of FIG. 63.
Figure 63:
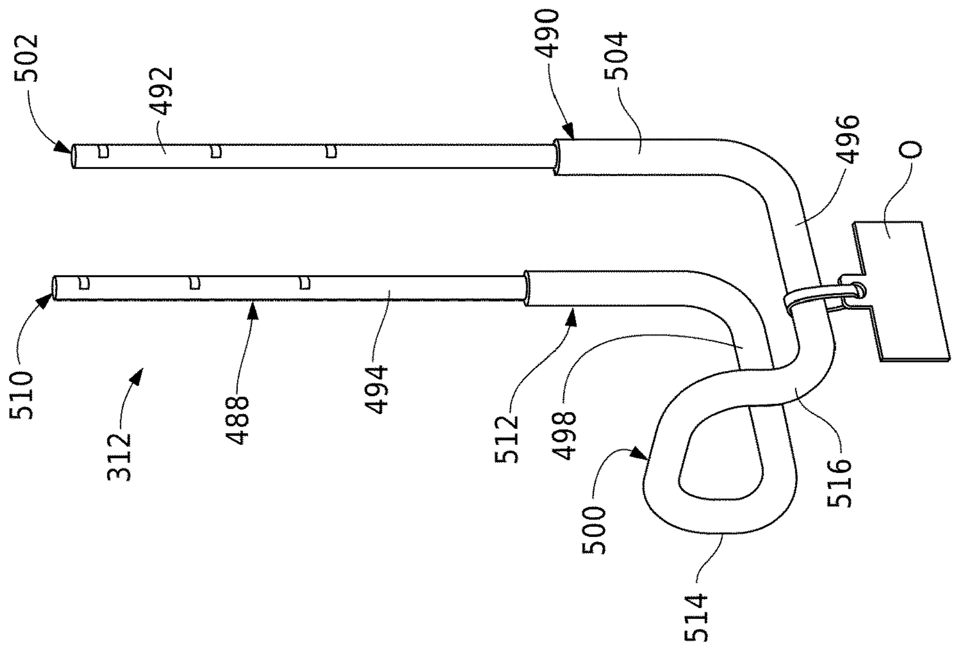
FIG. 63 is a front perspective of a holding or hook portion of the detachable magnet device of FIG. 42, according to an embodiment.

Referring to FIGS. 49 and 58-59, an embodiment of magnetic device 308 is depicted. In an embodiment, magnetic device 308 is a magnet assembly, and may comprise, though not be limited to, any of the magnetic assemblies of devices described herein, including those depicted and described with respect to FIGS. 10-12. Embodiments of magnetic device 308 are generally configured to concentrate magnetic flux close to an outer surface of the magnetic device, and hence an attachment surface, so as to maximize frictional holding force, as explained further below.

In an such embodiment, magnetic device 308 includes magnet portion 102, which may comprise a magnetic sheet with a plurality of "island portions" 104 or individual magnetic regions with alternating north and south magnetic poles, as well as "interstitial portions" as described in detail above, and, which may include a baseplate 100, which may comprise a conductive material, and magnetic sheet 102 (as depicted in FIGS. 10-12 and described above). In an embodiment magnetic device 308 also includes rear side 470 with rear or outer surface 472, and front side 474 with front or inner surface 476. Magnetic device 308 also includes top end 475 and bottom end 477.

In an embodiment, magnetic device 308 may include multiple magnetic regions or island portions 104, each having their individual north pole and south pole, as described above. In an embodiment the distribution of the multiple magnetic regions 104 may be non-uniform. In an embodiment of magnetic device 308, a density of magnetic regions 104 is greater, i.e., more regions 104 per area, near a bottom end 477 of magnetic device 308, and lesser near a top end 475 of magnetic device 308. As such, bottom end 477 of magnetic device 308 will produce a greater magnetic flux density and normal force, as compared to top end 475. One advantage to such a configuration is that top end 475 will produce a weaker normal force at an attachment surface, as compared to bottom end 477, thusly making it easier to lift or lever top end 475 away from the attachment surface, i.e., requires less opposing force to detach. Another advantage to such a configuration is that it makes device 300 more effective for a wide range of attachment object thicknesses because the more dense or tighter distribution pattern of bottom end 477 will be more effective on thinner attachment objects, while the less dense distribution at top end 475 will be more effective for use with thicker objects.

In an embodiment, magnetic device 308 is an assembly as described above, and depicted herein, and includes a single baseplate 100 and single magnetic sheet 102. However, in other embodiments, magnetic device 308 is a laminated magnetic device, having multiple metal plates 100 and multiple magnetic sheets 102. In another embodiment, magnetic device may not include a baseplate 100. In one of the embodiments, magnetic device 308 may include a nickel coating on an exterior, including on a magnet portion.

In another embodiment, magnetic device 308 comprises a channel magnetic device, or channel magnet, such as the magnetic device 260' as described above with respect to FIGS. 38A and 38B.

Figure 61:
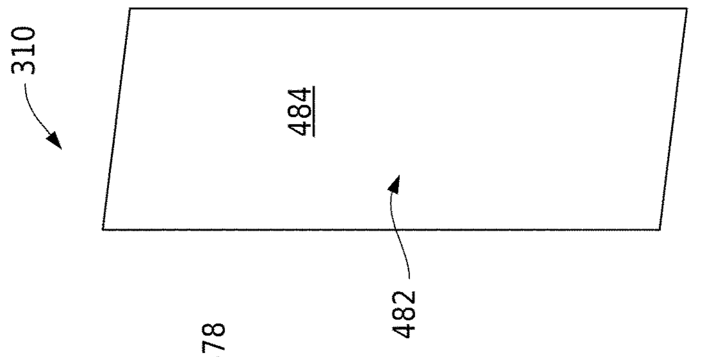
FIG. 61 is a front perspective of the magnet-surface cover of FIG. 60.
Figure 60:
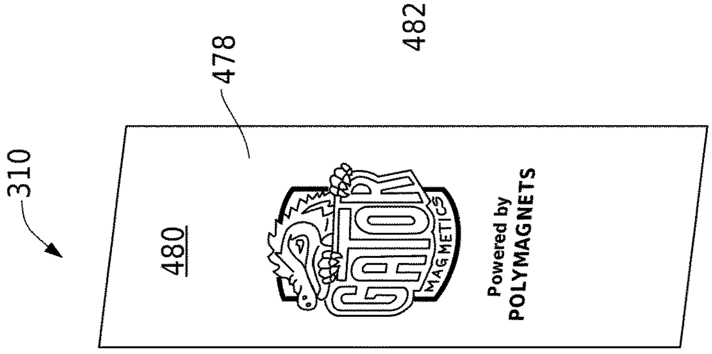
FIG. 60 is a rear perspective of a magnet-surface cover of the detachable magnet device of FIG. 42, according to an embodiment.

Referring to FIGS. 60-61, an embodiment of optional magnet cover 310 is depicted. In an embodiment, magnet cover 310 comprises a relatively thin sheet of material, such as a polymeric material, e.g., vinyl, having a rear side 478 with rear surface 480, and front side 482 with rear front 484. Front surface 484 may include an adhesive layer so that magnet cover 310 can be affixed to rear surface 472 of magnetic device 308. In an embodiment, magnet cover 310 comprises a decal or sticker, such as a vinyl sticker. In another embodiment magnet cover 310 is a coating, rather than a decal or sticker.

Figure 62:
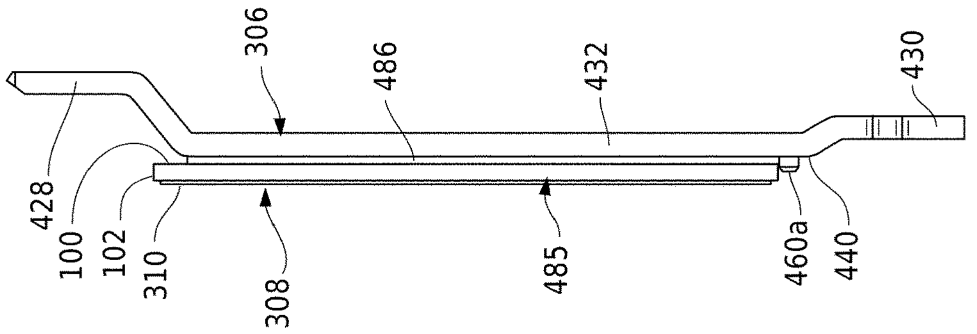
FIG. 62 is a side view of an assembly of a magnet-retaining portion, magnetic device and magnet-surface cover, according to an embodiment.

Referring to FIG. 62, magnet-device subassembly 485 comprising magnet-retaining portion 306, magnetic device 308, magnet cover 310, and adhesive layer 486 is depicted. In this subassembly 485, adhesive layer 482 affixes baseplate 100 of magnetic device 308 to rear surface 440 of magnet-retaining portion 306. Front side 484 of magnet-surface cover 310 is adhered to rear surface 472 of magnetic device 308. In this embodiment, magnetic device 308 abuts stops 460, including stop 460*a*, preventing downward vertical movement of magnetic device 308.

Referring to FIGS. 49 and 63-65, an embodiment of holding portion 312 is depicted. In an embodiment, holding portion 312 forms a hook-like or hangar structure, and includes hangar portion 488 with hangar cover 490.

In an embodiment, hangar portion 488 includes first leg or shank 492, second leg, rod or shank 494, first support portion 496, second support portion 498, and connecting portion or lip 500. Hangar portion 488 may comprise any of a variety of sufficiently-strong materials, such as a metal, plastic, and so on. In an embodiment, portions of hangar portion 488 may be generally circular in cross section.

First leg 492 may be rod-like and extend vertically, or from a top-to-bottom direction, and includes top end 502 and bottom end 504. First leg 492 may define a plurality of recesses or slots distributed along its length, including outer recesses 506 and inner recesses 508.

Similarly, second leg 494 may be rod-like and extend vertically, or from a top-to-bottom direction, and includes top end 510 and bottom end 512. First leg 494 may also define a plurality of recesses or slots distributed along its length, including outer recesses 506 and inner recesses 508.

First support portion 496 is connected to first leg 492 at bottom end 504, and extends outwardly and away from first leg 494 in a generally horizontal, or rear-to-front direction. In an embodiment, first support portion 496 extends substantially perpendicular to first leg 492.

Second support portion 498 is connected to second leg 494 at bottom end 512, and extends outwardly and away from second leg 494 in a generally horizontal, or rear-to-front direction. In an embodiment, second support portion 498 extends substantially perpendicular to second leg 494.

Connecting or lip portion 500 connects first support portion 496 and second support portion 498. In an embodiment, connecting portion 500 curves upwards at each of first and second support portions 496 and 498, then extends horizontally therebetween. In one such embodiment, connecting portion 500 includes first vertically-extending portion 514, second vertically-extending portion 516, and horizontally-extending connecting portion 518. First vertically-extending portion 514 is connected to first support portion 496 and extends upwardly and away from first support portion 496; second vertically-extending portion 516 is connected to second support portion 498 and extends upwardly and away from second support portion 498. Horizontal connecting portion 518 connects first vertically-extending portion 514 and second vertically-extending portion 516. In an embodiment, horizontal connecting portion 518 is positioned closer to top ends 502 and 510 than support portions 496 and 498, thereby providing a lip.

In an embodiment, hangar portion 488 may be manufactured from a single metal rod bent to form the legs, supports and lip portions, may be molded as a single unitary structure, or may otherwise be manufactured to form a unitary, integrated structure. In other embodiments, hangar portion 488 may comprise an assembly of its component parts.

Hangar-portion cover 490, in an embodiment, covers portions or all of hangar portion 488. In an embodiment, a material of hangar-portion cover 490 may form a continuous cover without breaks. In an embodiment, hanger-portion cover 490 covers all of first and second support portions 496, 498 and connecting portion 500, and portions of first and second legs 492, 494 near their respective bottom ends 504, 512. Hanger-portion cover 490, in an embodiment, comprises a soft, high-grip material, such as rubber, or similar, that protects a hanging or held object and hangar portion 488 from scratching or other damage. Such a material also facilitates holding of an object onto holding portion 312.

Referring generally to FIGS. 42-48, an assembled embodiment of device 300 for detachable attachment to a ferromagnetic object is depicted, in a closed or attachment position is depicted. Referring generally also to FIGS. 66-70, the assembled, or partially assembled (FIG. 66) embodiment of device 300 is depicted in an open or detached position.

Figure 66:
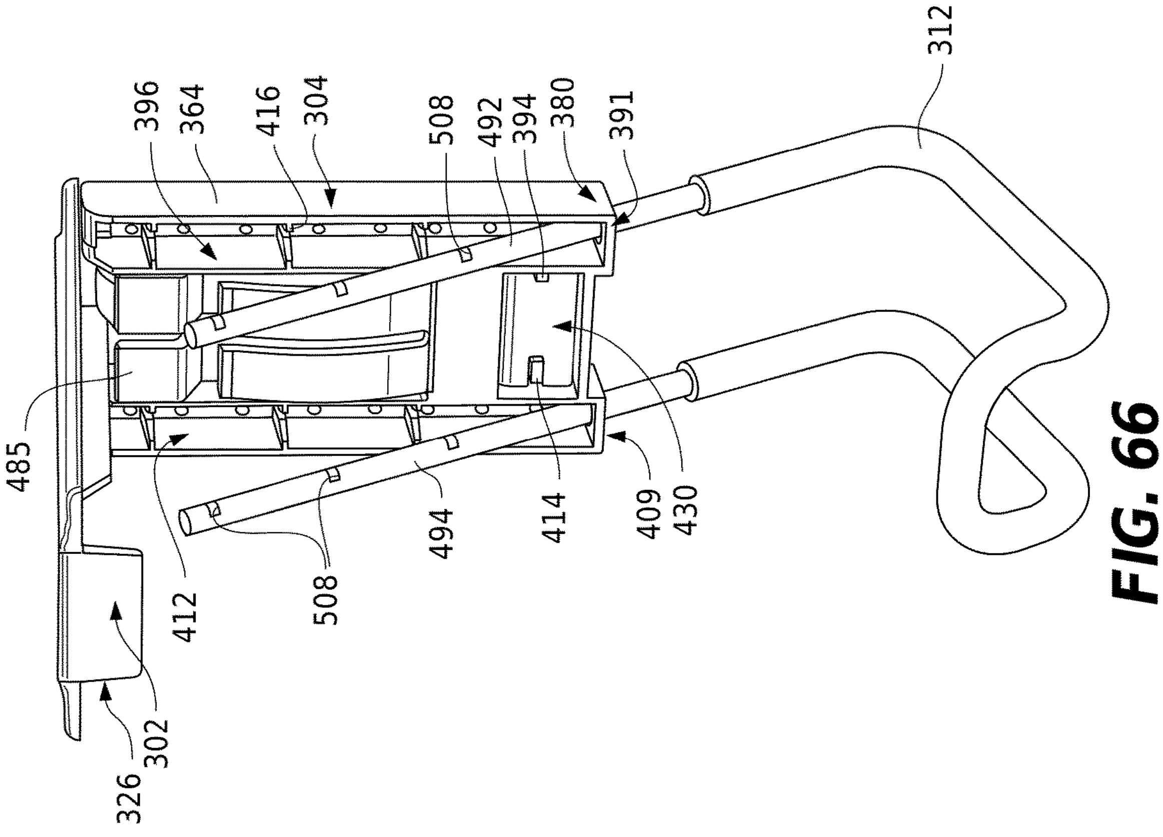
FIG. 66 is a perspective view of the detachable magnetic device of FIG. 42 in an open or released configuration with a holding portion partially detached.

Referring specifically to FIG. 66, holding portion 312 is depicted as partially inserted, but not yet seated, into frame portion 364 of base 304. As depicted, first leg 492 is inserted through opening 391, and second leg 494 is inserted through opening 409. Levering cover 302 is in an "open" position, such that bottom portion 326 is displaced from base 304.

Figure 67:
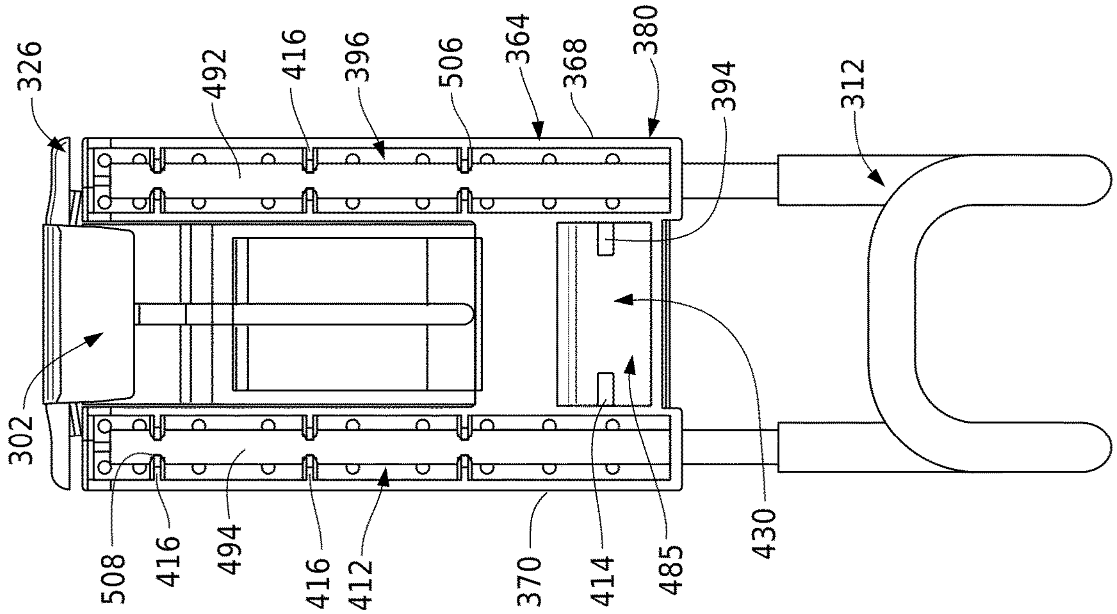
FIG. 67 is a front view of the detachable magnetic device of FIG. 42 in an open or released configuration.
Figure 69:
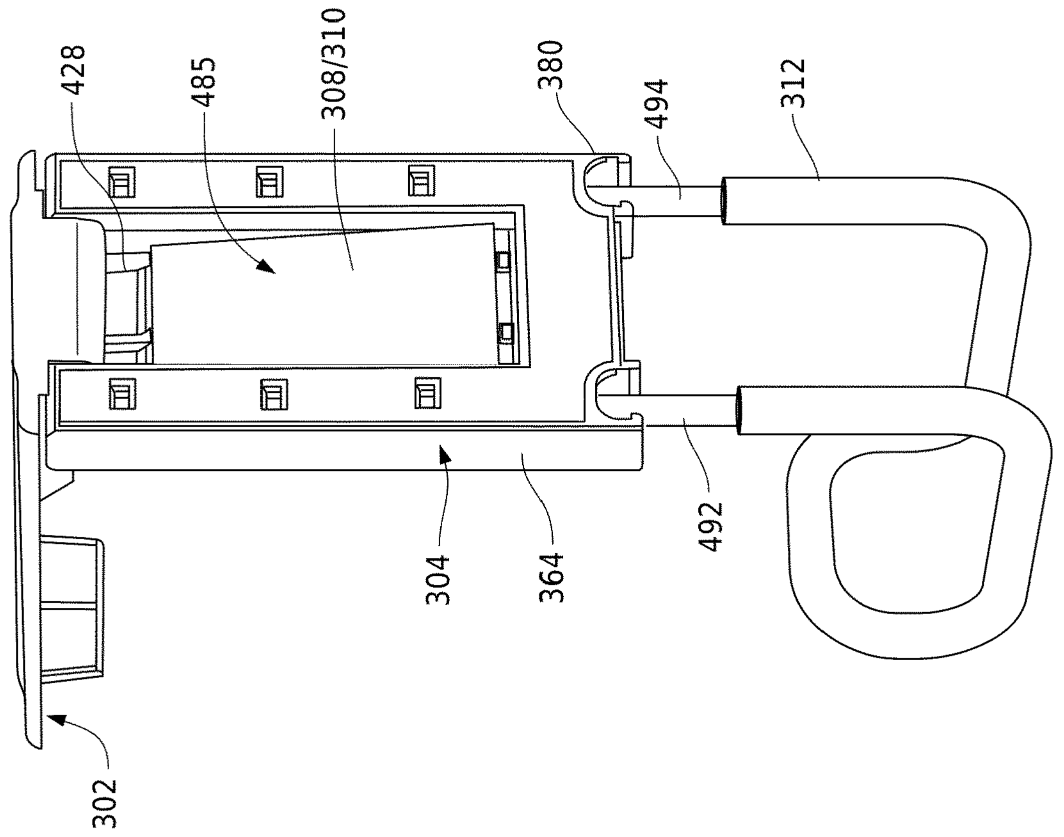
FIG. 69 is a rear view of the detachable magnetic device of FIG. 42 in an open or released configuration.
Figure 68:
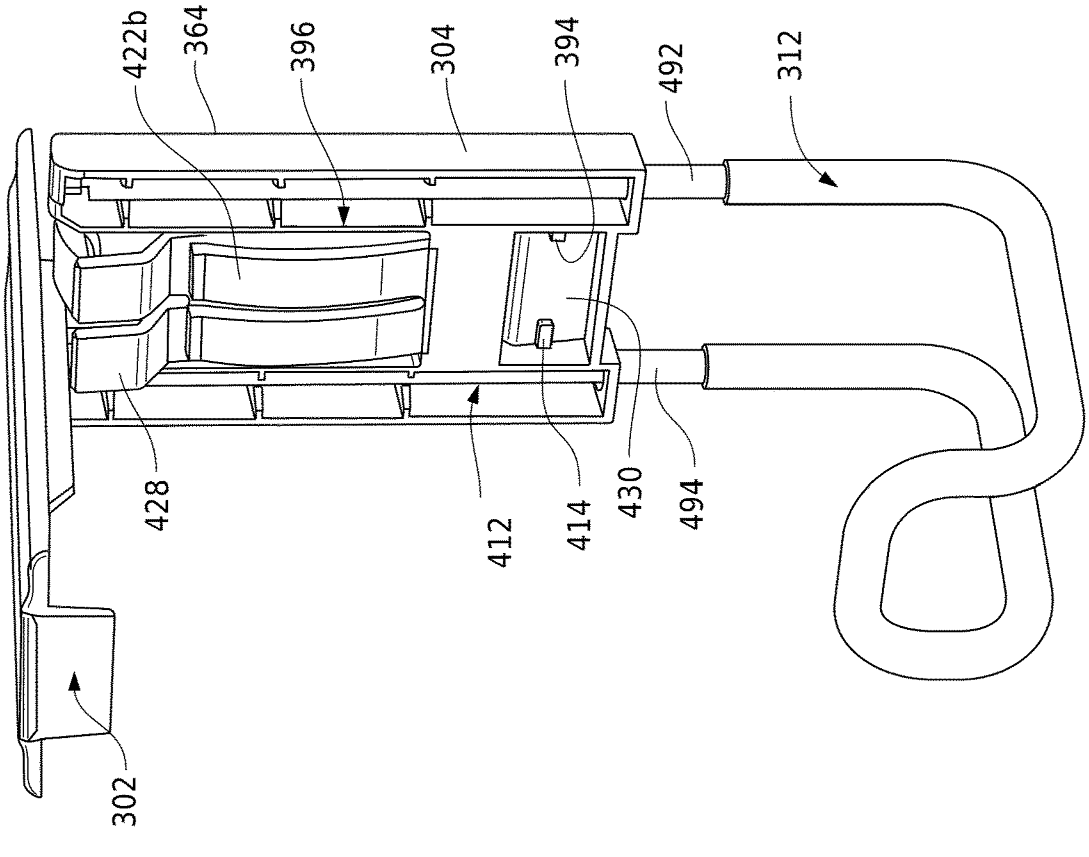
FIG. 68 is a front perspective view of the detachable magnetic device of FIG. 42 in an open or released configuration.

Referring also to FIGS. 67-69, which depict front and perspective views of fully-assembled device 300, first leg 492 is received in channel 396 of right portion 368, and second leg 494 is received in channel 412 of left portion 370. Outside recesses 506 and inside recesses 508 receive ribs or projections 416 such that legs 492 and 494, and hence hangar portion 312, is coupled to base 304. In an embodiment, recesses 506, 508 with projections 416 form snap-fit connections or joints.

Projections 392 and 410 of frame portion 364 of base 304 are received into holes 358 of lifting portion 330 (see also, holes 358 at FIG. 51 and projections at FIGS. 53-54) of cover 302, such that cover 302 is pivotally connected to top end 378 of frame 364.

As described above with respect to FIG. 62, magnet device 308 is attached to magnet-retaining portion 306, and magnet cover 310 is affixed to magnet device 308 to form magnet-device assembly 485.

As also depicted in FIGS. 66-68, as well as FIG. 69, magnet-device assembly 485 is pivotally coupled to frame portion 364. More specifically, bottom end 430 of magnet-retaining portion 306 is coupled to bottom end 380 of frame portion 364, with projection 394 of frame portion 364 received into slot 458*b* (see also FIGS. 55-56) of magnet-retaining portion 306, and projection 414 received into slot 458*a*. Arms 420*a* and 420*b* contact surface 434 of magnet retaining portion 306 with arm tips 422*a* and 422*b*. Top end 428 of magnet retaining portion 306 is free to move when receiving a force from levering cover 302, as explained further below.

Figure 44:
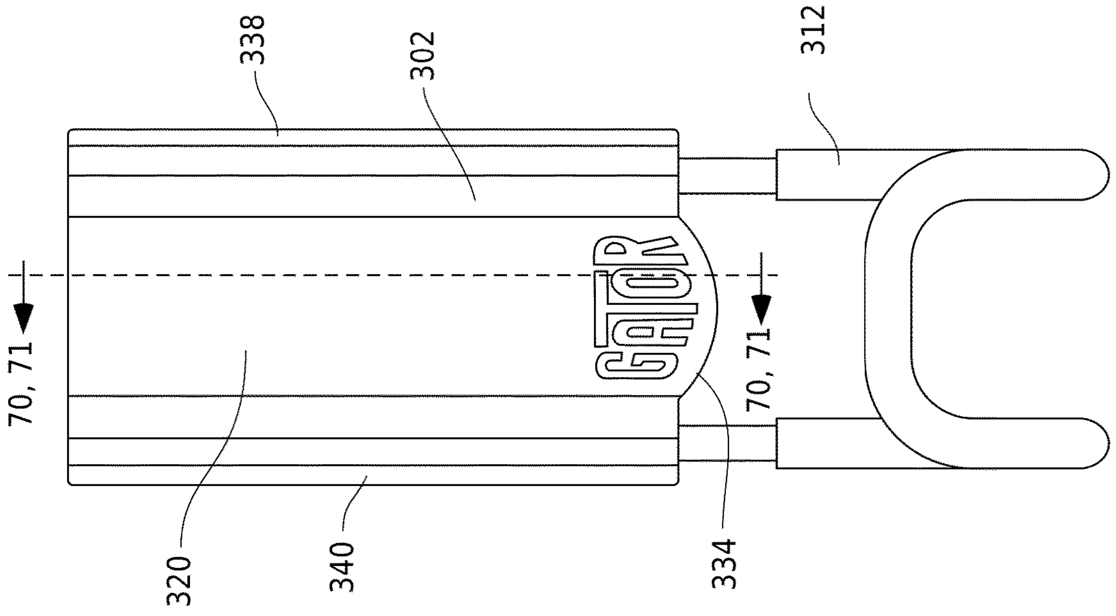
FIG. 44 is front view of the detachable magnet device of FIG. 42.
Figure 47:
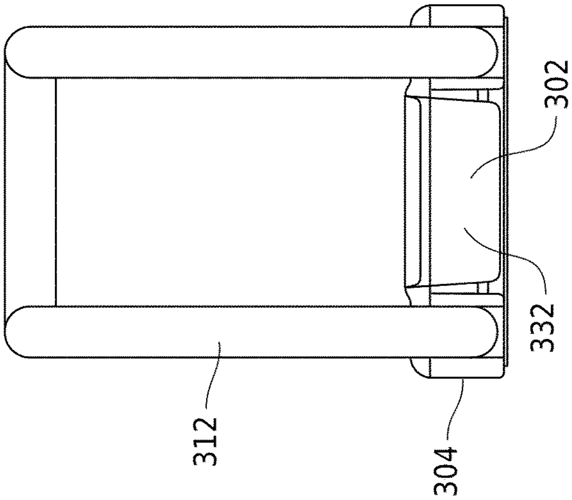
FIG. 47 is a bottom view of the detachable magnet device of FIG. 42.
Figure 48:
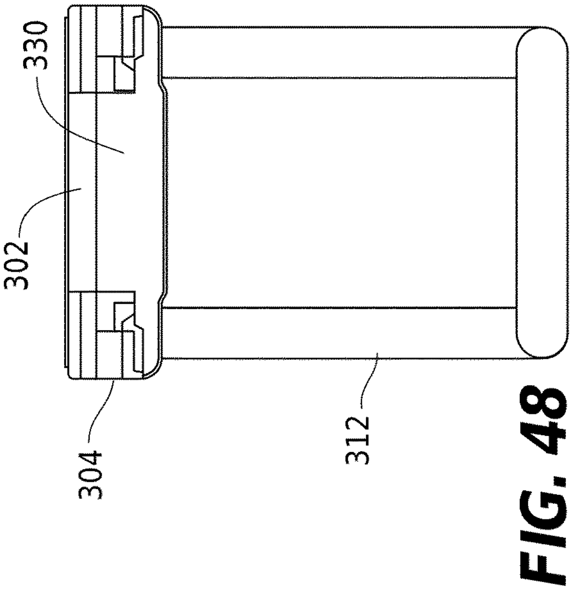
FIG. 48 is a top view of the detachable magnet device of FIG. 42.
Figure 46:
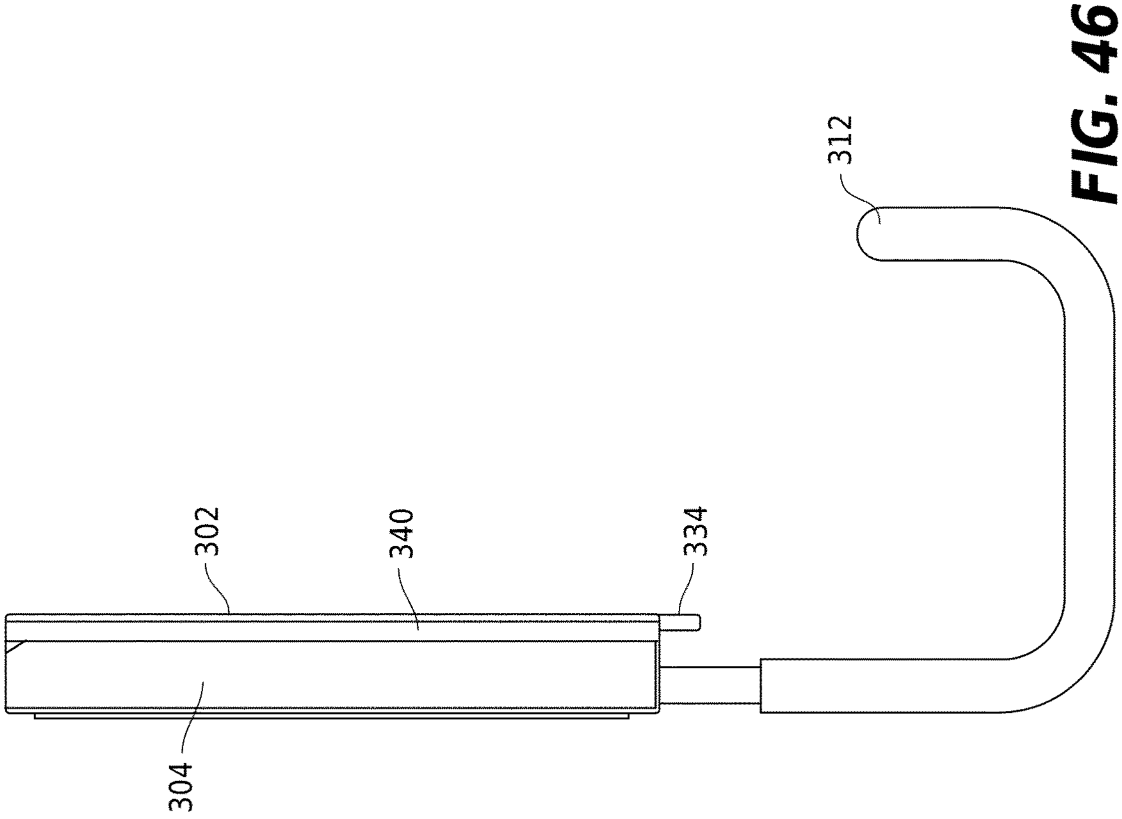
FIG. 46 is a left-side view of the detachable magnet device of FIG. 42.
Figure 71:
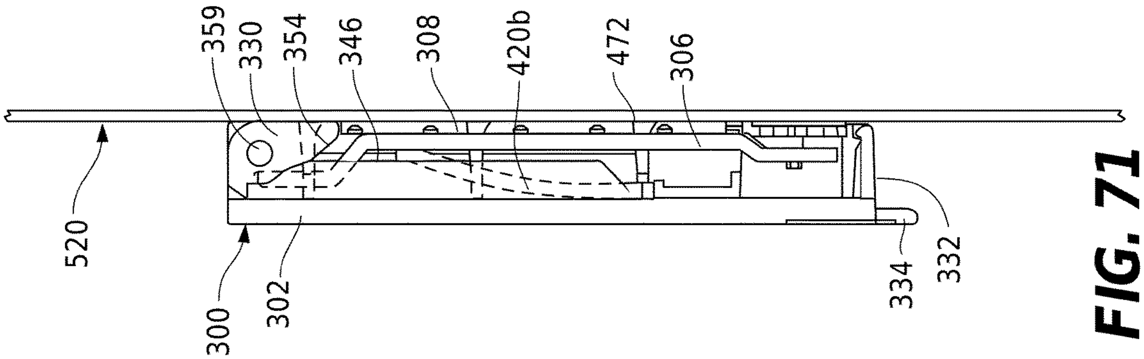
FIG. 71 is the side sectional view of FIG. 70 depicting additional hidden elements in dashed lines.
Figure 70:
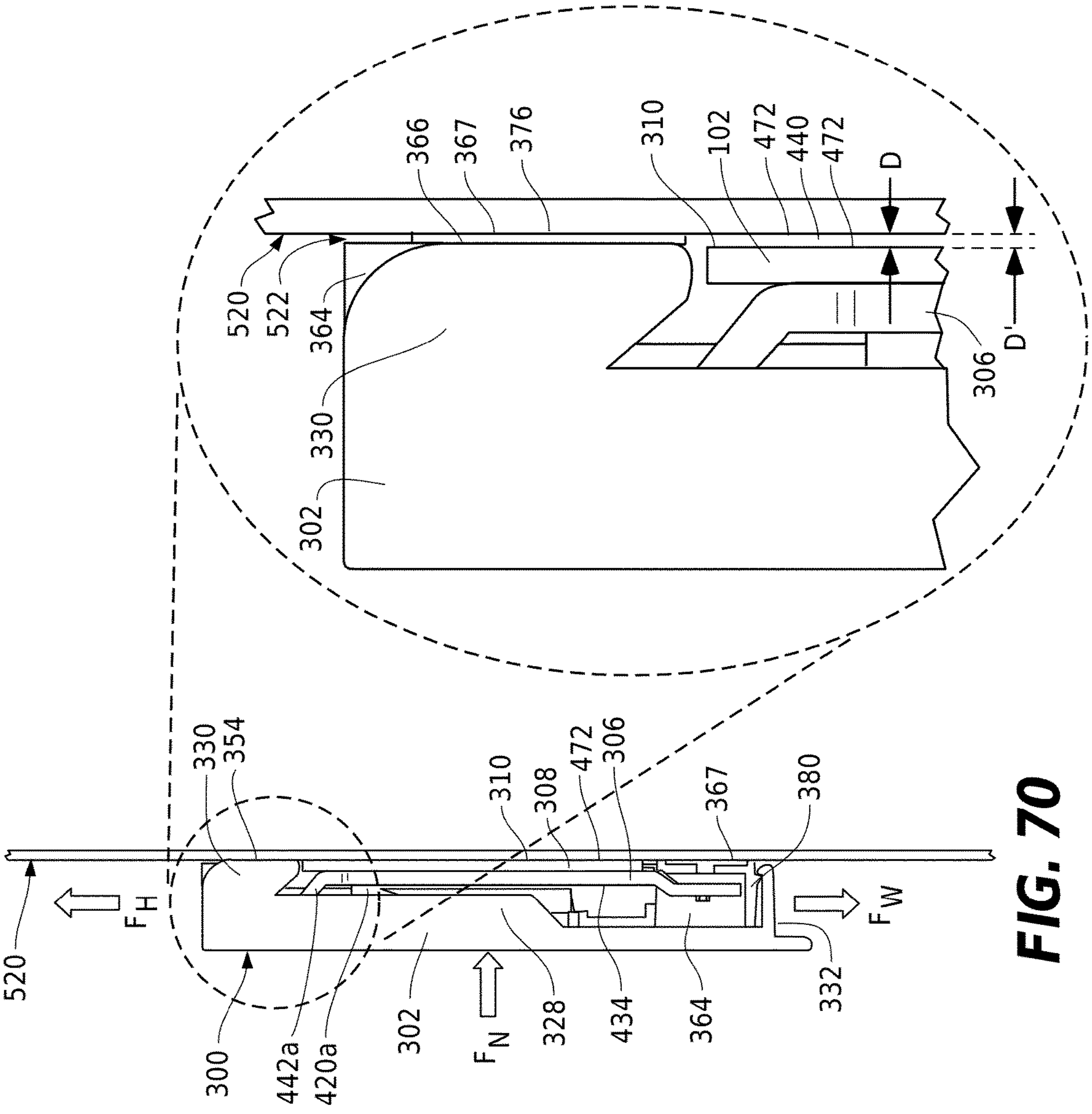
FIG. 70 is a side sectional view, with an enlarged view, of the detachable magnetic device of FIG. 42 attached to a surface of a ferromagnetic object.

Referring to FIGS. 70-71, device 300 is depicted in a first, attachment position or configuration, with levering cover 302 in a closed position. As depicted, device 300 is attached to a ferromagnetic object that includes attachment surface 520, which lies in a vertical plane. In these depictions, device 300 is depicted without holding portion 312 for ease of illustration and explanation. FIG. 70 is a sectional view of device 300 as depicted in FIG. 44, with attachment surface 520 of the ferromagnetic object, and without holding portion 312, as well as an enlarged view of a portion of the figure. FIG. 71 depicts the same view of device 300 as in FIG. 70, but also showing additional structure in dashed lines.

In this first attachment position, fastening portion 332 of levering cover 302 is coupled to bottom end 380 of frame portion 364 in a closed position.

In an embodiment, fastening portion 332 of levering cover 302 is deflectable and may include a projection, such as a bump or ledge at or near its end, that interlocks with a corresponding projection on frame portion 364, thereby in an embodiment forming a snap fit or friction fit. Support portion 328 of levering cover 302 is positioned in gap 421 between arms 420 of frame 364 (see also FIG. 53) and is positioned in gap 444 between lever portions 442 of magnet retaining portion 306 (see also FIG. 55). By fitting support portion 328 between arms 420 and lever portion 442, a size of fin-like support portion 328 can be relatively large so as to strengthen levering cover 302 without unnecessarily increasing a size, and in particular, depth of device 300. Lifting portion 330, including third portion 354 is in a generally vertical or top-to-bottom orientation, with its outside surface adjacent to and generally parallel with attachment surface 520 and grip surface 367, which may be an outer surface, of base portion 304.

With respect to magnet-retaining portion 306 in this first, attachment position, rear side 438 and middle portion 432 may be generally parallel to attachment surface 520 and grip surface 367. Arms 420 of frame 364 may contact front surface 434 of magnet-retaining portion 306. In an embodiment, arms 420 may not apply any force to front surface 434, though in other embodiments, arms 420 may apply a small amount of force to magnet-retaining portion 306 in this attachment position so as to hold or secure a position of end 428 of magnet-retaining portion 306.

Magnet device 308 and optional cover 310 are positioned at or close to attachment surface 520, with rear surface 472 of magnetic device 308, in an embodiment, in a plane generally parallel to a plane containing attachment surface 520. When present, optional cover 310 is between magnetic sheet 102 and attachment surface 520. In an embodiment, having cover 310, with its softer/lower durometer material, potentially contact attachment surface 520 rather than having magnetic sheet 102 potentially contact attachment surface 520, potentially prevents scratching of attachment surface 520 during attachment and detachment.

In an embodiment that maximizes holding force, or maximum weight of an item or object O held by device 300, device 300 is configured to position magnet device 308 such that neither surface 472 nor cover 310 are in direct contact with attachment surface 520, leaving a gap between surface 472 and surface 520 (as well as leaving a gap between surface 472 of magnetic device 308 and outer surface 367 of grip portion 366.

In an alternate embodiment, device 300 is configured to position magnet device 308 such that surface 472 or cover 310 is in direct contact with attachment surface 520.

As depicted in FIGS. 70-71, in an embodiment that enhances the holding ability or "strength" of device 300 to attachment surface 520, surface 472 of magnetic device 308 is positioned adjacent to, but not quite touching, attachment surface 520. Such a configuration maximizes a normal force $F_N$ applied by magnetic device 308, and ultimately a frictional holding force $F_H$ applied to lower-durometer/higher-coefficient-of-friction grip portion 366 through higher-durometer/more rigid frame 364 as explained further below. At the same time, and as also explained further below, a weight of an object hung on holding portion 312, will impart an applied downward force $F_W$, which is equal to the weight of the object held and the weight of device 300, when device 300 is attached to attachment surface 520.

As depicted, rear surface 472 of magnetic device 308 is suspended a distance D from attachment surface 520, forming gap 522 between magnetic device 308 and attachment surface 520. The closer that magnetic device 308 is positioned to attachment surface 520, the higher the normal force $F_N$ applied to grip portion 366 due to the magnetic attractive forces between magnet device 308 and ferromagnetic attachment surface 520. In an embodiment, distance D is minimized and designed to approach zero so as to maximize the normal force applied by magnetic device 508.

In addition to maximizing magnetic and holding forces, when magnetic device 508 is spaced apart from an attachment surface, scratching of that surface is prevented.

In other embodiments, distance D may be zero, i.e, magnetic device 308 may contact attachment surface 520, though in such a configuration, holding force $F_H$ is not maximized as some normal forces that otherwise would have been applied to base 304 are redirected, and transferred through magnetic device 308 rather than base 304. In other words, the load path of the normal force includes magnetic device 508, and not just frame 364 and grip material 366. A further effect of magnetic device 308 contacting attachment surface 520 is that a static coefficient of friction of magnetic device 308 may be less than a static coefficient of grip portion 366 when interacting with a same surface 520, thereby reducing the overall static coefficient of friction of device 300 attached to the ferromagnetic object, and subsequently reducing holding force $F_H$.

A distance D' between is defined as a horizontal distance between a vertical plane in which rear surface 367 of grip portion 366 resides, a parallel vertical plane in which rear or outer surface attachment surface 520 resides, and rear surface 472 of magnetic device 308. When device 300 is in the attachment configuration as depicted, distance D' is substantially the same as distance D since rear surface 367 is at attachment surface 520. However, when device 300 is not in an attachment configuration, and with levering cover 302 in a closed position (such as in FIG. 42), grip portion 366 is not compressed, and distance D' will be larger than distance D. As such, to minimize distance D, a hardness of grip portion 366, and in-use compression, is considered when designing for a minimal distance D of gap 522.

A number of factors or design inputs to device 300 determine how much holding force $F_H$ is generated. Further, those factors can be modified to accommodate particular attachment surface 520 materials and thicknesses. Factors include: energy density or "strength" of magnetic device 308; magnetic device 308 geometry; magnetic flux manipulation; coefficient of friction of contact or grip portion 366; compressibility (durometer) of grip portion 366 and connected materials in the load path; and distance D between magnetic device 308 and target attachment surface 520.

With respect to magnetic device 308 "strength," and as will be understood by one of ordinary skill in the art, a permanent magnet material will exhibit an energy density referred to as "BH max" which is the maximum energy product of the material. Different grades of magnets of magnetic device 308 will have different BH max numbers which correlate to their grade (e.g., N52). The amount of available flux then is based on the grade and volume of the magnet. In an embodiment, a BH max value of the magnetic material of magnetic device 308 is determined, wherein a magnet material having a higher BH max may be used to generate higher normal forces $F_N$ by magnetic device 508, resulting in higher holding forces $F_H$ for device 300, and a magnet material with lower BH max may be used to generate lower normal and holding forces.

In an embodiment, a BH max of the magnet material of magnetic device 308 is in a range of 8 to 70 MGOe. In one particular embodiment, a BH max of magnetic device 308 is in a range of 42 to 52 MGOe. Such a range provides a good balance between cost and potential normal force exerted by device 300.

With respect to magnet geometry, in general, the geometry of the magnet determines largely how the flux projects from the face of the magnet. For example, a thin flat magnet will project flux a shorter distance than if the same volume of magnet material was a thick rod magnet with a small surface area. In the case of a thick magnet with a small surface area, the flux will project far from the face of the magnet. In an embodiment, magnetic device 308 is configured to minimize the distance that the magnetic flux will project from surface 472, thereby increasing flux density. In an embodiment, magnetic device 308 is approximately 2 inches long×1 inch wide×1/16 inch thick.

With respect to flux manipulation, the magnetic flux characteristics of magnetic device 308 can be manipulated by several means to achieve higher flux in a smaller area, i.e., increased flux concentration or density, thereby increasing normal force $F_N$.

As mentioned above, the way flux projects from a magnetic face depends on the geometry of the magnet. For example, flux from a thin flat magnet will not project as far from the face of the magnet as compared to a thick rod magnet with a small surface area and the same magnetic material volume. This can present a challenge when using relatively thin magnet, such as certain embodiments of magnetic device 308.

To manipulate the flux to stay close to the face of a magnet, such as to rear surface 472, as is desirable in embodiments, the magnet technology described above with respect to FIGS. 10-12 may be used to concentrate flux close to the face of magnetic device 308 even further by creating alternating north and south pole regions on the same magnet sheet and face. This creates a shorter path for the flux to travel thus concentrating available magnetic flux projecting from magnetic device 308.

In other embodiments, flux of magnetic device 308 may be "manipulated" or improved using a shunt or channel plate, such as magnet-retaining device 306. By adding a channel shunt plate to a magnet, the available flux projecting from the back of the magnet will conduct through the ferromagnetic material, such as steel, and focus more available flux towards the target ferromagnetic object, thus increasing flux density on the attachment or rear side of the magnetic device 308. Consequently, magnetic device 308, in an embodiment, may comprise a channel magnet, such as the channel magnet 260' as described above.

In other embodiments, magnetic device 308 may comprise a laminated or layered, assembled magnet. In such an embodiment, layers of magnetic material may be sandwiched between steel and layered to create a concentrated flux field.

With respect to coefficient of friction, base portion 304 may be configured to maximize the static coefficient of friction of grip portion 366 through the use of high-friction materials, such as thermoplastic elastomer ("TPE") materials, thermoplastic polyurethane ("TPU") materials, GM631 gripping material as manufactured by 3M® of St. Paul, MN, vinyl stickers, rubber coatings such as Plasti Dip®, and similar. The use of such high-coefficient-of-friction materials for grip portion 366 maximizes the amount of applied force required to move device 300 downwardly along surface 520. In an embodiment, a material of grip portion 366 is selected to accommodate a texture of a ferrous or ferromagnetic object or surface to which device 300 is to be attached. A softer or lower durometer material will conform better to attachment surfaces 520 with highly-textured surfaces. In an embodiment, a material of grip portion 366 has a Shore A durometer hardness in a range of 10 A to 90 A. Further, a material of grip portion 366 may be selected based on a coefficient of friction in combination with a particular ferromagnetic object or surface. For example, if the attachment object already has a high coefficient of friction, a higher hardness material for grip portion 366 may be selected.

The compressibility of the materials in the load path between magnetic device 308 and ferrous attachment surface 520 also affects actual holding force $F_H$ applied to attachment surface 520, and plays a role in regulating distance D (and D'), or the gap between magnetic device 308 and attachment surface 520. Because distance D is generally very small so as to maximize normal force $F_N$ and holding force $F_H$, and because small changes in D greatly affect normal force $F_N$, determining and controlling an amount of compression of structural components, particularly frame 364 and grip portion 366, helps to accurately set distance D and D' for a particular application or use of device 300.

The compressibility of a material may generally be calculated such that the normal force made by the magnet will compress the materials supporting the load path between magnetic device 308 and surface 520 to the point where the magnet is infinitely close to the target surface but not touching it. To determine the amount of deflection (or % deflection of material thickness) in the material, the durometer, part shape, and load must be considered.

$$D_{EF} = \frac{L}{Y*(1+2f^2)}$$

$D_{EF}$=% of deflection per inch of thickness

L=load or force in psi

Y=Modulus of Elasticity (Young's Modulus)

f=Shape factor (The shape factor is calculated by dividing the surface area being compressed by the area that is able to bulge).

By understanding the % deflection, distance D of the gap between the magnet and the target can be minimized according to the calculated compression of the material, such as the material of frame 364 and grip portion 366.

As described briefly above, the distance between magnetic device 308 and attachment surface 520 is minimized so as to maximize normal force $F_N$ and resulting holding force $F_H$. When an object is attached to device 300, such as by placing it on holding portion 312, the weight of the object in combination with the weight of device 300 combines to impart a downward applied force $F_W$ on device 300. In order for device 300 not to slide down attachment surface 520, an opposing force, frictional force $F_H$, must be at least as great as $F_W$. As explained below, frictional holding force $F_H$ is determined by the holding force $F_N$, which is a normal force, and the static coefficient of friction of device 300 on attachment surface 520.

Referring still to FIGS. 70-71, the normal force $F_N$ generated by the magnetic field of magnetic device 308 is designed to travel through a specific load path that includes magnet-retaining portion 306 and frame portion 364, such that the force travels through to grip portion 366 which has a high coefficient of friction, so as to optimize holding force $F_H$. The purpose of this is made clear by the general equation for shear or frictional force:

$$F_H = \mu F_N \qquad \text{Equation 1:}$$

Figure 72:
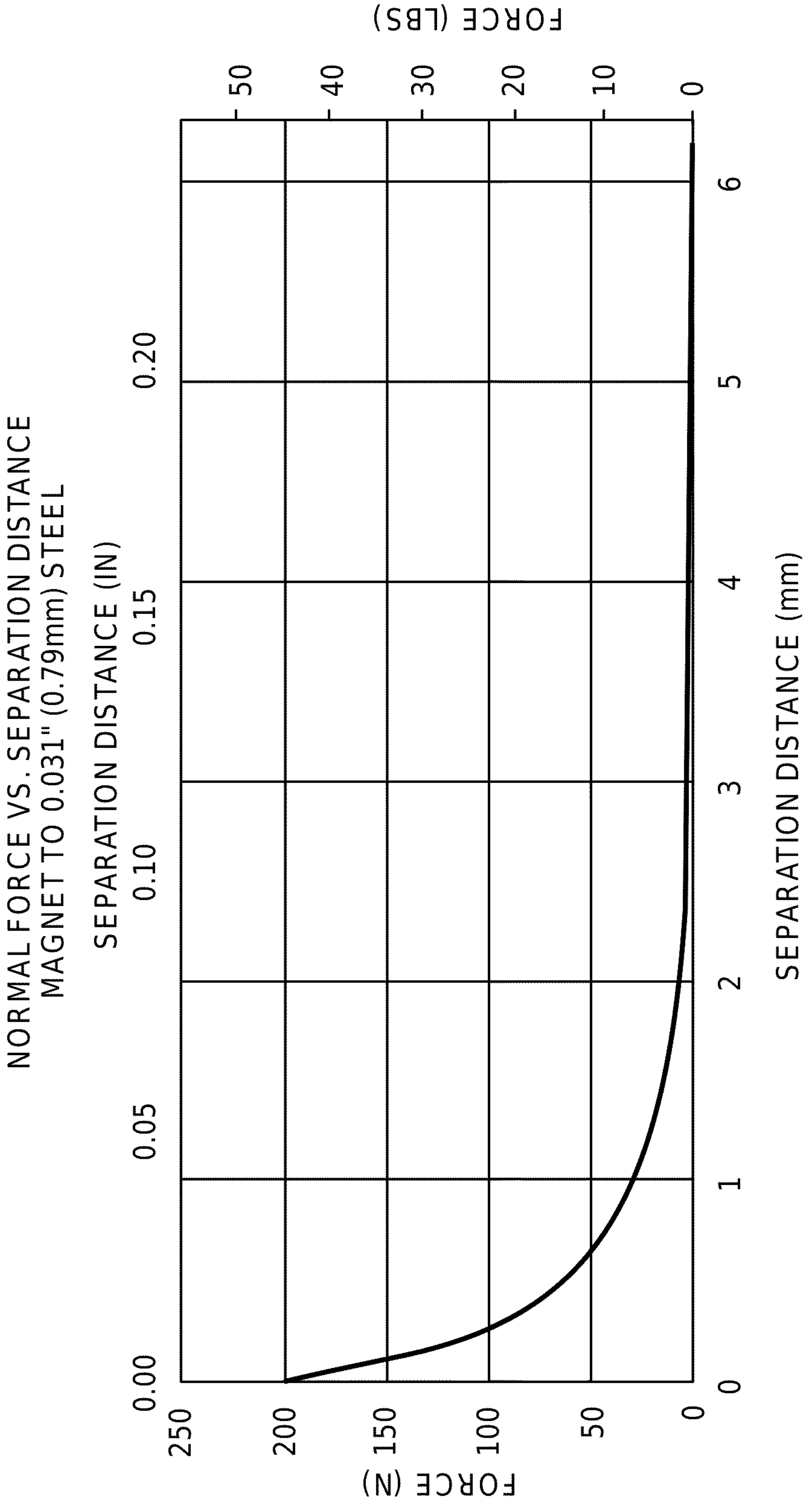
FIG. 72 is a graph of magnet normal force vs. separation distance to an attachment surface, according to an embodiment.

Where:

$F_H$=Frictional (holding) force $F_N$=Normal force $\mu$=Coefficient of Friction The importance of magnetic device 308 being close to the target material, attachment surface 520, is illustrated in the example normal force vs. distance graph of FIG. 72. As the distance D between magnetic device 308 and attachment surface 520 approaches zero, the normal force $F_N$ is approximately 200 N. When D is less than 0.25 mm away the normal force $F_N$ is reduced to approximately 25% of its maximum.

In an embodiment, cover 310 has a thickness that defines distance D. In other words, device 300 is configured such that cover 310 contacts attachment surface 520, such that magnetic device 308 is spaced a distance D from surface 520, which is also a thickness of cover 310.

In an embodiment, distance D is in a range of 0.001 mm to 4 mm. In another embodiment, distance D is 0.001 mm to 1 mm. In yet another embodiment, distance D is in a range of 0.001 to 0.3 mm. As discussed above, having a small gap 522 measured as a distance D, without having magnet contact with surface 520 can maximize magnet 308 normal forces.

In an embodiment, grip portion 366 comprises a material having a static coefficient of friction of 0.8 to 1.8 when interacting with a surface 520, which in an embodiment may be a steel surface, or a painted steel surface.

In an embodiment, device 300 is configured to hold an item having a weight in a range of 25 lbs. to 100 lbs., using a magnetic-device 308 with a high BH max, such as in a range of 42 to 52 MGOe, yielding a high normal force, along with a relatively soft grip portion 366 material having a relatively high coefficient of friction in a range of 0.8 to 1.8, and a gap distance D that is between 0.001 mm and 1 mm. In other embodiments, device 300 may be configured to hold a lighter item weighing 5 lbs. to 35 lbs., which in an embodiment is accomplished with a smaller mass of magnetic material, or with a magnet with a lower BH max energy. In other embodiments, device 300 is configured to hold an item weighing from 2 oz. to 5 lbs.

Referring still to FIGS. 70-71, device 300 is depicted in a first, or attachment position, such that device 300 is attached to attachment surface 520. As described above, a normal force $F_N$ can be very large, such that without significant mechanical advantage, a user would have a difficult time disconnecting device 300 from attachment surface 520. An advantage of device 300 for "detachable" attachment to a ferromagnetic object is that not only can high normal and holding forces be generated, but the device can easily be removed from the ferromagnetic object or surface through mechanical leverage employed by device 300.

Figure 74:
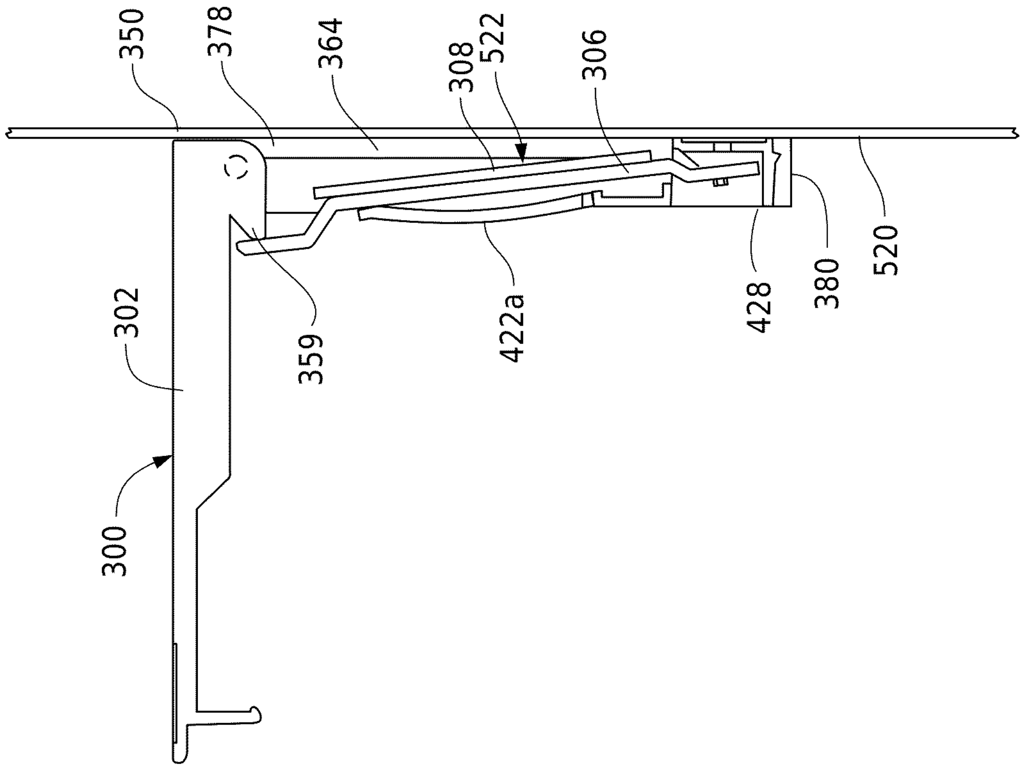
FIG. 74 is a side sectional view of the detachable magnetic device of FIG. 42 in released configuration.
Figure 73:
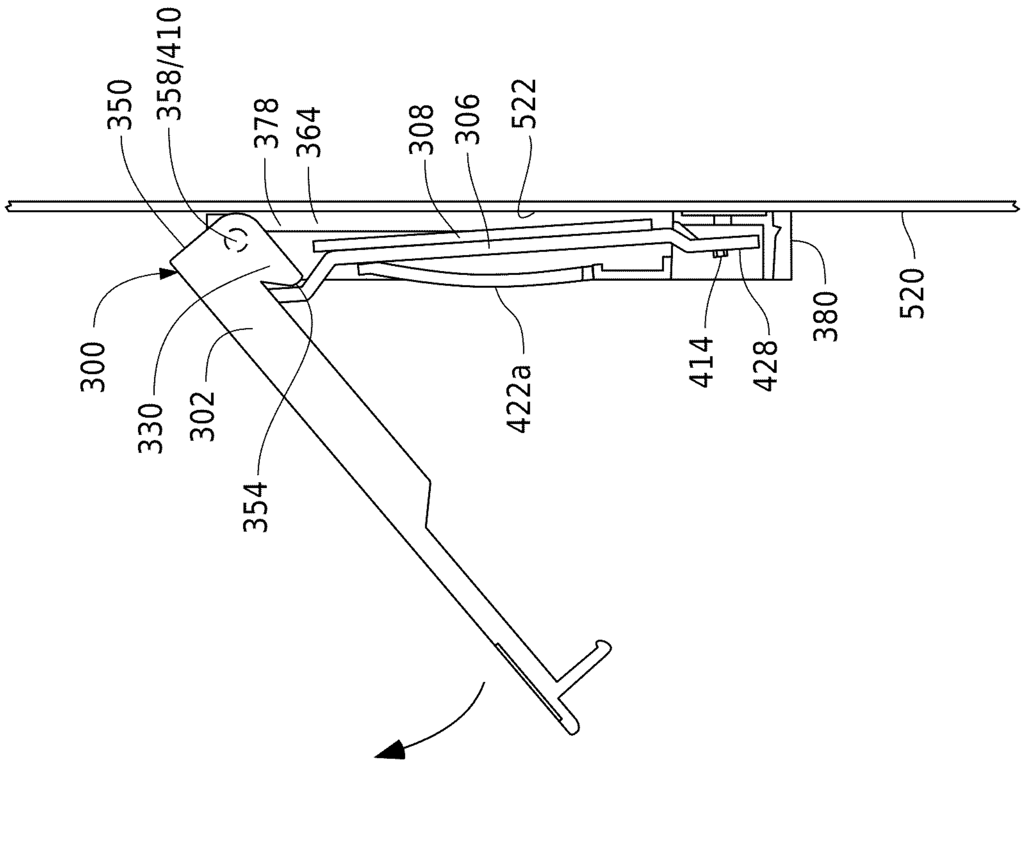
FIG. 73 is a side sectional view of the detachable magnetic device of FIG. 42 in an intermediation configuration of removal from an attachment surface.

Referring to FIGS. 73-74, to detach device 300 from attachment surface 520, a user lifts up or pulls on tab 334 of levering cover 302 in the direction indicated by the arrow so as to move bottom portion 326 upward and away from bottom end 380 of base portion 304, thereby pivoting or rotating levering cover 302 about first and second projections 392, 410 of top end 378 of base portion 304. In an embodiment, during rotation, lifting portion 330 does not extend beyond outer surface 367 of grip portion 366, such that surface 358 of lifting portion 330 is configured to not contact the ferromagnetic object or its surface 520, which can avoid scratching or damage which would otherwise be the case if lifting portion 330 were to be pivoting or pushing off of surface 520.

At the same time, an end of lifting portion 330, which is third portion 354 (magnetic-retaining-portion lifter) contacts first and second lever portions 442*a*, 442*b* of magnet-retaining portion 306, and lifts top end of magnet-retaining portion 306 in a direction away from attachment surface 520 and outer surface 367 (see also FIGS. 70-71). Bottom end 430 of magnet-retaining portion 306 remains abutted against bottom end 380 of frame 364, and projections 394 and 414 remain in slots 458*a* and 458*b* of frame 364, respectively, and magnet-retaining portion 306 does not move substantially vertically. A small amount of rear-to-front movement away from attachment surface 520 occurs near slots 458*a*, 458*b* as magnet-retaining portion 306 is pivoted or rotated about frame 364.

At the same time, and because magnetic device 308 is coupled to magnet-retaining portion 306, it also pivots away from attachment surface 520. More specifically, top end 475 moves away from attachment surface 520, pivoting about bottom end 477, increasing the size of the gap 522, i.e., distance D, between magnetic device 308 and attachment surface 520, and in particular between top end 477 and attachment surface 520.

As described above, small changes in the distance D between magnetic device 308 and the target ferromagnetic object, e.g., attachment surface 520 can result in large changes in holding force $F_H$ due to the nature of the flat magnet of magnetic device 308 with its relatively short, dense magnetic flux patterns. Further, because magnetic device 308 is pivoted at its top end 477 away from attachment surface 520 by lifting portion 330, the mechanical advantage offered by device 300 allows a user to readily detach device 300 from attachment surface 520 without requiring significant effort. At the same time, device 300 is capable of hanging or holding objects with significant weight at attachment surface 520 without unwanted or unexpected detachment.

Figure 75:
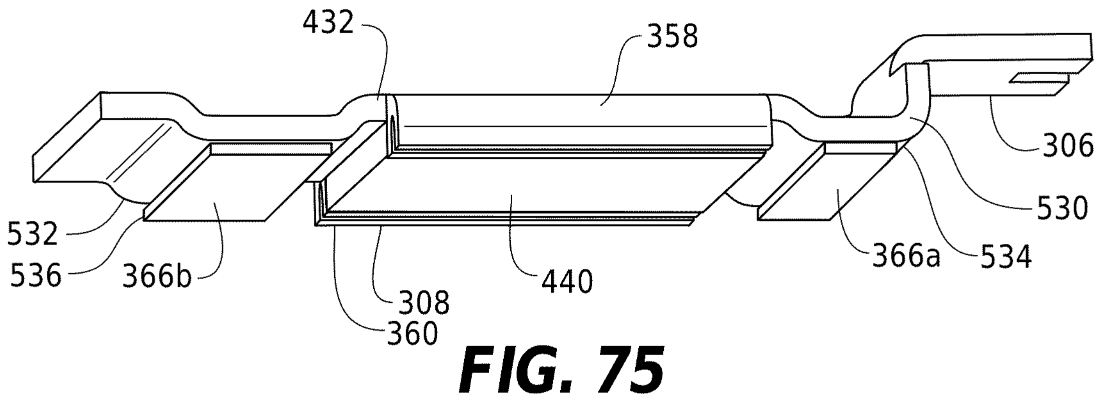
FIG. 75 is a schematic perspective view of a magnet-retaining portion with a magnet and a directly-attached grip portion, according to an embodiment.
Figure 76:
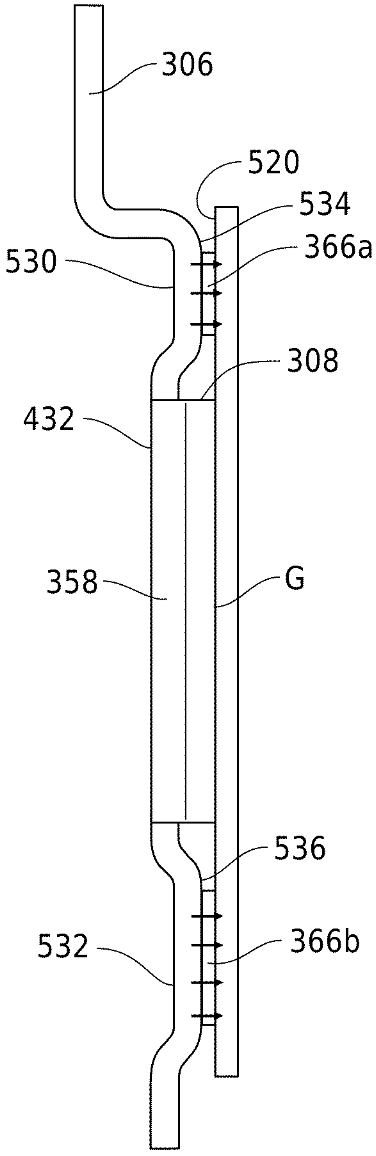
FIG. 76 is the schematic side view of the magnet-retaining portion with a magnet and a directly-attached grip portion of FIG. 75, attached to a ferromagnetic surface.

Referring to FIGS. 75 and 76, an alternate embodiment of magnet-retaining portion 306 with magnetic device 306 and grip portion 366 is depicted. In this embodiment, rather than being mounted to, or integral with frame 364, grip portion 366 is attached directly to magnet-retaining portion 306.

In the embodiment depicted in FIGS. 75 and 76, magnet-retaining portion 306 is somewhat different from the embodiment depicted in the previous figures. In this alternate embodiment, middle portion 432 of magnet-retaining portion 306 includes an additional pair of bent portions, first bent portion 530, and second bent portion 532. Each bent portion 530 and 532 includes a laterally-displaced surface onto which grip portion 366 is attached. As depicted, first bent portion 530 includes first laterally-displaced surface 534, and second bent portion 532 includes second laterally-displaced surface 536. In an embodiment, each of displaced surfaces 534 and 536 is laterally or horizontally displaced from rear surface 440 of middle portion 432 of magnet-retaining portion 306. In an embodiment, each surface 534, 536 is substantially parallel to surface 440.

Magnet-retaining portion 306 may also include, in an embodiment and as depicted, side portions 358 and 540 that extend downward from middle portion 432 and over portions of magnet 308, such that magnet 308 is effectively a channel magnet when magnet-retaining portion 306 comprises a ferrous material.

Grip portion 366 may include a first grip portion 366*a* and a second grip portion 366*b* respectively adjoined to first and second laterally-displaced surfaces 534 and 536. Grip portion 366 may comprise fewer or more grip portions depending on a number of desired contact surfaces and on magnet-retaining portion 306 configuration.

Referring specifically to FIG. 76, magnet-retaining portion 306 with magnetic device 308 and grip portion 366 according to the embodiment of FIG. 75 is depicted attached to ferromagnetic surface 520. In this embodiment, a gap 522 is formed, similar to the gap 522 formed with respect to the embodiment of device 300 depicted and described with respect to FIGS. 42-74. In an attachment configuration as depicted, normal forces depicted by the arrows are exerted from magnet-retaining portion 306 through grip portion 366*a*, 366*b* to surface 520.

A benefit of this embodiment is that gap 522 between magnet 308 and surface 520 can be controlled more precisely by removing frame 364 from the load path. As described above, the magnetic fields of magnet 308 exert a normal force on device 300, which cause components of device 300 to compress. As magnet 308 via normal forces "pulls" device 300 toward surface 520, components of device 300 in the load path are compressed and the surface of magnet 308 moves closer to ferromagnetic surface 520. In the embodiment of FIGS. 42-74, frame 364 is compressed, as is grip portion 366. In order to position magnet 308 very close to surface 520 without touching surface 520, the amount of expected compression, and hence movement of magnet 308 toward surface 520 must be understood and accounted for. Further, manufacturing tolerances of the components can make it difficult to precisely predict compression, and hence to control a size of gap 522, i.e., distance D.

In the embodiment of FIGS. 75-76, frame 364 is removed from the load path, and is therefore not generally compressed. In this embodiment, ignoring compression of magnet-retaining portion 306 which is presumed to be minimal or negligible, only grip portions 366*a* and 366*b* are compressed. As such, an amount of compression, and manufacturing dimensional tolerances, of frame 364 need not to be considered in order to predict and control gap 522. Only an expected compression based on grip portion 366 material durometer, thickness, and tolerance of grip portion 366 need be considered.

In an embodiment that improves prediction and control of compression of grip portion 366, grip portion 366, including portions 366*a* and 366*b* are relatively thin, high coefficient-of-friction material with a high spring constant so that changes in normal force result in only small changes in gap 522 dimensions.

Referring to FIGS. 77-93, another embodiment of device 300 for detachable attachment to a ferromagnetic object is depicted. The embodiment of device 300 of FIGS. 77-93 is substantially similar to the embodiment 300 of FIGS. 42-73, though with several notable differences that may be beneficial to a small, more compact size. In the embodiment of FIGS. 77-93, and as will be described further below, a pivoting cover pivots at an end near the holding or hook portion, rather than opposite the holding portion.

Figure 77:
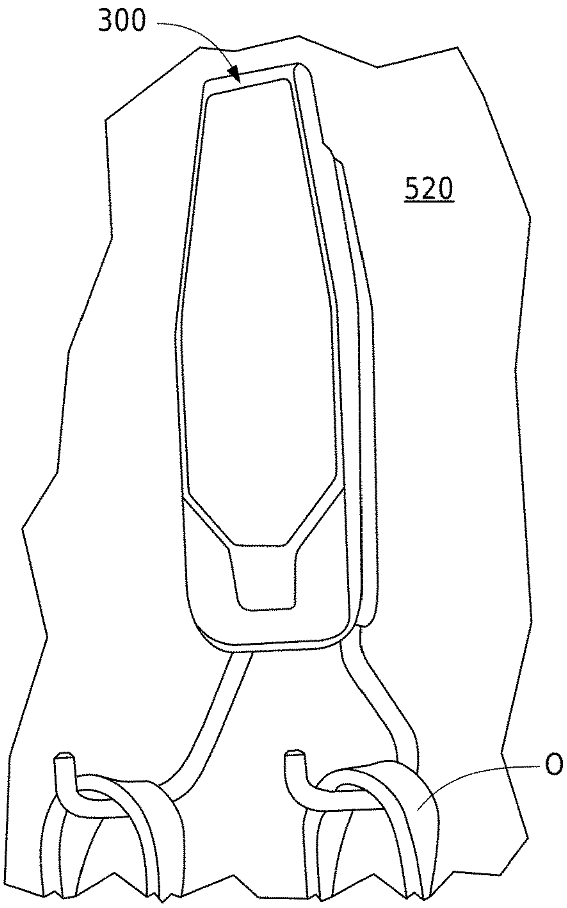
FIG. 77 is a front perspective view of an alternate embodiment of a detachable magnet device, in an attachment configuration.
Figure 78:
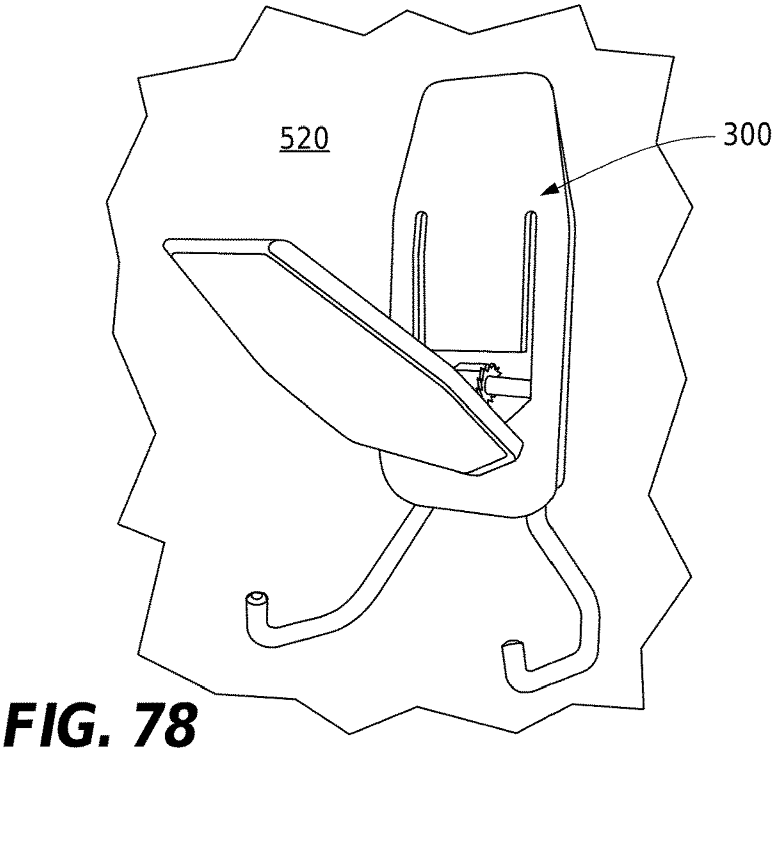
FIG. 78 is a front perspective view of the embodiment of the detachable magnet device of FIG. 77, in release or partial-attachment configuration.

Referring specifically to FIGS. 77-78, FIG. 77 depicts device 300 in a first, attachment configuration or position, attached to a ferromagnetic object at ferrous or ferromagnetic surface 520, and holding object O; FIG. 78 depicts device 300 in a partially attached configuration, which allows the device to be easily adjusted or re-positioned while holding its own weight prior to locking it in position for holding desired items like object O, just prior to removal from surface 520.

Figure 79:
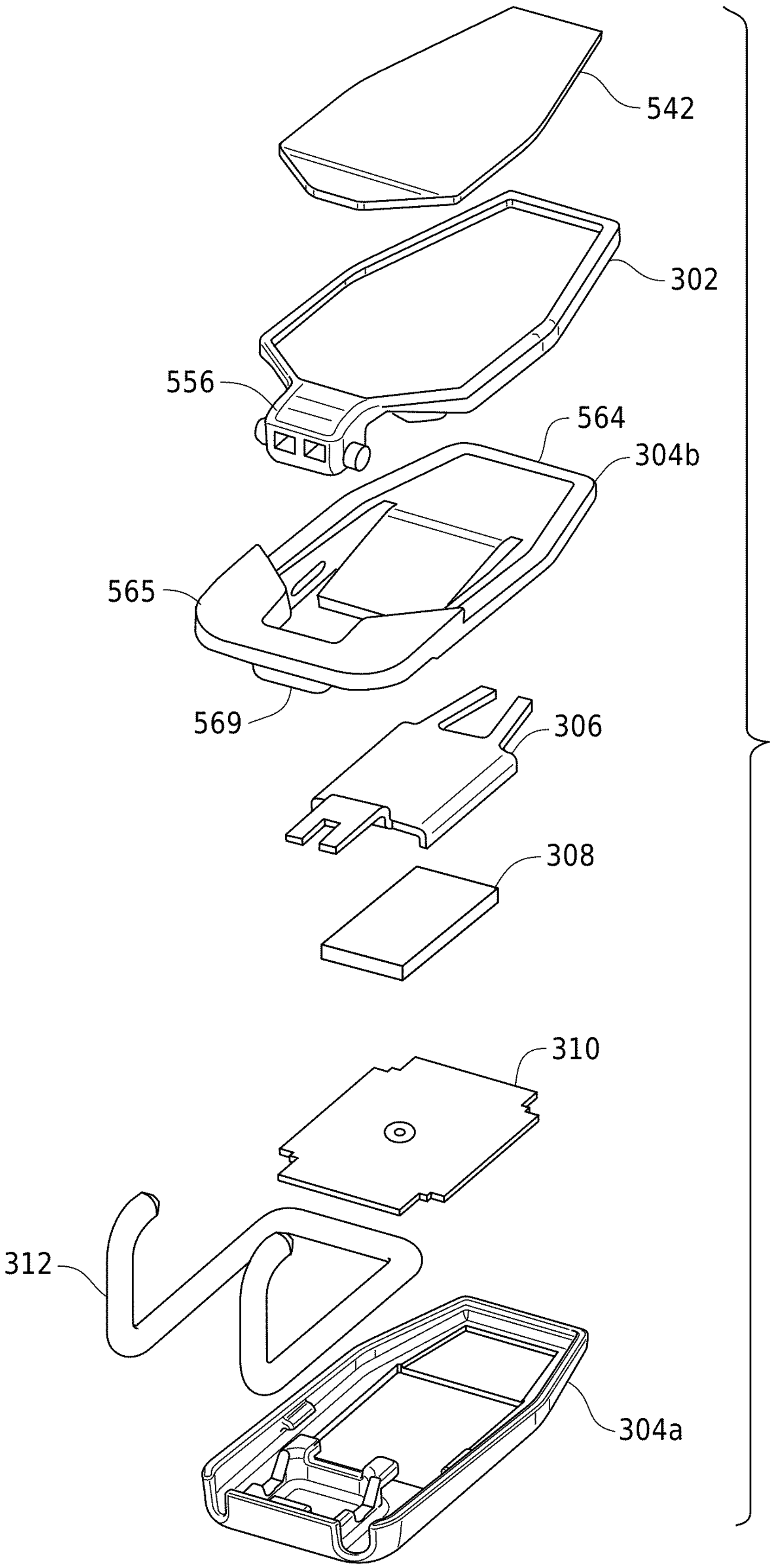
FIG. 79 is an exploded view of the detachable magnet device of FIG. 77, according to an embodiment.

Referring to FIG. 79, this embodiment of device 300 is depicted in an exploded, perspective view. Similar to the embodiment of FIGS. 42-73, in this embodiment, device 300 includes cover 302, base portion 304, which in this embodiment includes bottom base portion 304*a* and top base portion 304*b*, magnet-retaining portion 306, magnetic device 308, optional magnet-surface cover 310, holding or hook portion 312, and decorative insert 542.

Figure 80:
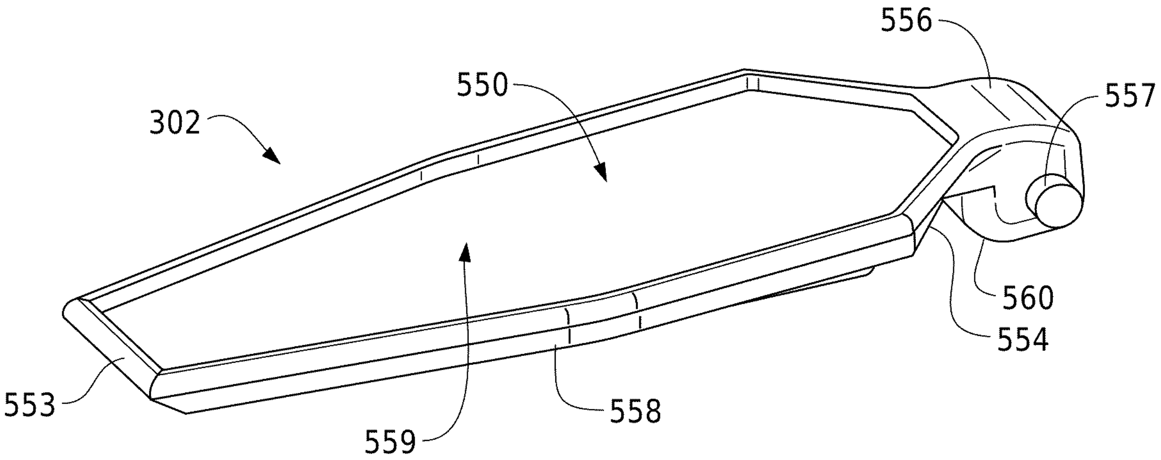
FIG. 80 is a front perspective view of a levering cover of the detachable magnet device of FIG. 77, according to an embodiment.
Figure 81:
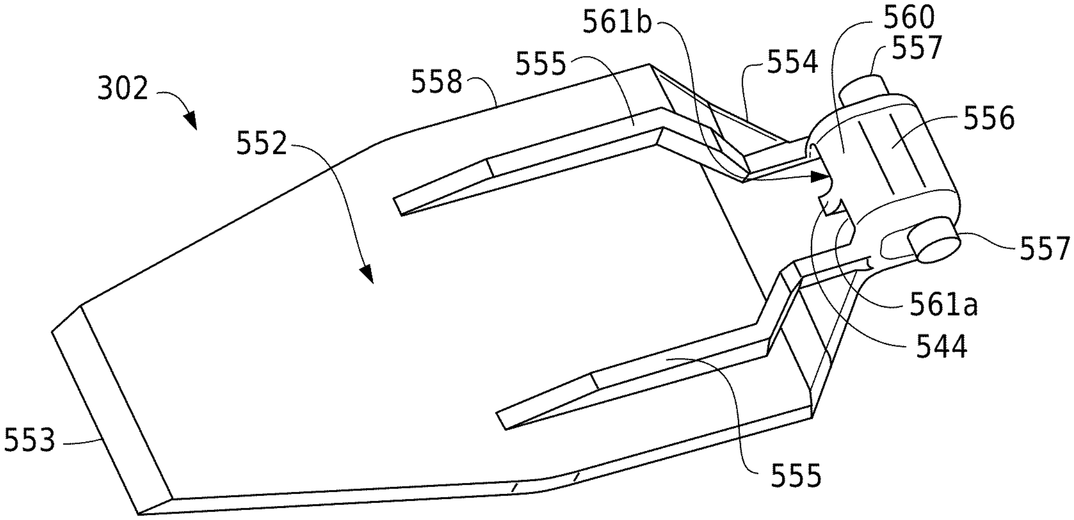
FIG. 81 is a rear perspective view of the levering cover of FIG. 80, according to an embodiment.
Figure 82:
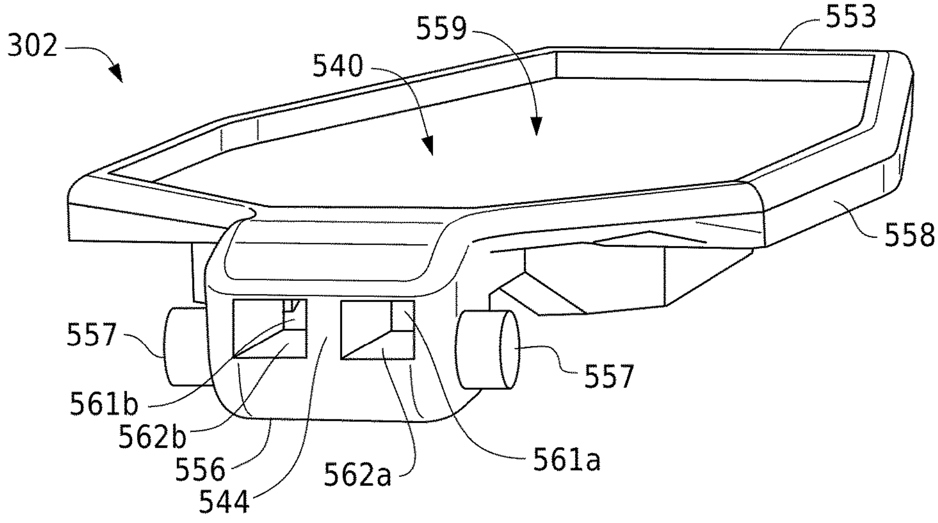
FIG. 82 is another perspective view of the levering cover of FIG. 80, according to an embodiment.

Referring also to FIGS. 80-82, cover 302, which may be a levering cover, includes front side 550, rear side 552, first or top portion 553, second or bottom portion 554, support portions 555 on rear side 552, lifting portion 556, pivot projections 557 and main or body portion 558.

Front side 550 may define recess 559 configured to receive decorative cover insert 542.

Lifting portion 556 is at bottom portion 554, and extends in a top-to-bottom direction away from main portion 558 of cover 302, and may have a narrow width as compared to main portion 558.

Lifting portion 556 in an embodiment includes magnet-retaining-portion lifter 560 configured to engage and lift an end of magnet-retaining portion 306. Opening or slot 561 is defined by magnet-retaining-portion lifter 560 and rear side 552. Opening 561 is configured to receive bottom end of portion 602 of magnet-retaining portion 306. In an embodiment, wall 544 divides opening 561 into two spaces, opening or channel 561*a* and channel 561*b*. Magnet-retaining-portion lifter 560 also includes surface 562 which is configured to be in contact with ends of magnet-receiving portion 306. In an embodiment wherein divider wall 544 divides opening 561 into openings 561*a* and 561*b*, surface 562 includes surface portion 562*a* and 562*b*.

Decorative cover insert 542 may comprise a relatively flat sheet shaped to fit into recess 559 of cover 302 and provide a decorative effect. As such, decorative cover insert 542 may display a particular color, decorative pattern, decorative texture, and so on. In an embodiment, decorative cover insert 542 may be removed and reinserted by a user who may elect to change out decorative cover insert 542 with a second, different insert 542 for a desired appearance. In an embodiment, decorative cover insert 542 and front side 550 form a snap fit joint; in another embodiment, decorative cover insert 542 may be connected to front side 550 by other means, such as an adhesive, hook-and-loop fastening system, and so on.

Referring again to FIG. 79, base portion 304 includes first or bottom base portion 304*a* and second or top base portion 304*b*. Top portion 304*b* connects to bottom portion 304*a*.

Figure 83:
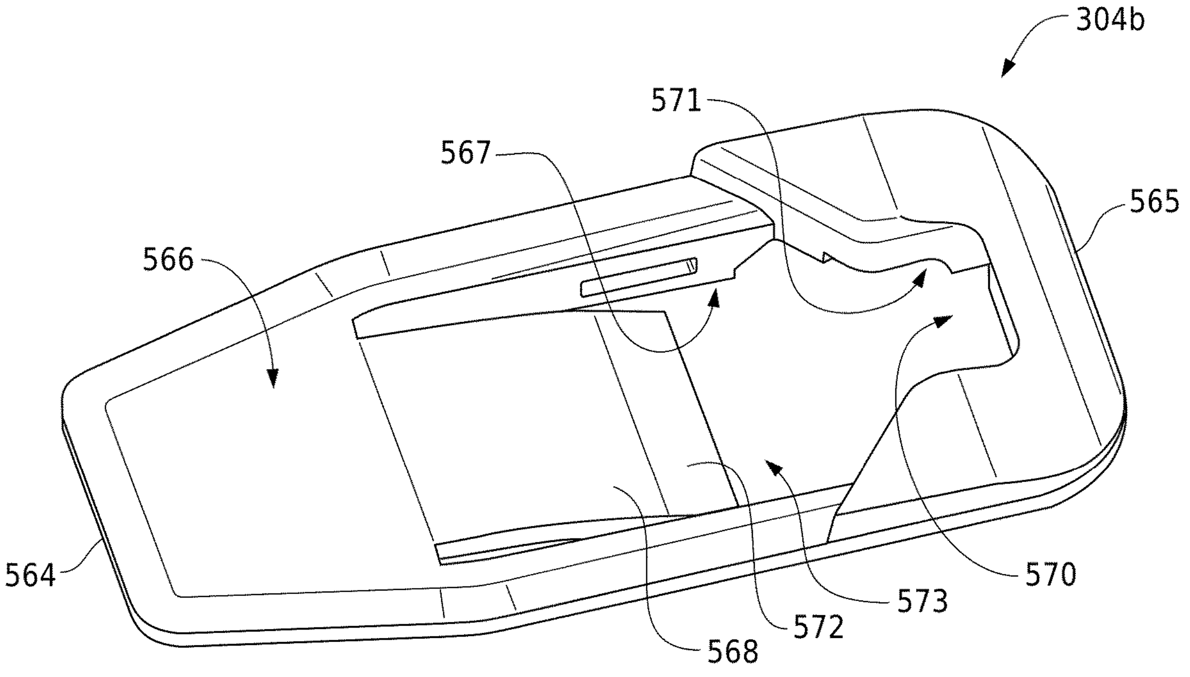
FIG. 83 is a front perspective view of a top base portion of the detachable magnet device of FIG. 77, according to an embodiment.
Figure 84:
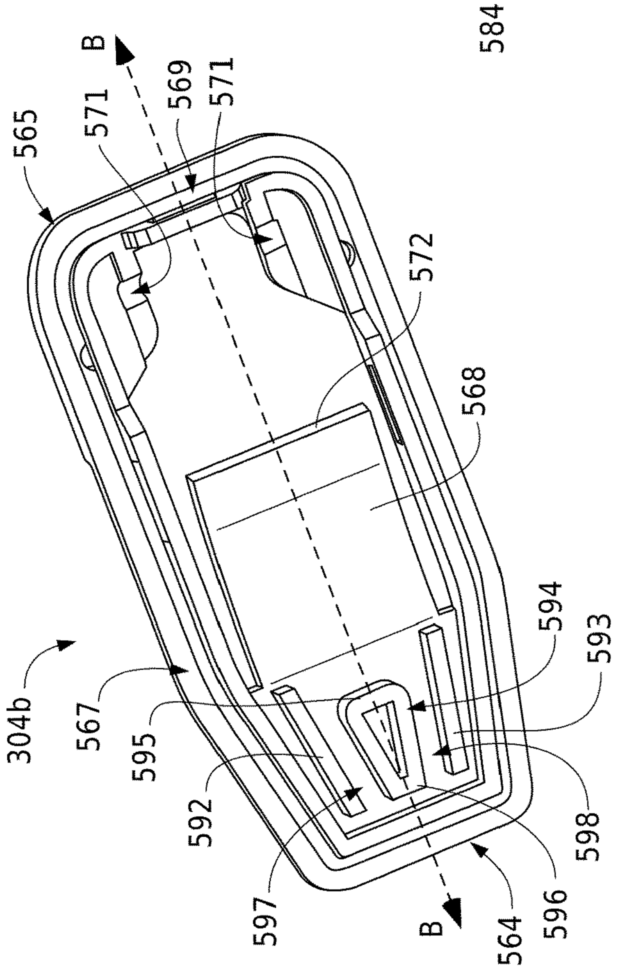
FIG. 84 is a rear perspective view of the top base portion of FIG. 83, according to an embodiment.
Figure 87:
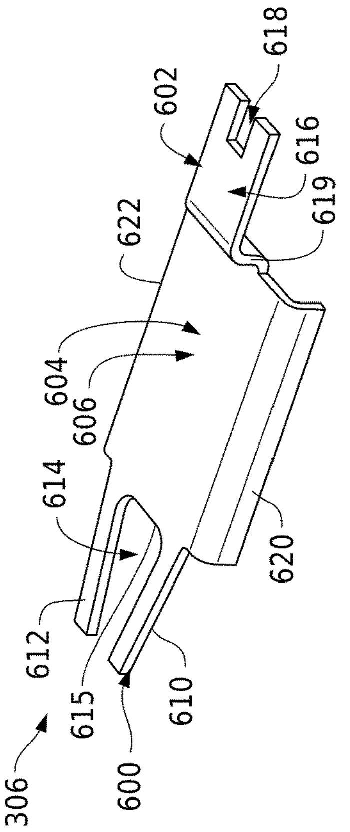
FIG. 87 is a front perspective view of a magnet-retaining portion of the detachable magnet device of FIG. 77, according to an embodiment.
Figure 88:
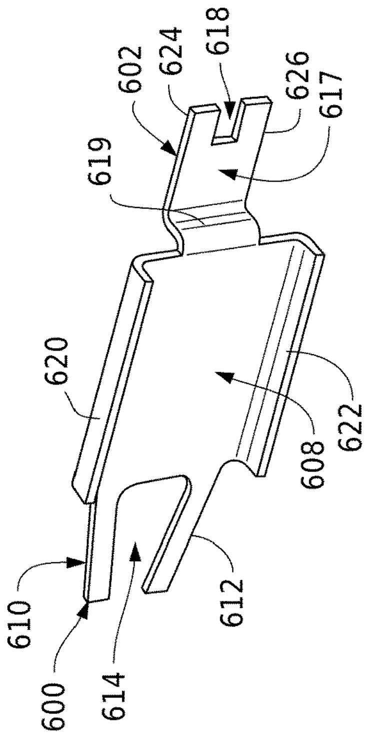
FIG. 88 is a rear perspective view of the magnet-retaining portion of FIG. 87, according to an embodiment.

Referring to FIGS. 83-84, top base portion 304*b* includes first or top portion 564, second or bottom portion 565, front side 566, rear side 567, arm 568, and fastening portion or tab 569. Top base portion 304*b* defines opening 570 configured to receive lifting portion 556 cover 302, and a pair of pivot holes or recesses 571 for receiving pivot projections 557 of cover 302. Arm 568, which in an embodiment forms a living hinge, is connected to top portion 564 and extends from top portion 564 toward bottom portion 565 of top base portion 304*b*, and may be curved in a front-to-rear direction. Arm 568 includes free end 572 configured to contact, and apply a front-to rear force to, magnet-receiving portion 306. Top base portion 304*b* also defines main opening 573 configured to receive portions of magnet-retaining portion 306 and magnet 308.

Figure 85:
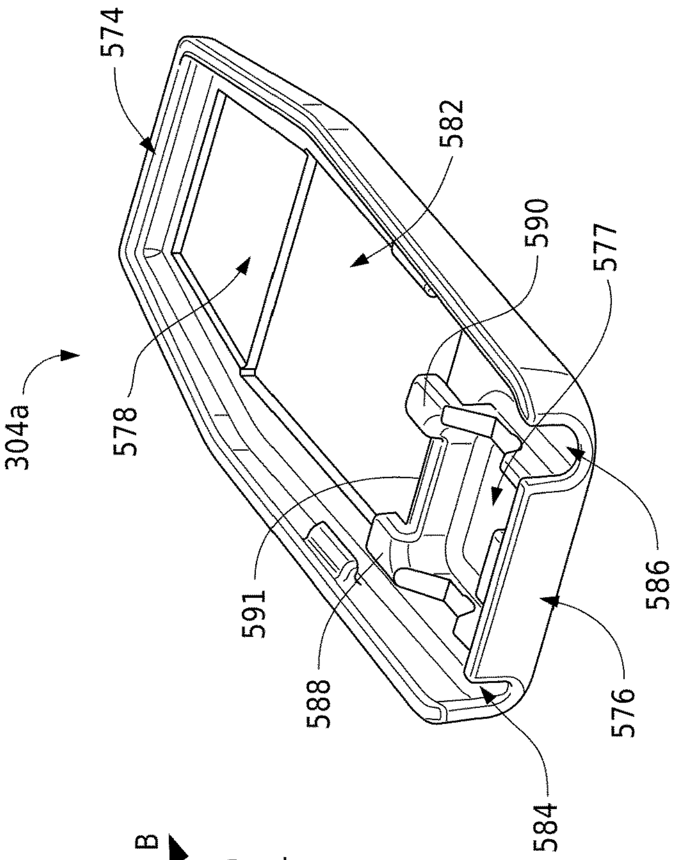
FIG. 85 is a front perspective view of a bottom base portion of the detachable magnet device of FIG. 77, according to an embodiment.
Figure 86:
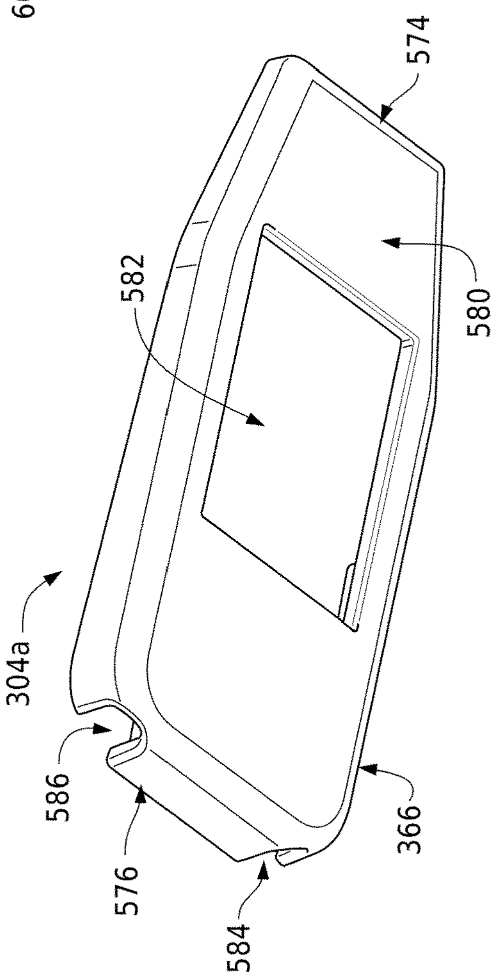
FIG. 86 is a rear perspective view of the bottom base portion of FIG. 85, according to an embodiment.

Referring to FIGS. 84-86, in an embodiment, top base portion 304*b* also includes structure on rear side 567, top portion 564, for supporting, stabilizing and containing top portion 600 of magnet-retaining portion 306. More specifically, top base portion 304*b* includes a pair of projections or ridges, namely first ridge 592 and second ridge 593, and center projection or island 594, all of which project outward and away from rear side 567 in a front-to-rear direction, and also extend in a top-to-bottom direction. First ridge 592 and second containing ridge 593, in an embodiment, and as depicted, extend angularly, such that they are not parallel with a top-to-bottom extending central axis B. Center projection 594 may be trapezoidal shaped as depicted, including bottom end 595 and top end 596, wherein bottom end 595 is wider than top end 596, and is configured to abut a portion of magnet-retaining portion 306, as explained further below.

The support and containing structures 592-594 form magnet-retaining-extension channel 597 and magnet-retaining-extension channel 598 configured to receive first and second extensions 610 and 612, respectively, of magnet-retaining portion 306.

Referring to FIGS. 85-86, in an embodiment, and as depicted, bottom base portion 304*a* includes first or top portion 574, second or bottom portion 576, front side 578, and rear side 580. Rear side 580 may also include grip portion 366, which is as described above. In this embodiment, grip portion 366 is an overmold on rear side 580, though it is not restricted to such.

Base portion 304*a* also defines magnet opening 582 configured to receive at least a portion of magnet 308, first holding-portion opening 584 and second holding-portion opening 586. Bottom portion 576 in an embodiment includes a pair of projections that may be holding hooks, namely, first holding hook 588 and second abutment hook 590. Holding hooks 588 and 590 abut and retain portions of holding portion 312 to bottom portion 304*a*. Ridge or wall 591 extends between hooks 588 and 590. Hooks 588 and 590 project in a rear-to-front direction away from front side 578 of bottom base portion 304*a*.

Bottom portion 576 defines lifter-receiving recess 577 configured to receive lifting portion 556 of levering cover 302.

In the depicted embodiment of FIGS. 77-93, magnet-retaining portion 306 includes first or top portion 600, second or bottom portion 602, middle or plate portion 604, front side 606 and rear side 608.

Top portion 600, in an embodiment, includes a pair of extensions or arms, namely, first extension portion 610 and second extension portion 612. Extension portions 610, 612 extend upwardly and away from middle portion 604 and define opening or gap 614 therebetween. In an embodiment, extension portions 610, 612 each extend in a same plane with middle portion 604, and extend transversely to a lengthwise or top-to-bottom axis, such as outwardly to inwardly, as depicted. Abutment edge 615 extends laterally between extension portions 610 and 612. Extensions 610 and 612 may form an acute angle with edge 615, in an embodiment.

Bottom portion 602, in an embodiment, includes a bent portion, such that bottom portion 602 bends and angles away from middle portion 604 and front side 606. Bottom portion 602 includes front surface 616 that, in an embodiment, lies in a plane parallel to a plane that includes middle portion 604, though displaced from middle portion 604, forwardly. Bottom portion 602 also includes rear surface 617 that is configured to contact channel surface 562 in magnet-retaining-portion lifter 560. Bottom portion 602 defines slot or gap 618 between bottom-end extension 624 and bottom-end extension 626.

Middle portion 604 is generally flat and plate-like, and in an embodiment, and as depicted, includes first side portion 620 and second side portion 622. Each of side portions 620, 622 extend in a top-to-bottom direction along respective sides of middle portion 604, and also extend in a front-to-rear direction away from top plate portion 304*b* and toward bottom plate portion 304*a*. In an embodiment, side portions 620 and 622 cover portions of magnetic-device 308, thereby forming a channel for magnetic device 308 to be received into, such that magnetic device 308 in combination with magnet-retaining portion 306 forms a channel magnet.

Figure 89:
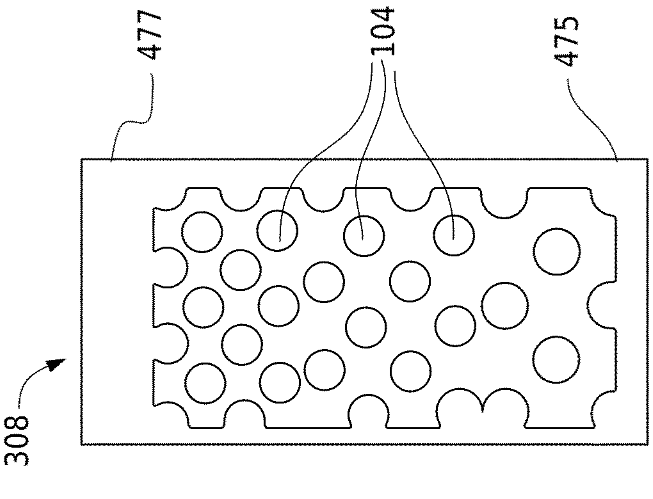
FIG. 89 is a rear view of a magnetic device depicting variable density of magnetic regions across a magnet length, according to an embodiment.

Referring to FIG. 79, magnetic device 308 is similar to those embodiments described above with respect to the other figures, and may include a sheet magnet, laminated magnet, channel magnet, and so on. Referring also to FIG. 89, magnetic device 308 may also include a plurality of "island portions" 104 as also described above. In this embodiment, top end 475 of magnetic device 308 comprises a lower density of island portions 104, while bottom end 477 includes a higher density of island portions 104, such that lifting or levering end 475 will result in a similar drop in attachment force due to the magnet assembly being at an angle and the magnetic flux being more tightly controlled to the face of the magnet on the side closer to the attachment surface.

Referring to FIG. 79, magnet-surface cover 310 is similar to those embodiments described above.

Holding portion 312 is also similar to those embodiments described above, and may include hangar portion 488, which in an embodiment, is covered at least in part by hanger-portion cover 490.

Figure 90:
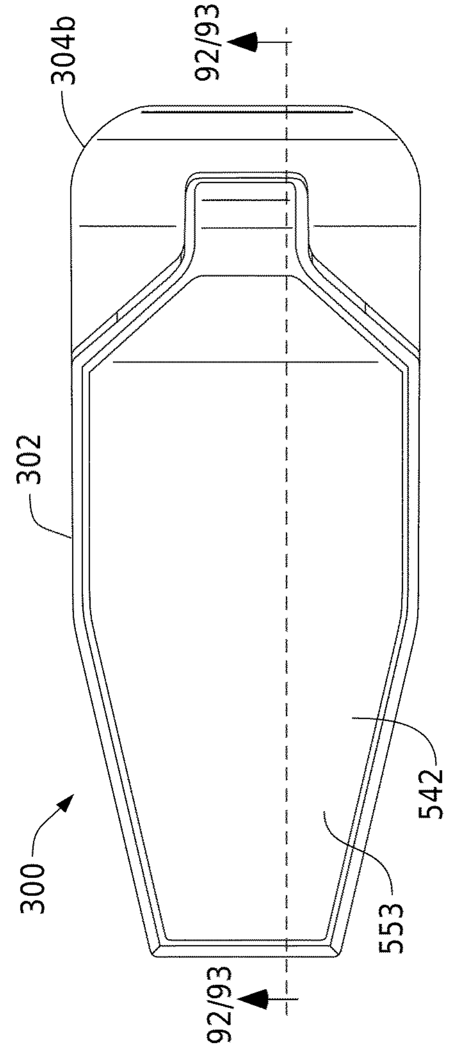
FIG. 90 is a top view of the detachable magnetic device of FIG. 77 without a holding portion.
Figure 91:
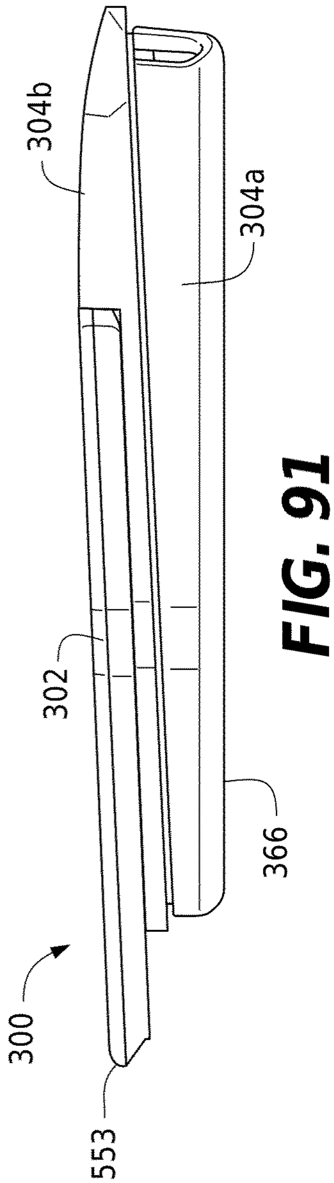
FIG. 91 is a side view of the detachable magnetic device of FIG. 90 without a holding portion.

Referring to FIGS. 90-91, device 300 without holding portion 312 for the sake of illustration, is depicted in an assembled, closed, attachment configuration. FIG. 90 is a top view of device 300 depicting cover 302 pivotally coupled to bottom base portion 304*a*, with cover top portion 553 available for a user to lift. FIG. 91 is a side view of device 300, depicting cover 302 with top portion 553 coupled to top base portion 304*b* and bottom portion 304*a*.

Figure 93:
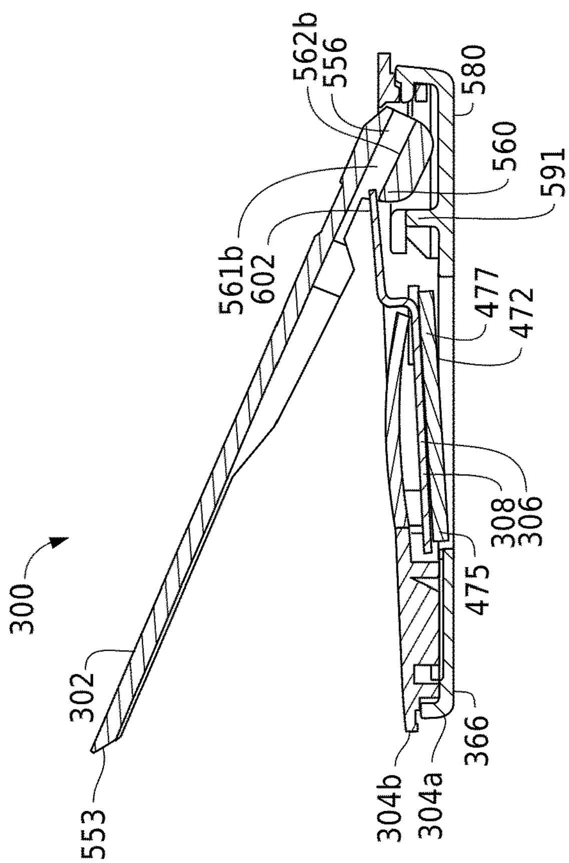
FIG. 93 is a sectional view of the detachable magnetic device of FIG. 90, in a release configuration.
Figure 92:
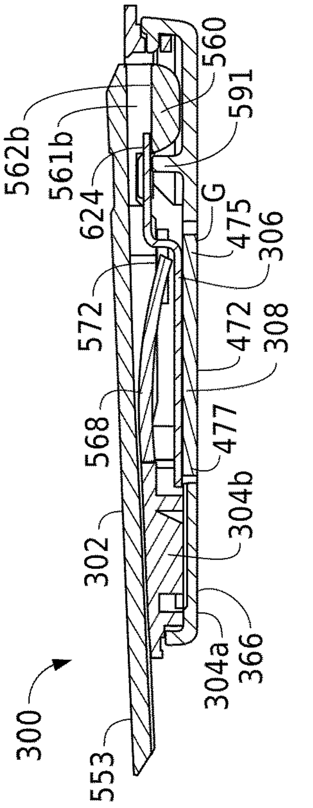
FIG. 92 is a sectional view of the detachable magnetic device of FIG. 90, in an attachment configuration.

FIG. 92 is a sectional view of device 300 in an assembled, closed attachment configuration or position; FIG. 93 is a sectional view of device 300 in an assembled, open release configuration or position.

Referring to FIGS. 79-93, when device 300 is assembled, decorative cover insert 542 is received into recess 559 of cover 302. Top base portion 304*b* is coupled to bottom base portion 304*a*, which in an embodiment forms a snap fit.

Portions of holding portion 312 are received into bottom base portion 304*a*, such that hooks 588 and 590 abut and retain an inserted portion of holding portion 312, and portions of holding portion 312 are received into openings 584 and 586, such that holding portion 312 is coupled to bottom base portion 304*a* and device 300.

Lifting portion 556 of cover 302 is received into recess 577 of bottom base portion 304*a*, with bottom end 565 of top base portion 304*b* covering and securing pivot projections 557, thereby pivotally connecting cover 302 to bottom base portion 304*a* and top base portion 304*b*.

Magnet 308 is attached to magnet-retaining portion 306, as described above.

Magnet-surface cover 310, when present, is affixed to base portion 304*a* such that dust and debris are prevented from attaching directly to the magnet or magnet assembly part 308. When unwanted ferrous material does attach to the magnet-surface cover, it can be easily wiped away when device 300 is switched to off or to a weaker partial-attachment position First and second extension arms 610 and 612 of magnet-retaining portion 306 are received into first and second magnet-retaining-extension channels 597 and 598, respectively, of rear side 567 of top base portion 304*b*. Edge 615 of magnet-retaining portion 306 abuts bottom end 595 of central projection 594. As such, when bottom base portion 304*b* is coupled to top base portion 304*a*, top portion 600 of magnet-retaining portion 306 with attached magnetic device 308 is securely positioned in device 300. As such, top portion 600 of magnet-retaining portion 306 is generally constrained from moving in a bottom-to-top direction, and in lateral, or left-to-right/right-to left directions. However, as explained further below, magnet-retaining portion 306 pivots about top portion 600, such that a small amount of movement in a rear-to-front or front-to-rear direction is allowed within a space or gap formed between top base portion 304*b* and bottom base portion 304*a*.

Portions of magnet-retaining portion 306, including side portions 620 and 622, and portions of magnetic device 308 are received into magnet opening 582, with rear magnet surface 472 facing rearwardly and towards a potential ferrous attachment object.

Free end 572 of arm 568 of top base portion 304*b* contacts front side 606 of middle portion 604 of magnet-retaining portion 306, and in an embodiment, acts as a living hinge, exerting some front-to-rear force onto middle portion 604, so as to eliminate or reduce unwanted front-to-rear and rear-to-front movement of magnet-retaining portion 306 and magnetic device 308, particularly in the release configuration, thereby reducing potential rattling of the assembly when not attached to a ferromagnetic surface.

Bottom portion 602 of magnet-retaining portion 306, which as described below is lifted for release of device 300 from a ferrous object, is inserted into lifting portion 556. More specifically, in an embodiment, bottom-end extension 624 and bottom-end extension 626 are received in channels 561*b* and 561*a* of lifting portion 556, respectively, and wall 544 of lifting portion 556 is received in slot 618 of magnet-retaining portion. Magnet-retaining-portion lifter 560 engages bottom portion 602 such that surfaces 562 of magnet-retaining-portion lifter 560, namely surface 562*a* and 562*b* contact rear side 617 of bottom portion 602 of magnet-retaining portion 306. As such, bottom portion 602 is retained in magnet-retaining-portion lifter 560, and movable by magnet-retaining-portion lifter 560 when cover 302 is pivoted, as described further below.

In the attachment configuration of FIG. 92, rear surface 472 of magnet 308 is generally parallel with rear side 580 of bottom base portion 304*a* and grip portion 366. When a ferrous attachment object is present, a generally uniform gap G is formed between rear surface 472 of magnetic device 308 and a surface 520 of the object (also see above description of related embodiment of FIGS. 49-78 for further attachment description). Cover 310, when present, may be in gap G. In the release position, rear surface 472 is displaced from rear side 580 of bottom base portion 304*a* and its corresponding surface—that distance being greater than gap G distance D due to compressibility of grip material 366. Magnetic-retaining portion 306 is movably secured at its top and bottom portions 600 and 602, as described above.

When end 553 of cover 302 is lifted by a user, causing levering cover 302 to pivot or rotate about lifting portion 556 and pivot projections 557 (see also FIGS. 80-81), magnet-retaining-portion lifter 560 moves in a rear-to-front direction, lifting and moving bottom portion 602 of magnet retaining portion 306 also in a rear-to-front direction. This movement forces magnetic device 308 to be pivoted about its top end 475, with bottom end 477 of magnetic device 308 simultaneously being lifted, or also moved in a rear-to-front direction, thusly increasing a size of a gap G between magnetic device 308 and a ferrous attachment object, and enabling release of device 300 from the object surface.

The following United States patents are hereby incorporated by reference herein in their entireties: U.S. Pat. Nos. 10,204,727, 10,194,246, 10,173,292, 10,008,817,9,711,268, 9,588,599, 9,536,650, 9,412,506, 9,406,424, 9,404,776, 9,371,923, 9,367,783, 9,365,049, 9,312,634, 9,298,281, 9,275,783, 9,269,482, 9,257,219, 9,245,677, 9,219,403, 9,202,616, 9,202,615, 9,111,673, 9,111,672, 9,105,384, 9,105,380, 9,093,207, 9,082,539, 8,963,668, 8,963,380, 8,957,751, 8,947,185, 8,937,521, 8,917,154, 8,872,608, 8,857,044, 8,848,973, 8,844,121, 8,841,981, 8,816,805, 8,810,348, 8,779,879, 8,779,877, 8,760,252, 8,760,251, 8,760,250, 8,717,131, 8,704,626, 8,702,437, and 8,698,583. The above references to U.S. patents in all sections of this application are herein incorporated by references in their entirety for all purposes. Components illustrated in such patents may be utilized with embodiments herein. Incorporation by reference is discussed, for example, in MPEP section 2163.07(B).

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A device for detachable attachment to a surface of a ferromagnetic object and for holding an item adjacent to the surface, the device comprising:

a base including a frame and a grip portion, the frame having a first end, a second end, a front side and a rear side, and comprising a first material, the grip portion coupled to the frame at the rear side of the frame, the grip portion having an outer surface configured to contact the surface of the ferromagnetic object, and comprising a second material;

a magnet-retaining portion having a first end and a second end, the second end pivotally connected to the frame at the frame second end;

a magnetic device connected to the magnet-retaining portion, the magnetic device having a first end, a second end and an outer surface;

a cover pivotally connected to the frame at the first end of the frame and covering a portion of the front side of the base, the cover including a lifter portion configured to contact the first end of the magnet-retaining portion and cause the first end of the magnet-retaining portion to pivot about the second end of the frame when the lifter portion is rotated, thereby moving the first end of the magnet-retaining portion and the first end of the magnetic device in a rear-to-front direction; and a holding portion connected to the frame portion and configured to hold the item.

2. The device of claim 1, wherein the first material of the frame has a hardness that is greater than a hardness of the second material of the grip portion, and the second material of the grip portion has a coefficient of friction that is greater than a coefficient of friction of the first material of the frame.

3. The device of claim 2, wherein the grip portion projects rearwardly further than the frame and projects rearwardly further than the magnetic device such that only the grip portion contacts the surface when the device is in an attachment configuration and a gap is formed between the outer surface of the magnetic device and the surface of the ferromagnetic object, the attachment configuration being a configuration of the device whereby the device is attached to the surface of the ferromagnetic object.

4. The device of claim 3, wherein the outer surface of the grip portion is substantially parallel to the outer surface of the magnetic device.

5. The device of claim 1, wherein the magnetic device comprises a sheet magnet having a plurality of island portions, each island portion having a north pole and a south pole, the poles of each island portion defining a magnetic axis extending therethrough, each magnetic axis being generally orthogonal to a face of the magnetic sheet.

6. The device of claim 1, wherein the magnetic device comprises a channel magnet.

7. The device of claim 5, wherein the magnetic device comprises a plurality of sheet magnets, each sheet magnet separated by a metal plate.

8. The device of claim 1, wherein the holding portion comprises a hook.

9. The device of claim 1, wherein the cover comprises a supporting fin extending in a lengthwise direction from a first end to a second end, and projecting rearwardly from an inside surface of the cover, and the first end of the magnet-retaining portion includes a pair of lever portions defining a gap therebetween, wherein a portion of the supporting fin is positioned in the gap.

10. The device of claim 1, wherein the frame has an arm with a free end contacting a front side of the magnet-retaining portion, the arm configured to apply a force to the front side of the magnet-retaining portion.

11. The device of claim 1, further comprising a magnet-surface cover on the outer surface of the magnetic device.

12. A device for detachable attachment to a ferromagnetic attachment surface, the device comprising:

a base including an arm, a front side, and a rear side with a rear surface;

a magnet-device assembly having a magnet, a first end and a second end, the second end pivotally connected to the base, the magnet having an outer surface that is substantially parallel to the rear surface of the base and displaced frontwardly away from the rear surface of the base;

a lever having a free end and a pivot end, the pivot end connected to the base and configured to apply a force to the magnet-device assembly in a rear-to-front direction when the lever is pivoted about the pivot end; and a hook connected to the frame portion;

wherein the arm of the base is configured to contact the magnet-device assembly and exert a second force on the magnet-device assembly in a front-to-rear direction when the lever is pivoted about the pivot end.

13. The device of claim 12, wherein the outer surface of the magnet is frontwardly displaced away from the rear surface of the base by a distance that is greater than zero, but less than 1 mm.

14. The device of claim 13, wherein the outer surface of the magnet is frontwardly displaced away from the rear surface of the base by a distance that is greater than zero, but less than 0.3 mm.

15. The device of claim 12, wherein a portion of the base that comprises the rear surface comprises a material having a Shore A durometer hardness in a range of 10A to 90A.

16. The device of claim 12, wherein the base includes a first material having a first hardness and a second material have a second hardness, the second hardness being less than the first hardness, wherein a portion of the base that is the rear surface comprises the second hardness.

17. The device of claim 12, wherein the rear surface of the base comprises a material having a coefficient of friction that is greater than 0.5 when interacting with steel.

18. The device of claim 12, wherein the arm is a curved arm with a fixed end and a free end, and the free end is configured to contact the magnet-device assembly.

19. The device of claim 12, wherein the magnet is one or more of a sheet magnet, a laminated magnet or a channel magnet.

20. A device for detachable attachment to a surface of a ferromagnetic object having and for holding an item adjacent to the ferromagnetic surface, comprising:

a base including a frame and a grip portion, the frame having a first end, a second end, a front side and a rear side, and comprising a first material, the grip portion coupled to the frame at the rear side of the frame, the grip portion having an outer surface configured to contact the ferromagnetic attachment surface, and comprising a second material, the second material being different from the first material;

a magnet-retaining portion having a first bent end portion, a middle portion, and a second bent end portion, the second bent end portion pivotally connected to the frame at the frame second end;

a magnetic device connected to the middle portion of the magnet-retaining portion, the magnetic device having a first end, a second end and an outer surface;

a cover pivotally connected to the frame at the first end of the frame, the cover including a lifter portion configured to contact the first end of the magnet-retaining portion and cause the first end of the magnet-retaining portion to pivot about the second end of the frame when the lifter portion is rotated, thereby moving the first end of the magnet-retaining portion and the first end of the magnetic device to in a rear-to-front direction; and a holding portion connected to the frame portion and configured to hold the item.

21. The device of claim 20, further comprising a magnet-surface cover on the outer surface of the magnetic device.

22. The device of claim 20, wherein the magnet-surface cover is a vinyl sheet or a coating.

23. The device of claim 20, wherein the outer surface of the magnetic device is offset from the outer surface of the grip portion such that the outer surface of the of the magnetic device does not contact the surface of the ferromagnetic object in an attachment configuration where the device is attached to the surface of the ferromagnetic object and the outer surface of the grip portion contacts the surface of the ferromagnetic object.

* * * * *